(12) United States Patent
Nguyen et al.

(10) Patent No.: US 10,643,296 B2
(45) Date of Patent: May 5, 2020

(54) SYSTEMS AND METHODS FOR RENDERING MULTIPLE LEVELS OF DETAIL

(71) Applicant: QUALCOMM Incorporated, San Diego, CA (US)

(72) Inventors: Phi Hung Nguyen, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 14/993,685

(22) Filed: Jan. 12, 2016

(65) Prior Publication Data

US 2017/0200252 A1    Jul. 13, 2017

(51) Int. Cl.
*G06T 1/20*    (2006.01)
*G09G 5/393*    (2006.01)
*G09G 5/395*    (2006.01)
*G06F 3/01*    (2006.01)
*G06F 3/06*    (2006.01)
*G06F 9/38*    (2018.01)
*G06F 13/42*    (2006.01)
*G06T 15/00*    (2011.01)
(Continued)

(52) U.S. Cl.
CPC ............... *G06T 1/20* (2013.01); *G06F 3/013* (2013.01); *G06F 3/0619* (2013.01); *G06F 3/0656* (2013.01); *G06F 3/0673* (2013.01); *G06F 9/3871* (2013.01); *G06F 13/4239* (2013.01); *G06T 15/005* (2013.01); *G06T 15/10* (2013.01); *G06T 17/20* (2013.01); *G06T 19/006* (2013.01); *G09G 5/006* (2013.01); *G09G 5/227* (2013.01); *G09G 5/363* (2013.01); *G09G 5/393* (2013.01); *G09G 5/395* (2013.01); *G09G 2340/0407* (2013.01); *G09G 2360/18* (2013.01)

(58) Field of Classification Search
CPC ........................................................ G06T 1/20
USPC ........................................................ 345/423
See application file for complete search history.

(56) References Cited

U.S. PATENT DOCUMENTS 6,438,516 B1 *   8/2002   Davis ................. G06F 17/2217
                                                           345/467
6,577,329 B1    6/2003   Flickner et al.
(Continued)

FOREIGN PATENT DOCUMENTS

EP          1596339 B1    10/2007
WO         02079962 A2    10/2002

OTHER PUBLICATIONS

Yang, L. , "Geometry-Aware Framebuffer Level of Detail" 2008, Computer Graphics Forum, pp. 1183-1188 (Year: 2008).*
(Continued)

*Primary Examiner* — Terrell M Robinson
(74) *Attorney, Agent, or Firm* — Austin Rapp

(57) ABSTRACT

An electronic device is described. The electronic device includes a memory. The electronic device also includes a very long instruction word (VLIW) circuit. The VLIW circuit includes an asynchronous memory controller. The asynchronous memory controller is configured to asynchronously access the memory to render different levels of detail. The electronic device may include a non-uniform frame buffer controller configured to dynamically access different subsets of a frame buffer. The different subsets may correspond to the different levels of detail.

29 Claims, 24 Drawing Sheets

(51) Int. Cl.
*G06T 15/10* (2011.01)
*G06T 17/20* (2006.01)
*G06T 19/00* (2011.01)
*G09G 5/00* (2006.01)
*G09G 5/22* (2006.01)
*G09G 5/36* (2006.01)

(56) References Cited

U.S. PATENT DOCUMENTS

| | | | |
|---|---|---|---|
| 6,677,945 B2* | 1/2004 | Lapidous | G06T 15/405 |
| | | | 345/419 |
| 7,209,139 B1 | 4/2007 | Keet et al. | |
| 7,777,960 B2 | 8/2010 | Freeman | |
| 7,830,381 B2 | 11/2010 | Lundstrom et al. | |
| 8,384,716 B2 | 2/2013 | Young et al. | |
| 8,390,874 B2 | 3/2013 | Simske et al. | |
| 8,497,880 B2 | 7/2013 | Victor et al. | |
| 8,917,271 B2 | 12/2014 | Rhoades et al. | |
| 8,963,931 B2 | 2/2015 | Fowler | |
| 9,105,129 B2 | 8/2015 | Rohlf | |
| 2003/0037194 A1* | 2/2003 | Mukherjee | G06F 3/1438 |
| | | | 710/260 |
| 2005/0088446 A1* | 4/2005 | Herrick | G06T 15/503 |
| | | | 345/531 |
| 2006/0071877 A1 | 4/2006 | Kanamori et al. | |
| 2006/0242596 A1 | 10/2006 | Armstrong et al. | |
| 2006/0267982 A1* | 11/2006 | Aguera Y Arcas | G06F 3/0481 |
| | | | 345/428 |
| 2007/0141538 A1 | 6/2007 | Quinn et al. | |
| 2007/0285439 A1 | 12/2007 | King et al. | |
| 2008/0192060 A1* | 8/2008 | Ogiso | G06F 3/14 |
| | | | 345/546 |
| 2008/0282050 A1 | 11/2008 | Grabner | |
| 2009/0195541 A1 | 8/2009 | Peng et al. | |
| 2010/0079454 A1 | 4/2010 | Legakis et al. | |
| 2010/0231588 A1* | 9/2010 | Barczak | G06T 15/405 |
| | | | 345/422 |
| 2011/0018903 A1 | 1/2011 | Lapstun et al. | |
| 2012/0146891 A1 | 6/2012 | Kalinli | |
| 2013/0219012 A1 | 8/2013 | Suresh et al. | |
| 2013/0321399 A1 | 12/2013 | Rohlf | |
| 2014/0098117 A1 | 4/2014 | Goel et al. | |
| 2014/0247277 A1* | 9/2014 | Guenter | G06T 11/00 |
| | | | 345/611 |
| 2014/0347363 A1 | 11/2014 | Kaburlasos | |
| 2014/0361977 A1 | 12/2014 | Stafford et al. | |
| 2014/0362448 A1 | 12/2014 | Yamada | |
| 2015/0049104 A1 | 2/2015 | Lum et al. | |
| 2015/0178983 A1 | 6/2015 | Akenine-Moller et al. | |
| 2016/0104458 A1* | 4/2016 | Kim | G06T 15/005 |
| | | | 345/423 |
| 2016/0307297 A1* | 10/2016 | Akenine-Moller | G06T 3/403 |
| 2016/0364809 A1 | 12/2016 | Kamura | |
| 2017/0124760 A1 | 5/2017 | Murakawa et al. | |
| 2017/0200308 A1 | 7/2017 | Nguyen et al. | |
| 2017/0287446 A1 | 10/2017 | Young et al. | |
| 2017/0372450 A1* | 12/2017 | Akenine-Moller | G06T 3/403 |

OTHER PUBLICATIONS

Yang, Lei. "Geometry-aware framebuffer level of detail", Jun. 2008, ACM Digital Library, vol. 27, pp. 1183-1188 (Year: 2008).*
Guenter B., et al., "Foveated 3D Graphics", Proceedings ACM SIGGRAPH Asia, Nov. 20, 2012, 10 Pages.
Roberts J.C., et al., "Gaze-Contingent Level of Detail Rendering," Eurographics, Jan. 1, 2001 (Jan. 1, 2001), XP055199784, Department of computer Science, Clemson University, Retrieved from the Internet: URL: http://andrewd.ces.clemson.edu/research/vislab/docs/eg2001.pdf [retrieved on Jul. 2, 2015].
International Search Report and Written Opinion—PCT/US2017/064760—ISA/EPO—dated Mar. 9, 2017.
Pedro S., et al., "Progressive Buffers: View-dependent Geometry and Texture LOD Rendering", ACM SIGGRAPH 2006 Courses, pp. 1-18, URL: https://dl.acm.org/citation.cfm?id=1185826 [retrieved on Mar. 1, 2018].
"Draw Call Batching", Jun. 2014, Unity, pp. 1-3, [retrieved on Jan. 22, 2019], Retrieved from the Internet URL:https://docs.unity3d.com/Manual/DrawCallBatching.html (Year: 2014).
Daniel R., "GPU Based Dynamic Geometry Level of Detail," Mar. 24, 2011, RaserGrid Blogosphere, pp. 1-8, [retrieved on Aug. 22, 2018], Retrieved from the Internet: URL:http://rastergrid.com/blog/2010/10/gpu-based-dynamic-geometry-lod/.

* cited by examiner

SYSTEMS AND METHODS FOR RENDERING MULTIPLE LEVELS OF DETAIL

FIELD OF DISCLOSURE

The present disclosure relates generally to electronic devices. More specifically, the present disclosure relates to systems and methods for rendering multiple levels of detail.

BACKGROUND

Some electronic devices (e.g., smart phones, computers, televisions, automobiles, videogame systems, media players, cameras, cellular phones, personal cameras, set-top boxes, projectors, monitors, etc.) display images. For example, a smartphone may capture and/or process still and/or video images. Processing images may demand a relatively large amount of time, memory and energy resources. The resources demanded may vary in accordance with the complexity of the processing.

Processing large amounts of image data may be particularly difficult. For example, large amounts of image data may require relatively large amounts of resources, such as power, time, processor bandwidth, memory and/or monetary costs. As can be observed from this discussion, systems and methods that improve image processing may be beneficial.

SUMMARY

An electronic device is described. The electronic device includes a memory. The electronic device also includes a very long instruction word (VLIW) circuit including an asynchronous memory controller. The asynchronous memory controller is configured to asynchronously access the memory to render different levels of detail.

The electronic device may include a non-uniform frame buffer controller configured to dynamically access different subsets of a frame buffer. The different subsets may correspond to the different levels of detail. The electronic device may include a display configured to present the different levels of detail.

The non-uniform frame buffer controller may be configured to access at least one pixel of a first zone at a different rate from at least one pixel of a second zone. The first zone and the second zone may correspond to the different levels of detail. The non-uniform frame buffer controller may be configured to enable shader sub-routine swapping when processing of a first pixel is ongoing and processing of a second pixel is completed.

The non-uniform frame buffer controller may be configured to substitute a processed first sample of a first pixel for a second sample of a second pixel to avoid processing the second sample of the second pixel. The first pixel may have a different number of samples than the second pixel. The non-uniform frame buffer controller may be included in a composition/decomposition (C/D) block, may be included in the memory, or may be separate from the C/D block and the memory.

The VLIW circuit may include a tessellation control shader (TCS), tessellator (TESS), tessellation evaluation shader (TES), a geometry shader (GS), a rasterizer, and a fragment shader (FS). One or more of the TCS, TESS, TES, GS, rasterizer, and FS may include the asynchronous memory controller.

The memory may be included in the VLIW circuit. The asynchronous memory controller may be configured to access a level of detail (LOD) parameter in the memory asynchronously.

The VLIW circuit may include a tessellation control shader (TCS), tessellator (TESS), tessellation evaluation shader (TES), a geometry shader (GS), a rasterizer, a fragment shader (FS), and a tiler. One or more of the TCS, TESS, TES, GS, rasterizer, FS, and tiler may include the asynchronous memory controller.

The memory may be system memory. The asynchronous memory controller may be configured to access a level of detail (LOD) parameter in the memory asynchronously. The asynchronous memory controller may be configured to asynchronously access parameter data during processing of a set of data.

The VLIW circuit may be configured to perform non-uniform level of detail tessellation across a zone boundary between a first zone and a second zone in a single data set. The first zone and the second zone may correspond to different levels of detail. The VLIW circuit may be configured to perform non-uniform level of detail tessellation in a single data set when a level of detail of a draw call changes during processing the single data set based on eye tracking.

The VLIW circuit may be configured to render the different levels of detail in a single draw call. The electronic device may include a frame buffer configured to store pixels with different levels of detail in different subsets of the frame buffer.

A method performed by an electronic device is also described. The method includes obtaining geometry data. The method also includes asynchronously accessing memory to render different levels of detail.

A computer-program product is also described. The computer-program product includes a non-transitory tangible computer-readable medium with instructions. The instructions include code for causing an electronic device to obtain geometry data. The instructions also include code for causing the electronic device to asynchronously access memory to render different levels of detail.

An apparatus is also described. The apparatus includes means for obtaining geometry data. The apparatus also includes means for asynchronously accessing memory to render different levels of detail.

DETAILED DESCRIPTION

Figure 1:
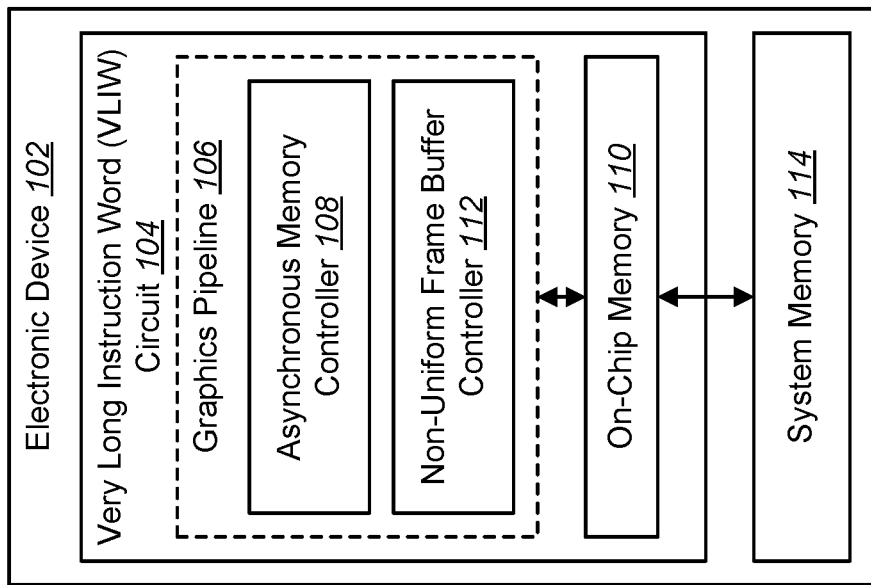
FIG. 1 is a block diagram illustrating one configuration of an electronic device in which systems and methods for rendering multiple levels of detail may be implemented.

The systems and methods disclosed herein may provide approaches for rendering multiple levels of detail. For example, multiple different levels of detail may be rendered in the same image. This may improve rendering efficiency and/or user experience. As used herein, the term "render" and variations thereof may mean performing one or more operations for producing image data. For example, rendering may include performing one or more operations to convert geometry data (e.g., geometrical models, vertices, polygons, etc.) into image data (e.g., pixel data, pixels, visual domain data, etc.). The image data resulting from rendering may be presented on a display, stored and/or transmitted. For example, rendered image data may or may not be presented on a display immediately. Rendered image data may be stored (for later presentation on a display, for example), may be transmitted to another device (which may present the rendered image data on a display, for example) and/or may be presented on a display.

Rendering inefficiency may be one current problem. For example, virtual reality (VR) may include rendering two views of a scene, which may make content twice as slow to render. One approach may involve performing eye tracking (which may be performed accurately and cheaply), rendering three geometry passes with differing levels of coarseness, performing anti-aliasing, and blending together the three different frame buffer qualities. However, this approach may be inefficient since the multiple geometry passes may overlap, resulting in some pixels being processed repeatedly.

In some configurations, the systems and methods disclosed herein may provide approaches for single-pass multi-level of detail (multi-LOD) rendering (e.g., single-pass foveated rendering). For example, some approaches may utilize a tessellator (e.g., tessellation engine), multisample anti-aliasing (MSAA), dynamic kernel dispatch and/or a multi-resolution (e.g., non-uniform) frame buffer (e.g., frame buffer object (FBO)). In some approaches, only one geometry pass may be needed. This improvement may reduce geometry bandwidth usage and/or may reuse MSAA.

Some configurations of the systems and methods disclosed herein may offer one or more performance benefits. For example, hardware may be implemented that includes a multi-resolution FBO and/or dynamic kernel dispatch. This may reduce bandwidth consumption. For example, multiple (e.g., three) geometry passes may be collapsed into one using the tessellator (e.g., tessellation engine). Rasterization hardware anti-aliasing may be reused in some configurations. This may enable improvements on regular content rendering. Additionally or alternatively, dynamic dispatching of fragment kernels may reduce computation. These improvements may be particularly beneficial in the context of virtual reality (VR) and/or augmented reality (AR), where multiple views of a scene may be rendered at a time (for stereoscopic views, for example). In some configurations, VR and AR may be combined. The systems and methods disclosed herein may be beneficial, as the graphics processing industry searches for ways to provide immersive experiences.

The systems and methods disclosed herein also describe approaches for rendering multiple zones for presentation on windows. These systems and methods may be particularly beneficial in the context of vehicles to enhance the user experience in applications such as driver assistance and autonomous vehicles (e.g., self-driving cars).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for rendering multiple levels of detail may be implemented. Examples of the electronic device 102 include smart phones, computers (e.g., desktop computers, laptop computers, etc.), head-mounted displays (e.g., virtual reality (VR) headsets, augmented reality (AR) headsets, etc.), VR devices, AR devices, tablet devices, media players, televisions, automobiles, vehicles, cameras, video camcorders, digital cameras, cellular phones, personal cameras, action cameras, aircraft, drones, unmanned aerial vehicles (UAVs), healthcare equipment, gaming consoles, personal digital assistants (PDAs), set-top boxes, media players, etc. The electronic device 102 may include one or more components or elements. One or more of the components or elements may be implemented in hardware (e.g., circuitry), firmware and/or a combination of hardware and software (e.g., a processor with instructions).

In some configurations, the electronic device 102 may include a very long instruction word (VLIW) circuit 104 and system memory 114. The VLIW circuit 104 may be a circuit (e.g., processor) that implements instruction level parallelism. For example, the VLIW circuit 104 may execute instructions in parallel (e.g., concurrently). The VLIW circuit 104 may be coupled to (e.g., in electronic communication with) the system memory 114. The VLIW circuit 104 may be a device for rendering images. For example, the VLIW circuit 104 may convert geometry data (e.g., geometrical model(s), two-dimensional (2D) or three dimensional (3D) geometry data, vertices, polygons, etc.) into one or more images. The resulting image(s) may be presented on one or more displays. For example, the image(s) may be a single image to produce a 2D view or may be multiple images (e.g., stereoscopic images) to produce a 3D view. For example, the VLIW circuit 104 may produce multiple images (e.g., different views) for a stereoscopic view (e.g., one image for a left eye and another image for a right eye). It should be noted that the VLIW circuit 104 may render a series of images (e.g., video). The VLIW circuit 104 may be implemented in hardware or in a combination of hardware and software. One example of the VLIW circuit 104 is a graphics processing unit (GPU).

In some configurations, the electronic device 102 may perform one or more of the functions, procedures, methods, steps, etc., described in connection with one or more of FIGS. 2-5, 9, 11, 13 and 15-24. Additionally or alternatively, the electronic device 102 may include one or more of the structures described in connection with one or more of FIGS. 2-5, 9, 11, 13 and 15-24.

The system memory 114 may store instructions and/or data. Examples of system memory 114 include random access memory (RAM), dynamic random access memory (DRAM), synchronous dynamic random access memory (SDRAM), double data rate synchronous dynamic random access memory (DDR SDRAM), DDR2, DDR3, DDR4, static random access memory (SRAM), registers, read-only memory (ROM), erasable programmable read-only memory (EPROM), electrically erasable programmable read-only memory (EEPROM), NAND flash memory, NOR flash memory, etc. The VLIW circuit 104 may access (e.g., read from and/or write to) the system memory 114. The system memory 114 may be accessible by other elements (if any) of the electronic device 102, such as one or more processors (e.g., central processing units (CPUs)). The system memory 114 may be separate from the VLIW circuit 104. Examples of instructions and/or data that may be stored by the system memory 114 may include instructions, command data, geometry data (e.g., vertices, polygons, normals (e.g., object orientations), primitives, metadata, etc.), texture data, unordered access view data, rendering parameter(s) (e.g., level of detail parameter(s)), etc. In some configurations, the electronic device 102 (e.g., the system memory 114) may include one or more frame buffers. The frame buffer(s) may buffer (e.g., store) image data. The buffered image data may be presented on one or more displays.

The VLIW circuit 104 may include one or more elements for rendering images. Some examples of the elements may include a front end (FE), vertex processor (VPs, vertex fetcher (VF), vertex shader (VS), tessellation control shader (TCS), hull shader (HS), tessellator (e.g., tessellation engine) (TESS), tessellation evaluation shader (TES), domain shader (DS), geometry shader (GS), rasterizer (Rast), fragment shader (FS), pixel shader (PS), tiler, render output unit (ROP), clipper (Clip) and/or stream out (SOL), etc. In some configurations, one or more of these elements may be referred to as a graphics pipeline 106. It should be noted that the tessellator may be fixed function tessellation engine in some configurations. The tessellator (and/or one or more other elements of a graphics pipeline) may be implemented in hardware, software or a combination of hardware and software.

The VLIW circuit 104 may include on-chip memory 110. The on-chip memory 110 may be implemented on the VLIW circuit 104 to provide fast memory access. For example, the on-chip memory 110 may be accessed more quickly than the system memory 114. Examples of on-chip memory 110 may include random access memory (RAM), dynamic random access memory (DRAM), synchronous dynamic random access memory (SDRAM), double data rate synchronous dynamic random access memory (DDR SDRAM), DDR2, DDR3, DDR4, static random access memory (SRAM), registers, read-only memory (ROM), erasable programmable read-only memory (EPROM), electrically erasable programmable read-only memory (EEPROM), NAND flash memory, NOR flash memory, etc. In some configurations, the on-chip memory 110 may be implemented in multiple levels (e.g., level 1 (L1), cache, level 2 (L2) cache, level 3 (L3) cache, etc.). Examples of data that may be stored by the on-chip memory 110 may include geometry data (e.g., vertices, polygons, normals, primitives, metadata, etc.), texture data, unordered access view data, one or more rendering parameters (e.g., level of detail (LOD) parameter(s)), etc. In some configurations, the on-chip memory 110 may include one or more frame buffer(s) (in addition to or alternatively from the system memory 114, for example). The frame buffer(s) may buffer (e.g., store) image data. The buffered image data may be presented on one or more displays.

In some configurations, the VLIW circuit 104 may include an asynchronous memory controller 108. The asynchronous memory controller 108 may be implemented in hardware or a combination of hardware and software. The asynchronous memory controller 108 may be implemented in the VLIW circuit 104, separately from the VLIW circuit, or may be implemented partially in the VLIW circuit 104 and partially separate from the VLIW circuit 104. The asynchronous memory controller 108 may be configured to access memory (e.g., on-chip memory 110 and/or system memory 114) asynchronously. In some configurations, the asynchronous memory controller 108 operates "asynchronously" in the sense that the asynchronous memory controller 108 may access memory (e.g., parameter(s), level of detail (LOD) parameter(s), etc.) out of synchronization with a set of data that is being processed (e.g., tessellated). For example, the VLIW circuit 104 may periodically process sets of data. Processing (e.g., tessellating) a single set of data may be referred to as a draw call. For example, a draw call may be an instruction (e.g., a programmatic request, instruction, etc.) for the VLIW circuit 104 to process (e.g., render) a set of data. One or more parameters (e.g., LOD parameter, tessellation setting, one or more other parameters, etc.) may be associated with and/or set for the draw call. Accordingly, a draw call may establish a LOD to be rendered for the set of data, for example.

In known approaches, each set of data (e.g., draw call) has a fixed level of detail (LOD). In those approaches, the LOD for a set of data cannot change once processing has begun on that set of data (e.g., cannot change during a draw call). Additionally, each set of data may only have a single LOD in known approaches.

In accordance with the systems and methods disclosed herein, the asynchronous memory controller 108 may asynchronously access memory (e.g., on-chip memory 110 and/ or system memory 114) to enable rendering different levels of detail (e.g., different zones with different levels of detail) within a single data set (e.g., during processing of a draw call). For example, the asynchronous memory controller 108 may access memory (e.g., parameter(s), LOD parameter(s), etc.) after processing (e.g., tessellation, shading, etc.) on a set of data has begun and before processing on the set of the data is completed. This may allow the VLIW circuit 104 to change LOD during processing of a set of data to produce different LODs in one set of data. Each set of data may include multiple primitives (e.g., points, polygons, etc.). In some configurations, each set of data may (initially) have a single LOD assigned. However, the asynchronous memory controller 108 may assign a different LOD to a set of data during processing of that data set. In other words, the asynchronous memory controller 108 may change the LOD for a set of data (after processing (e.g., tessellation, shading, etc.) on that set of data has begun but before processing (e.g., tessellation, shading, etc.) on that set of data has completed). For example, the systems and methods disclosed herein may allow changing LOD on a per-pixel and/or per-primitive basis (even within a set of data, for instance). In some configurations, the parameters (e.g., parameter(s), LOD parameter(s), etc.) may be updated during processing. For example, a processor (e.g., central processing unit (CPU), digital signal processor (DSP), etc.) or any dedicated hardware block (e.g., any hardware that deals with sensor data (e.g., eye tracking sensor data, motion sensor data, etc.)) may update the parameters. The VLIW circuit 104 (e.g., GPU) may read (e.g., may always read, continuously read, periodically read, etc.) from a section of memory (e.g., on-chip memory 110 and/or system memory 114) that includes the parameters. Accordingly, the VLIW circuit 104 (e.g., GPU) may adjust accordingly per primitive instead of for an entire draw call. In some configurations, the VLIW circuit 104 may render different levels of detail in a single draw call.

The systems and methods disclosed herein may provide one or more benefits. For example, the asynchronous memory controller 108 may enable more efficient processing when rendering multiple LODs. In known approaches, multiple overlapping layers may be rendered, where each layer has a different LOD. Then, the overlapping layers may be blended. However, this approach is inefficient because the same data is rendered multiple times. In accordance with the systems and methods disclosed herein, different LODs may be rendered in a single pass. This may avoid re-rendering the same data and/or may avoid having to blend multiple layers with different levels of detail.

Additionally or alternatively, the systems and methods disclosed herein may allow asynchronously changing LOD. For example, rendering one or more zones of an image may be based on eye tracking. For instance, the electronic device 102 may render multiple zones with different levels of detail, where a zone with a highest level of detail is rendered in an area where a user is currently looking. The eye tracking may detect when a user changes gaze to look at a different part of the image. The systems and methods disclosed herein (e.g., the asynchronous memory controller 108) may immediately change the LOD rendered based on the eye tracking. For example, the VLIW circuit 104 may increase the LOD in an area of the image that the user has changed gaze to view, even during the processing of a data set. This may provide a better user experience. Additionally, the systems and methods disclosed herein (e.g., the asynchronous memory controller 108) may reduce the LOD in an area of the image that the user's gaze is no longer directed to. This may reduce unnecessary processing.

The VLIW circuit 104 may include a non-uniform frame buffer controller 112. The non-uniform frame buffer controller 112 (e.g., multi-resolution FBO) may be implemented in hardware or a combination of hardware and software. The non-uniform frame buffer controller 112 may be implemented in the VLIW circuit 104, separately from the VLIW circuit 104, or may be implemented partially in the VLIW circuit 104 and partially separate from the VLIW circuit 104. In some configurations, the non-uniform frame buffer controller 112 may be implemented as part of the graphics pipeline 106. Alternatively, the non-uniform frame buffer controller 112 may be implemented as part of the on-chip memory 110. In another implementation, the non-uniform frame buffer controller 112 may be implemented in the VLIW circuit 104 but separate from the graphics pipeline 106 and the on-chip memory 110.

The non-uniform frame buffer controller 112 may be configured to dynamically access different subsets of one or more frame buffer(s). In some configurations, the different subsets of a frame buffer may correspond to different levels of detail, zones with different levels of detail and/or different mipmap levels. For example, the non-uniform frame buffer controller 112 may be configured to operate on different subsets of a frame buffer dynamically. It should be noted that there may be two or more frame buffer subsets. In some configurations, different subsets of the non-uniform frame buffer may correspond to different views (e.g., a left eye view and a right eye view for stereoscopic rendering). The non-uniform frame buffer may improve bandwidth utilization. With a non-uniform frame buffer, for example, the left eye view and right eye view may be processed concurrently (e.g., simultaneously) and saved out to system memory 114 in one pass. Additionally or alternatively, for example, the non-uniform frame buffer may enable and/or improve memory utilization for rendering multiple LODs in one pass.

In some configurations, dynamically accessing different subsets of the frame buffer may include accessing at least one pixel of a first zone at a different rate from at least one pixel of a second zone. The first zone and the second zone may correspond to different levels of detail. For example, the non-uniform frame buffer controller 112 may enable pixels of one zone (with a higher LOD, for instance) to be processed at a higher rate than pixels of another zone (with a lower LOD, for instance). This approach may allow for power savings by slowing processing of one or more zones (e.g., lower-LOD zones). It should be noted that there may be pixels from two or more zones that may be accessed at two or more different rates.

Additionally or alternatively, dynamically accessing different subsets of the frame buffer may include enabling shader sub-routine swapping. For example, shader sub-routine swapping may be performed when processing of a first pixel is ongoing and process of a second pixel is completed. For example, a first subset of the frame buffer may be allocated for one or more pixels processed with a first shader sub-routine, while a second subset of the frame buffer may be allocated for one or more pixels processed with a second shader sub-routine. When processing of the one or more second shader sub-routine pixels is completed, the electronic device 102 may swap shader sub-routines to occupy the second subset of the frame buffer. This may provide more efficient processing by allowing frame buffer capacity to be utilized more efficiently. It should be noted that two or more subsets of the frame buffer may be utilized to enable sub-routine swapping for one or more of the subsets.

The non-uniform frame buffer controller 112 may be configured to substitute a processed first sample of a first pixel for a second sample of a second pixel to avoid processing the second sample of the second pixel. The first pixel may have a different number of samples than the second pixel. For example, a first pixel from a first zone may have a higher LOD than a neighboring second pixel from a second zone with a lower LOD. The non-uniform frame buffer controller 112 may replace the (unprocessed) sample of the second pixel with the (processed) sample of the first pixel. In this way, the non-uniform frame buffer controller 112 may reduce processing. It should be noted that the non-uniform frame buffer controller 112 may replace one or more (unprocessed) samples of one or more pixels with one or more (processed) samples of one or more other pixels.

In some configurations, the electronic device 102 may include and/or may be coupled to one or more displays (e.g., head-mounted displays). The display(s) may be configured to present the different levels of detail.

Figure 2:
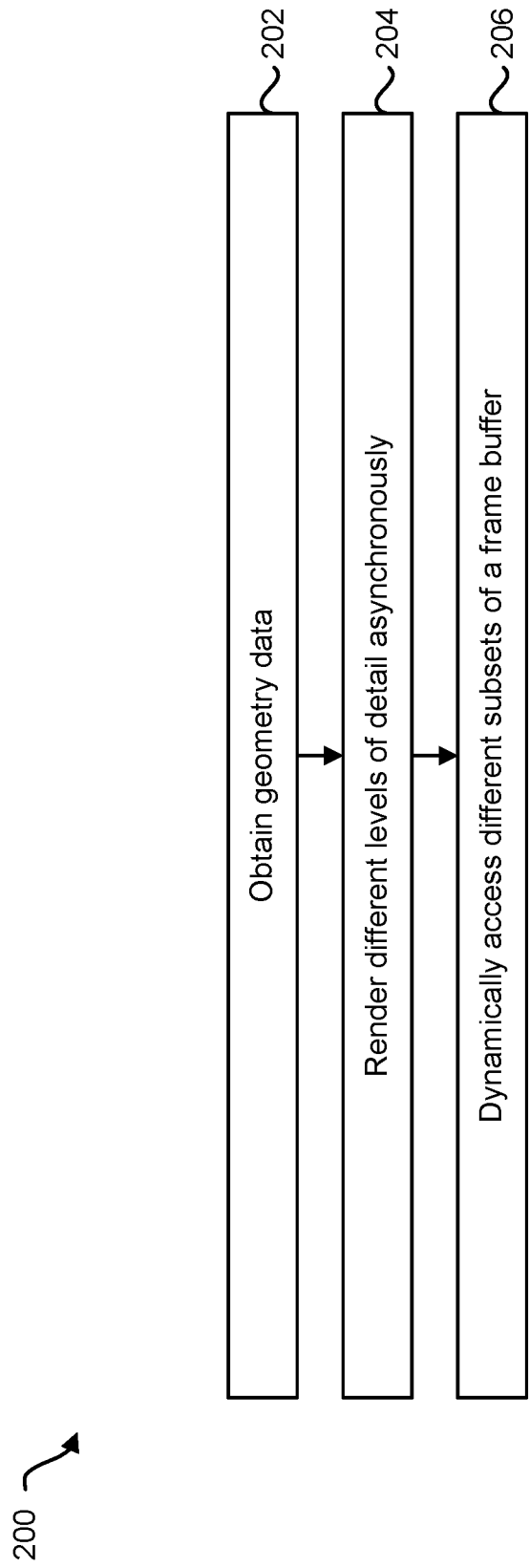
FIG. 2 is a flow diagram illustrating one configuration of a method for rendering multiple levels of detail.

FIG. 2 is a flow diagram illustrating one configuration of a method 200 for rendering multiple levels of detail. The method 200 may be performed by the electronic device 102 described in connection with FIG. 1.

The electronic device 102 may obtain 202 geometry data. For example, the electronic device 102 may load geometry data from storage (e.g., hard disk storage, removable storage such as an external hard drive, digital video disc (DVD) drive, Blu-Ray drive, compact disc (CD), thumb drive, etc.) into memory (e.g., system memory 114 and/or on-chip memory 110). Additionally or alternatively, the electronic device 102 may receive geometry data from another device. For example, the electronic device 102 may receive geometry data via a communication interface (e.g., Ethernet, Institute of Electrical and Electronics Engineers (IEEE) 802.11 interface, cellular network interface, etc.) and load the geometry data into memory (e.g., system memory 114 and/or on-chip memory 110). Examples of geometry data may include points, lines and/or polygons (e.g., triangles), etc.

The electronic device 102 may render 204 different levels of detail asynchronously. This may be accomplished as described above in connection with FIG. 1. For example, the electronic device 102 may asynchronously access the memory (e.g., system memory 114 and/or on-chip memory 110) to render different levels of detail. For instance, the electronic device 102 may change a LOD for a set of data during processing (where the set of data initially had a different LOD, for example). In some configurations, rendering 204 different levels of detail asynchronously may include performing dynamic LOD tessellation.

The electronic device 102 may dynamically access 206 different subsets of a frame buffer. This may be accomplished as described above in connection with FIG. 1. For example, the electronic device 102 may access at least one pixel of a first zone at a different rate from at least one pixel of a second zone. Additionally or alternatively, the electronic device 102 may enable shader sub-routine swapping when processing of a first pixel is ongoing and process of a second pixel is completed. Additionally or alternatively, the electronic device 102 may substitute a processed first sample of a first pixel for a second sample of a second pixel to avoid processing the second sample of the second pixel.

Figure 3:
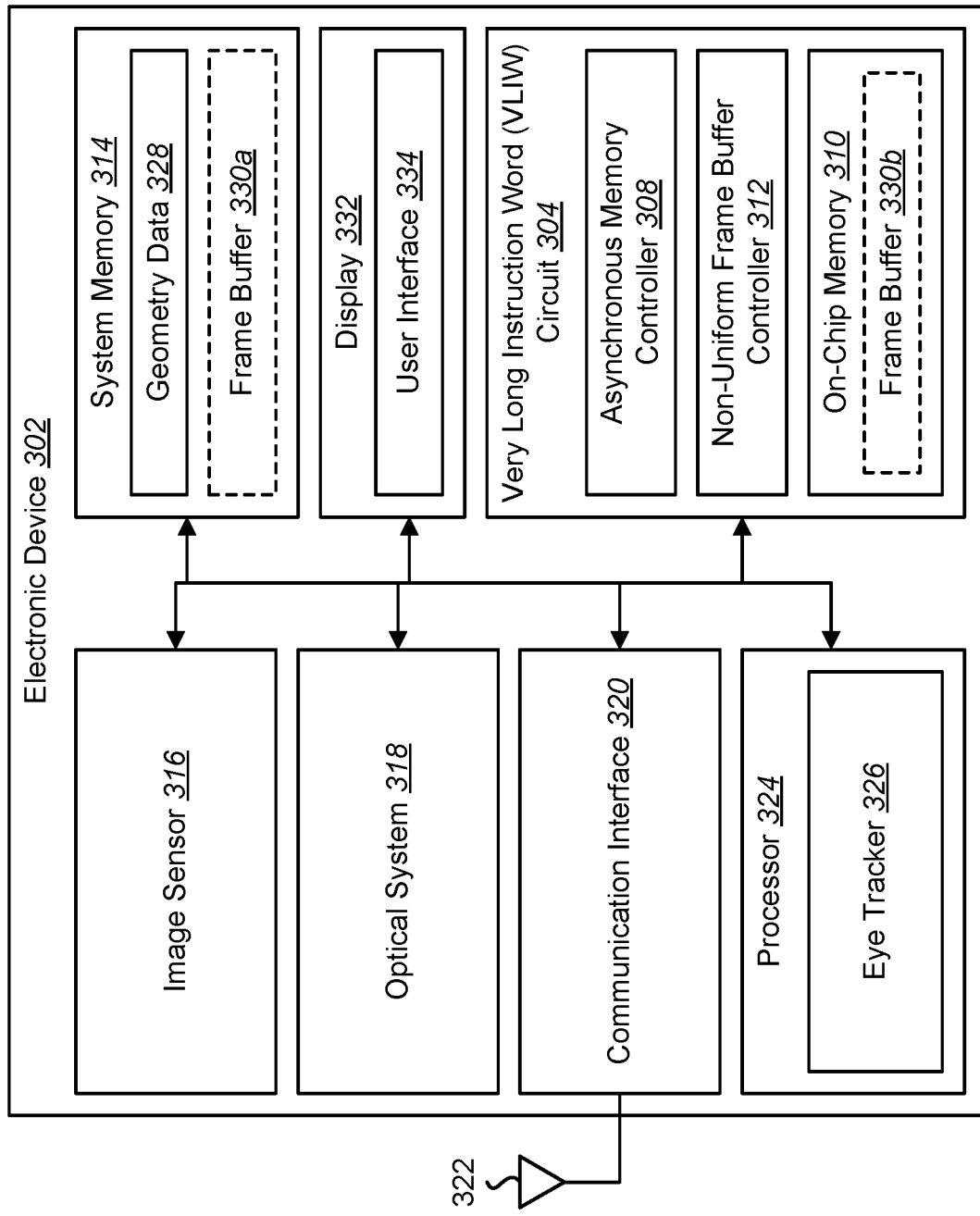
FIG. 3 is a block diagram illustrating one configuration of an electronic device in which systems and methods for rendering multiple levels of detail may be implemented.

FIG. 3 is a block diagram illustrating one configuration of an electronic device 302 in which systems and methods for rendering multiple levels of detail may be implemented. The electronic device 302 described in connection with FIG. 3 may be an example of the electronic device 102 described in connection with FIG. 1. In some configurations, one or more of the components or elements of the electronic device 302 may be similar to corresponding components or elements described in connection with FIG. 1. One or more of the components or elements may be implemented in hardware (e.g., circuitry) or a combination of hardware and software (e.g., a processor with instructions).

In some configurations, the electronic device 302 may include a very long instruction word (VLIW) circuit 304, system memory 314, one or more displays 332, one or more image sensors 316, one or more optical systems 318, one or more communication interfaces 320, one or more antennas 322 and/or one or more processors 324. Two or more of the elements or components described in connection with FIG. 3 may be in electronic communication with each other. For example, the VLIW circuit 304 may be coupled to (e.g., in electronic communication with) the system memory 314. The VLIW circuit 304 may be a device for rendering images as described above in connection with one or more of FIGS. 1 and 2. In some configurations, the resulting image(s) may be presented on the one or more displays 332. The VLIW circuit 304 may be separate from the processor 324 in some implementations. In other implementations, the VLIW circuit 304 may be integrated into the processor 324.

The communication interface 320 may enable the electronic device 302 to communicate with one or more other electronic devices. For example, the communication interface 320 may provide an interface for wired and/or wireless communications. In some configurations, the communication interface 320 may be coupled to one or more antennas 322 for transmitting and/or receiving radio frequency (RF) signals. Additionally or alternatively, the communication interface 320 may enable one or more kinds of wireline (e.g., Universal Serial Bus (USB), Ethernet, Video Graphics Array (VGA), Digital Visual Interface (DVI), High Definition Multimedia Interface (HDMI), DisplayPort, Mobile High-Definition Link (MHL), etc.) communication.

In some configurations, multiple communication interfaces 320 may be implemented and/or utilized. For example, one communication interface 320 may be a cellular (e.g., 3G, Long Term Evolution (LTE), CDMA, etc.) communication interface 320, another communication interface 320 may be an Ethernet interface, another communication interface 320 may be a universal serial bus (USB) interface, yet another communication interface 320 may be a wireless local area network (WLAN) interface (e.g., Institute of Electrical and Electronics Engineers (IEEE) 802.11 interface), and yet another communication interface 320 may be a Bluetooth interface.

In some configurations, the electronic device 302 may perform one or more of the functions, procedures, methods, steps, etc., described in connection with one or more of FIGS. 1, 3-5, 9, 11, 13 and 15-24. Additionally or alternatively, the electronic device 302 may include one or more of the structures described in connection with one or more of FIGS. 1, 3-5, 9, 11, 13 and 15-24.

The system memory 314 may store instructions and/or data. The system memory 314 described in connection with FIG. 3 may be an example of the system memory 114 described in connection with FIG. 1. The VLIW circuit 304 may access (e.g., read from and/or write to) the system memory 314. The system memory 314 may also be accessible by the processor(s) 324. The system memory 314 may store geometry data 328. In some configurations, the system memory 314 may include a frame buffer 330a. The frame buffer 330a may be a portion of the system memory 314 for storing image data. The buffered image data may be presented on the one or more displays 332 in some configurations.

The VLIW circuit 304 may include one or more elements for rendering images. Some examples of the elements may include a front end (FE), vertex processor (VPs, vertex fetcher (VF), vertex shader (VS), tessellation control shader (TCS), hull shader (HS), tessellator (e.g., tessellation engine) (TESS), tessellation evaluation shader (TES), domain shader (DS), geometry shader (GS), rasterizer (Rast), fragment shader (FS), pixel shader (PS), tiler, render output unit (ROP), clipper (Clip) and/or stream out (SOL), etc. In some configurations, one or more of these elements may be referred to as a graphics pipeline.

The VLIW circuit 304 may include on-chip memory 310. The on-chip memory 310 described in connection with FIG. 3 may be an example of the on-chip memory 110 described in connection with FIG. 1. In some configurations, the on-chip memory 310 may include a frame buffer 330b (in addition to or alternatively from the frame buffer 330a in system memory 314, for example). The frame buffer may be a portion of the on-chip memory 310 for storing image data. The buffered image data may be presented on the one or more displays 332 in some configurations.

In some configurations, the VLIW circuit 304 may include an asynchronous memory controller 308. The asynchronous memory controller 308 may be implemented in hardware or a combination of hardware and software. The asynchronous memory controller 308 may be implemented in the VLIW circuit 304, separately from the VLIW circuit, or may be implemented partially in the VLIW circuit 304 and partially separate from the VLIW circuit 304. The asynchronous memory controller 308 may be configured to access memory (e.g., on-chip memory 310 and/or system memory 314) asynchronously. It should be noted that the asynchronous memory controller 308 may utilize (e.g., access) the on-chip memory 110 and/or the system memory 114 (e.g., either or both). Some configurations may depend on a use case. For example, if sensor data (e.g., image sensor 316 data) is being written at a high rate (e.g., 1000 hertz (Hz)), then caching may waste time, battery and/or other resources. The asynchronous memory controller 308 described in connection with FIG. 3 may be an example of the asynchronous memory controller 108 described in connection with FIG. 1. The asynchronous memory controller 308 described in connection with FIG. 3 may operate as described in connection with the asynchronous memory controller 108 described in connection with FIG. 1.

The VLIW circuit 304 may include a non-uniform frame buffer controller 312. The non-uniform frame buffer controller 312 may be implemented in hardware or a combination of hardware and software. The non-uniform frame buffer controller 312 may be implemented in the VLIW circuit 304, separately from the VLIW circuit 304, or may be implemented partially in the VLIW circuit 304 and partially separate from the VLIW circuit 304. In some configurations, the non-uniform frame buffer controller 312 may be implemented as part of the graphics pipeline. Alternatively, the non-uniform frame buffer controller 312 may be implemented as part of the on-chip memory 310. In another implementation, the non-uniform frame buffer controller 312 may be implemented in the VLIW circuit 304 but separate from the graphics pipeline 306 and the on-chip memory 310. The non-uniform frame buffer controller 312 described in connection with FIG. 3 may be an example of the non-uniform frame buffer controller 112 described in connection with FIG. 1. The non-uniform frame buffer controller 312 described in connection with FIG. 3 may operate as described in connection with the non-uniform frame buffer controller 112 described in connection with FIG. 1.

In some configurations, the electronic device 302 may perform single-pass multi-LOD rendering. Multi-LOD rendering may include rendering different zones of an image with different levels of detail. Single-pass multi-LOD rendering may include rendering different zones with different levels of detail (e.g., tessellated levels of detail) in a single pass (without repeatedly processing any pixel, for example). Single-pass foveated rendering may be an example of single-pass multi-LOD rendering, where different zones with different levels of detail may be based on eye tracking. For example, a zone may be a circular area (or an area of another shape) approximately centered on the point of a display (e.g., image) where the user is looking. Additionally or alternatively, single-pass rendering (e.g., single-pass multi-LOD rendering) may include performing one pass (e.g., processing pass) over the data and/or texture to be rendered, even though both a left-eye view and a right-eye view need to be rendered. Accordingly, some configurations of the systems and methods disclosed herein may utilize as much of the data for both eye views as much as possible before moving the data between system memory and on-chip memory (e.g., GPU memory). In some configurations, the asynchronous memory controller 308 and/or the non-uniform frame buffer controller 312 may enable the performance of single-pass multi-LOD rendering (e.g., single-pass foveated rendering). For example, the asynchronous memory controller 308 may allow reading parameter(s) (e.g., level of detail (LOD) parameter(s)) from a volatile memory block (e.g., dynamically adapting during a draw call). For instance, the asynchronous memory controller 308 may allow one or more of a tessellation control shader (TCS), tessellator (TESS), tessellation evaluation shader (TES), geometry shader (GS), rasterizer and fragment shader (FS) to access one or more parameters from a volatile memory block (e.g., to dynamically adapt during a draw call).

In some configurations, the VLIW circuit 304 may include a rasterizer. The rasterizer may enable MSAA to perform more sampling of the primitives, which in turn may activate more fragment shader (FS) evaluations. Additionally sampling of the primitives may be performed to avoid artifacts like jaggies, which are due to not enough samples being processed and averaged.

The electronic device 302 may obtain one or more images (e.g., digital images, image frames, video, etc.). The one or more images may be images of one or more users and/or a scene (e.g., one or more objects and/or background). For example, the electronic device 302 may include one or more image sensors 316 and/or one or more optical systems 318 (e.g., lenses) that focus images of objects that are located within the field of view of the optical system(s) 318 onto the image sensor(s) 316. In some configurations, the image sensor(s) 316 may capture the one or more images. The image sensor(s) 316 and/or optical system(s) 318 may be coupled to and/or controlled by the processor 324.

Additionally or alternatively, the electronic device 302 may request and/or receive the one or more images from another device (e.g., an external image sensor coupled to the electronic device 302, a network server, traffic camera, drop camera, automobile camera, web camera, etc.). In some configurations, the electronic device 302 may request and/or receive the one or more images via the communication interface 320. For example, the electronic device 302 may or may not include a camera (e.g., an image sensor 316 and/or optical system 318) and may receive images from a remote device.

In some configurations, the one or more image sensors 316 included in the electronic device 302 and/or one or more other image sensors coupled to the electronic device 302 may be oriented to capture one or more images of a user. For example, a smartphone may include a camera mounted on the same face as a display (e.g., display 332). In this way, the camera may capture images of a user while the user is looking at the display. In another example, a camera may be mounted in a console and/or steering wheel of a vehicle to capture images of a user (e.g., driver).

Additionally or alternatively, the one or more image sensors 316 included in the electronic device 302 and/or one or more other image sensors coupled to the electronic device 302 may be oriented to capture scenery. For example, one or more cameras may be mounted on the back side of a smart phone. In another example, one or more cameras may be mounted on the exterior of a vehicle. In some configurations, the electronic device 302 may utilize the images of scenery in augmented reality (AR) applications, virtual reality (VR) applications and/or other applications (e.g., surround view visualization, driver assistance, advanced driver assistance systems (ADAS), etc.).

In some configurations, the image(s) captured by the image sensor(s) 316 and/or received via the communication interface(s) 320 may be utilized by the electronic device 302 for eye tracking. For example, the processor 324 may include and/or implement an eye tracker 326. The eye tracker 326 may track the gaze (e.g., look direction) of one or more users' eye(s). For example, the eye tracker 326 may locate the eye(s) of one or more users in the image(s) and may estimate the gaze (e.g., look direction) of the user(s). For instance, the eye tracker 326 may determine (e.g., estimate) where a user is looking on a display (e.g., display 332 or an external display) and/or where a user is looking on an image presented by a display. In other words, the eye tracker 326 may determine (e.g., estimate) where a user's gaze is directed relative to an image and/or a display.

The systems and methods disclosed herein may allow asynchronously changing LOD and/or rending multiple levels of detail in a single pass. In some configurations, rendering one or more zones of an image may be based on eye tracking. The zones of the image may have different levels of detail. For instance, the electronic device 302 may render multiple zones with different levels of detail, where a zone with a highest level of detail is rendered in an area where a user is currently looking. In some configurations, this may be referred to as foveated rendering. The eye tracker 326 may produce eye tracking information. The eye tracking information may indicate where a user's gaze is directed (e.g., users' gazes are directed) relative to a display and/or image. In some configurations, the processor 324 and/or the VLIW circuit 304 may determine one or more LOD parameters based on the eye tracking information. The LOD parameter(s) may indicate a LOD to be rendered for one or more zones of an image. The LOD parameter(s) may be stored in system memory 314 and/or on-chip memory 310. The LOD parameter(s) may be updated asynchronously in relation to a set of data (e.g., draw call) that is being processed by the VLIW circuit 304. The asynchronous memory controller 308 may read the LOD parameter(s) (from the system memory 314 and/or on-chip memory 310) during the processing of the data set (e.g., draw call). For example, the asynchronous memory controller 308 may update tessellation settings during the processing of the data set (e.g., draw call).

The eye tracker 326 may detect when a user changes gaze to look at a different part of the image. The systems and methods disclosed herein (e.g., the asynchronous memory controller 308) may immediately change the LOD rendered based on the eye tracking (e.g., the eye tracking information and/or LOD parameter(s)). For example, the asynchronous memory controller 308 may read one or more parameters (e.g., LOD parameters), which may change during the processing of a data set (e.g., draw call). For instance, the VLIW circuit 304 may increase the LOD in an area (e.g., zone) of the image that the user has changed gaze to view, even during the processing of a data set. Additionally or alternatively, the systems and methods disclosed herein (e.g., the asynchronous memory controller 308) may reduce the LOD in an area (e.g., zone) of the image that the user's gaze is no longer directed to. In some configurations, a zone may be a circular area (or an area of another shape) approximately centered on the point of a display (e.g., image) where the user is looking. In other configurations, a zone may be the entire area of an image corresponding to a window that the user is viewing.

In some configurations, the electronic device 302 may include a camera application and/or a display 332. When the camera application is running, images of objects that are located within the field of view of the optical system 318 may be captured by the image sensor 316. The images that are being captured by the image sensor 316 may be presented on the display 332. In some configurations, these images may be displayed in rapid succession at a relatively high frame rate so that, at any given moment in time, the objects that are located within the field of view of the optical system 318 are presented on the display 332.

It should be noted that one or more of the elements illustrated in the electronic device 302 may be optional. For example, one or more of the elements illustrated in the electronic device 302 may or may not be included and/or implemented. Additionally or alternatively, one or more of the elements illustrated in the processor 324 and/or VLIW circuit 304 may be implemented separately from the processor 324 and/or VLIW circuit 304 (e.g., in other circuitry, on another processor, on a separate electronic device, etc.). For example, the image sensor 316, the optical system 318, the communication interface 320, the processor 324, the eye tracker 326 and/or the display 332 may not be implemented on the electronic device 302. In some configurations, the electronic device 302 may receive images and/or eye tracking information from another device. Additionally or alternatively, one or more displays may be implemented on one or more separate devices.

In some configurations, the electronic device 302 may present a user interface 334 on the display 332. For example, the user interface 334 may enable a user to interact with the electronic device 302. In some configurations, the display 332 may be a touchscreen that receives input from physical touch (by a finger, stylus or other tool, for example). Additionally or alternatively, the electronic device 302 may include or be coupled to another input interface. For example, the electronic device 302 may include a camera facing a user and may detect user gestures (e.g., hand gestures, arm gestures, eye tracking, eyelid blink, etc.). In another example, the electronic device 302 may be coupled to a mouse and may detect a mouse click. It should be noted that no user input may be necessary in some configurations.

In some configurations, the electronic device 302 may optionally include a motion sensor (e.g., gyroscope(s), accelerometer(s), etc.). For example, the motion sensor may detect motion and/or an orientation (of the electronic device 302, for instance). In some configurations, the image being rendered may be based on motion and/or orientation information. For example, the electronic device 302 may be a head-mounted display (e.g., a virtual reality (VR) headset, augmented reality (AR) headset, etc.), a vehicle (e.g., automobile, drone, airplane, etc.), a mobile device (e.g., smartphone) or other device that may utilize motion and/or orientation information to render an image. For instance, the motion and/or orientation information may indicate a general viewing direction in a rendered scene. The electronic device 302 may render the image based on this viewing direction in addition to or alternatively from the eye tracking information in some configurations. The use of a motion sensor may illustrate another aspect of the asynchronous operation of the asynchronous memory controller 308. For example, a motion sensor may provide motion information and/or orientation information to memory (e.g., system memory 314 and/or on-chip memory 310) at a particular rate (e.g., 1000 hertz (Hz)), while the VLIW circuit 304 may render frames at a comparatively lower rate (e.g., 30 frames per second (fps)). The asynchronous memory controller 308 may asynchronously change one or more rendering operations (e.g., tessellation) in the midst of rendering a set of data based on the motion information and/or orientation information.

Figure 4:
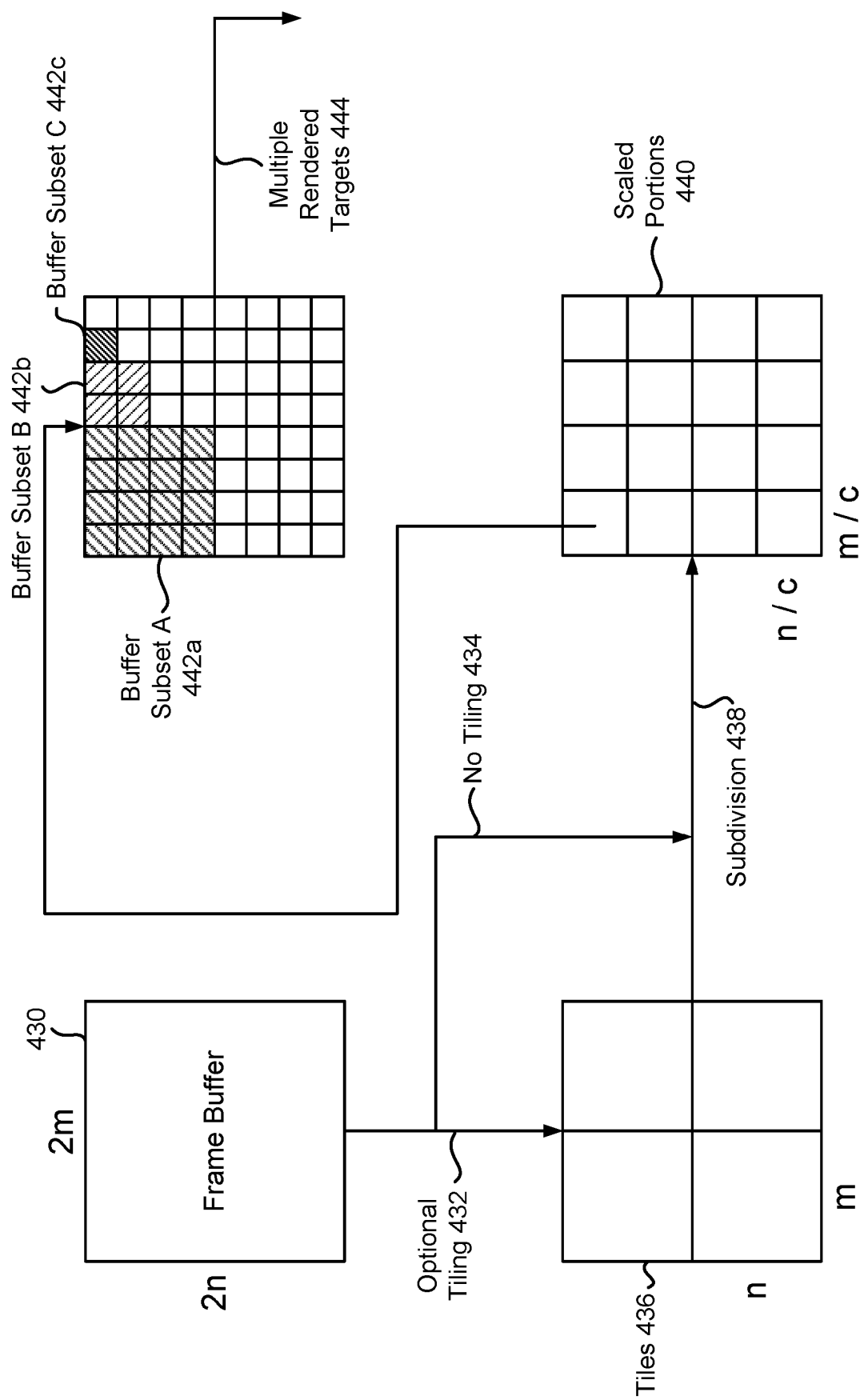
FIG. 4 is a diagram illustrating one example of a non-uniform frame buffer.

FIG. 4 is a diagram illustrating one example of a non-uniform frame buffer 430. In this example, the frame buffer 430 has a capacity of 2n×2m pixels. In some configurations, the electronic device 302 may optionally tile 432 the frame buffer 430 into tiles 436. In the example illustrated in FIG. 4, four tiles 436 of size (n, m) are illustrated. In some implementations, on-chip memory 310 or a portion of on-chip memory 310 may be limited to the size of a tile 436. Accordingly, the electronic device 302 may split the frame buffer 430 into tiles 436. In other implementations, the on-chip memory 310 or a portion of on-chip memory 310 may be large enough to accommodate the entire frame buffer 430 and no tiling 434 may be performed.

The electronic device 302 may subdivide 438 the frame buffer 430 and/or tiles 436 into scaled portions 440. For example, the frame buffer 430 and/or tiles 436 may be subdivided to fit multiple resolutions and/or levels of detail. In the example illustrated in FIG. 4, the scaled portions 440 are of size (n/c, m/c), where c is a scaling factor. The scaling factor c may vary and/or may be selected based on the configuration.

The electronic device 302 (e.g., non-uniform frame buffer controller 312) may dynamically access different subsets 442a-c of the frame buffer 430. In the example, illustrated in FIG. 4, the electronic device 302 may dynamically access buffer subset A 442a, buffer subset B 442b and buffer subset C 442c. It should be noted that fewer or more buffer subsets may be utilized. It should also be noted that all or only a portion of the frame buffer 430 may be occupied by buffer subsets. For example, the other non-hatched portions of the frame buffer may be utilized by one or more other subsets.

Dynamic access (e.g., reading and/or writing) of different frame buffer subsets (e.g., buffer subsets 442a-c) may enable one or more approaches to provide greater control and/or efficiency in rendering images. In some approaches, dynamic access of different frame buffer subsets may enable single-pass multi-LOD rendering. This is because rendering a zone at one LOD does not need to be completed before rendering another zone at a different LOD can be started. In this approach, one or more of the buffer subsets 442a-c may correspond to different image zones. For example, buffer subset A 442a may correspond to a zone with a highest LOD, buffer subset B 442b may correspond to a zone with a medium LOD and buffer subset C 442c may correspond to a zone with a lower LOD. For instance, the VLIW circuit 304 may render a highest LOD zone, which may be written to buffer subset A 442a while concurrently or sequentially rendering a medium LOD zone, which may be written to buffer subset B 442b. It should be noted that different LOD zones may be rendered in any order (e.g., from highest LOD to lowest, in reverse order or another order). Additionally or alternatively, dynamic access of different frame buffer subsets may allow processing different zones at different rates (e.g., a larger frame buffer subset may be allocated for one zone to be processed more quickly, while a smaller frame buffer subset may be allocated for another zone to be processed more slowly).

In some approaches, dynamic access of different frame buffer subsets may enable parallel shader processes (e.g., sub-routines). For instance, different shader processes may be executed in parallel, where one shader process accesses one subset of the frame buffer and another shader process accesses another subset of the frame buffer. Additionally or alternatively, dynamic access of different frame buffer subsets may allow shader sub-routine swapping. For example, a first shader sub-routine may be executed that accesses buffer subset A 442a. While the first shader sub-routine is ongoing, a second shader sub-routine that accesses buffer subset B 442b may finish. The second shader sub-routine may be swapped for another shader sub-routine (which may access buffer subset B 442b, for example) while the first shader sub-routine is ongoing. This may allow greater efficiency in utilizing the space of the frame buffer, rather than having to wait for a shader sub-routine to finish before another can be started.

In some approaches, dynamic access of different frame buffer subsets may enable sample substitution. For example, the non-uniform frame buffer controller 312 may swap one or more samples of a processed pixel for one or more samples of another pixel. In some configurations, the VLIW circuit 304 may perform anti-aliasing (e.g., multi-sample anti-aliasing (MSAA)). In performing anti-aliasing, different pixels may have different numbers of samples. For example, a first (e.g., "fine") pixel in buffer subset A 442a may have 4 samples and may use higher quality shading, while a nearby (e.g., neighboring) second (e.g., "coarse") pixel in buffer subset B 442b may have 1 sample and use lower quality shading. Instead of performing the processing (e.g., shading) on the second pixel, the non-uniform frame buffer controller 312 may substitute a sample of the first pixel for a sample of the second pixel. This may avoid performing any of the processing for the second pixel. Additionally or alternatively, the non-uniform frame buffer controller 312 may perform sample substitution in processing mipmaps. For example, the non-uniform frame buffer controller 312 may substitute a sample from a higher level (in buffer subset A 442a, for instance) for a sample from a lower level (in buffer subset B 442b, for instance). This may avoid some or processing at one or more lower levels.

The non-uniform frame buffer controller 312 may enable dynamic dispatch of shader processing (e.g., sub-routines, kernels, etc.), may enable pixel sample substitution and/or may provide a multi-LOD frame buffer. As illustrated in FIG. 4, the frame buffer 430 may store image data that may be streamed out as multiple rendered targets 444.

Listing (1) illustrates one example of pseudocode that illustrates one approach for non-uniform frame buffer functionality. It should be noted that GLSL is an abbreviation for OpenGL Shading Language and SSBO is an abbreviation for Shader Storage Buffer Object. Listing (1) illustrates how multiple zones with different levels of detail Listing (1)

```
void main( ) { //compute buffer_subset_A using GLSL + arbitrary
textures.
    //imageStore( )/color buffer/SSBO as a writing mechanism.
}
void main_lod_1(samplerTile/imageTile red_square) {
    //compute green square using GLSL + arbitrary textures
    //and possibly texture(red_square, uv)/imageRead( )
}
...
void main_lod_n(samplerTile last_square) {
    //"_lod_<n>( )" would be triggered after the rendering of level 0
(buffer_subset_A).
    //could be simulated via a full-screen triangle and changing viewport.
    //"_lod_<i>( )" can either execute forward [0 to n – 1] or reverse
    [n – 1 to 0].
}
```

Figure 5:
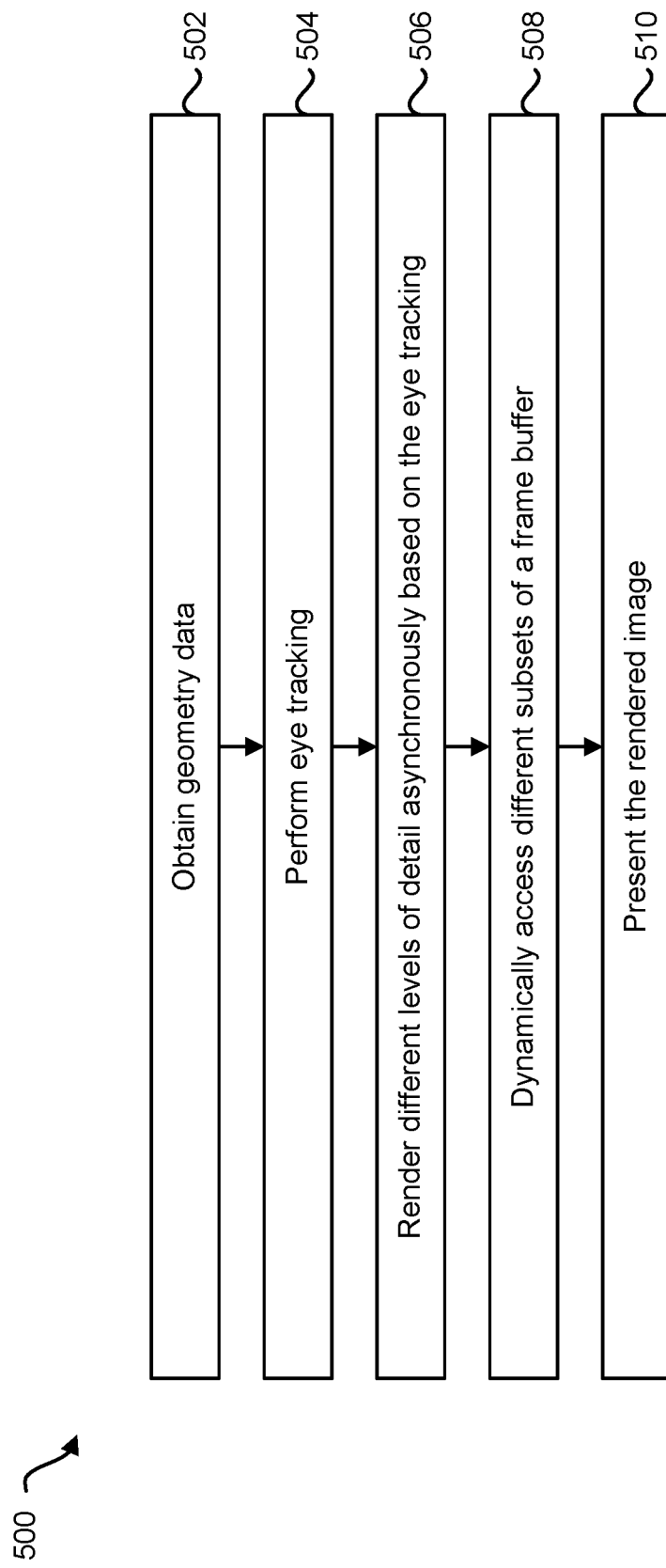
FIG. 5 is a flow diagram illustrating a more specific configuration of a method for rendering multiple levels of detail.

FIG. 5 is a flow diagram illustrating a more specific configuration of a method 500 for rendering multiple levels of detail. The method 500 may be performed by the electronic device 302 described in connection with FIG. 3.

The electronic device 302 may obtain 502 geometry data (e.g., geometry data 328). This may be accomplished as described in connection with one or more of FIGS. 1-3. For example, the electronic device 302 may load geometry data from storage into memory (e.g., system memory 314 and/or on-chip memory 310) and/or may receive geometry data from another device and load the geometry data into memory (e.g., system memory 314 and/or on-chip memory 310).

The electronic device 302 may perform 504 eye tracking. This may be accomplished as described in connection with FIG. 3. For example, the electronic device 302 may obtain (e.g., capture and/or receive) one or more images and may determine where a user's gaze is directed (e.g., where a user is looking on a display and/or an image being presented on the display) based on the one or more images.

The electronic device 302 may render 506 different levels of detail asynchronously based on the eye tracking. This may be accomplished as described above in connection with one or more of FIGS. 1-3. For example, the electronic device 302 may asynchronously access the memory (e.g., system memory 314 and/or on-chip memory 310) to render different levels of detail based on the eye tracking. For instance, the electronic device 302 may change a LOD for a set of data during processing (where the set of data initially had a different LOD, for example) when the zone for the set of data changes based on the eye tracking. In some configurations, the electronic device 302 may increase the LOD for the set of data when a user's gaze is directed to an area of the image corresponding to the set of data. Additionally or alternatively, the electronic device 302 may decrease the LOD for the set of data when a user's gaze direction moves away from an area of the image corresponding to the set of data.

In some configurations, rendering 506 different levels of detail asynchronously may include performing dynamic LOD tessellation. For example, the memory (e.g., system memory 314 and/or on-chip memory 310) may be updated to indicate a change in LOD tessellation parameter(s) (e.g., a degree of tessellation). The asynchronous memory controller 308 may access the updated LOD tessellation parameter to change the LOD tessellation asynchronously.

The electronic device 302 may dynamically access 508 different subsets of a frame buffer. This may be accomplished as described above in connection with one or more of FIGS. 1-4. For example, the electronic device 302 may access at least one pixel of a first zone at a different rate from at least one pixel of a second zone. Additionally or alternatively, the electronic device 302 may enable shader subroutine swapping when processing of a first pixel is ongoing and process of a second pixel is completed. Additionally or alternatively, the electronic device 302 may substitute a processed first sample of a first pixel for a second sample of a second pixel to avoid processing the second sample of the second pixel.

The electronic device 302 may present 510 the rendered image. For example, the electronic device 302 may stream out image data that has been rendered 506 with different levels of detail asynchronously. In some configurations, the image data may be provided to an integrated display 332. In other configurations, the image data may be provided to a remote display that is in communication with the electronic device 302. For example, the electronic device 302 may provide the image data to a display that is coupled to the electronic device 302 (via VGA, DVI, HDMI, etc.)

Figure 6:
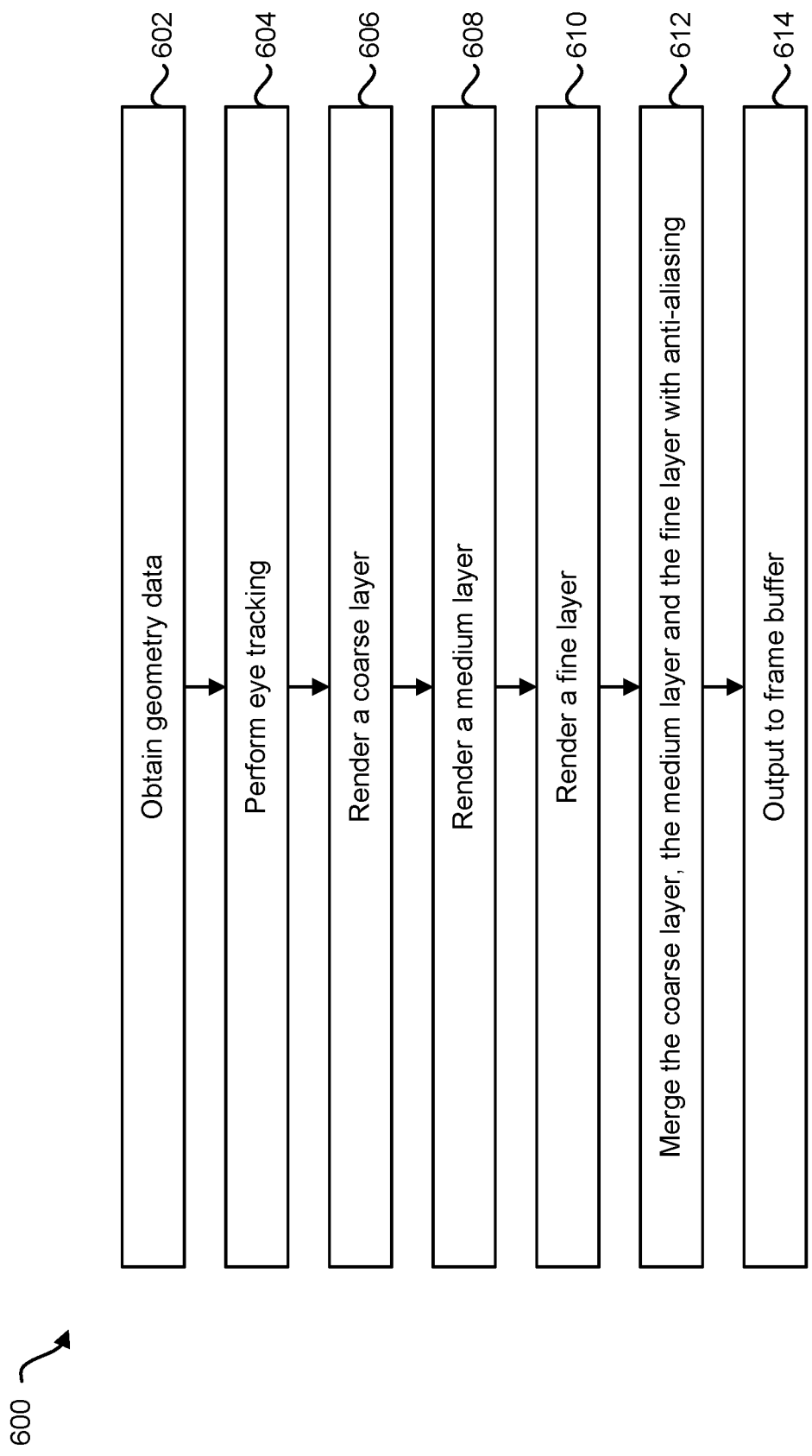
FIG. 6 is a flow diagram illustrating example of a method for foveated rendering.

FIG. 6 is a flow diagram illustrating example of a method 600 for foveated rendering. In this method, geometry data is obtained 602. Eye tracking is also performed 604. A coarse layer is rendered 606, a medium layer is rendered 608 and a fine layer is rendered 610. For example, the fine layer may be rendered 610 on an image where a user's gaze is directed. The medium layer may be rendered 608 in a larger area that overlaps the fine layer area. The coarse layer may be rendered 606 in an even larger area (e.g., the whole image) that includes the medium layer area and the fine layer area. Accordingly, there may be significant overlap between the layers. The coarse layer, the medium layer and the fine layer may be merged 612 with anti-aliasing. The resulting image may be output 614 to the frame buffer.

As can be observed, the method 600 may include rendering significant amounts of overlapping areas. For example, the fine detail area may be rendered three times: once at the coarse layer, once at the medium layer, and once at the fine layer. This may be inefficient as it performs multiple rendering passes over the same pixels.

Figure 7:
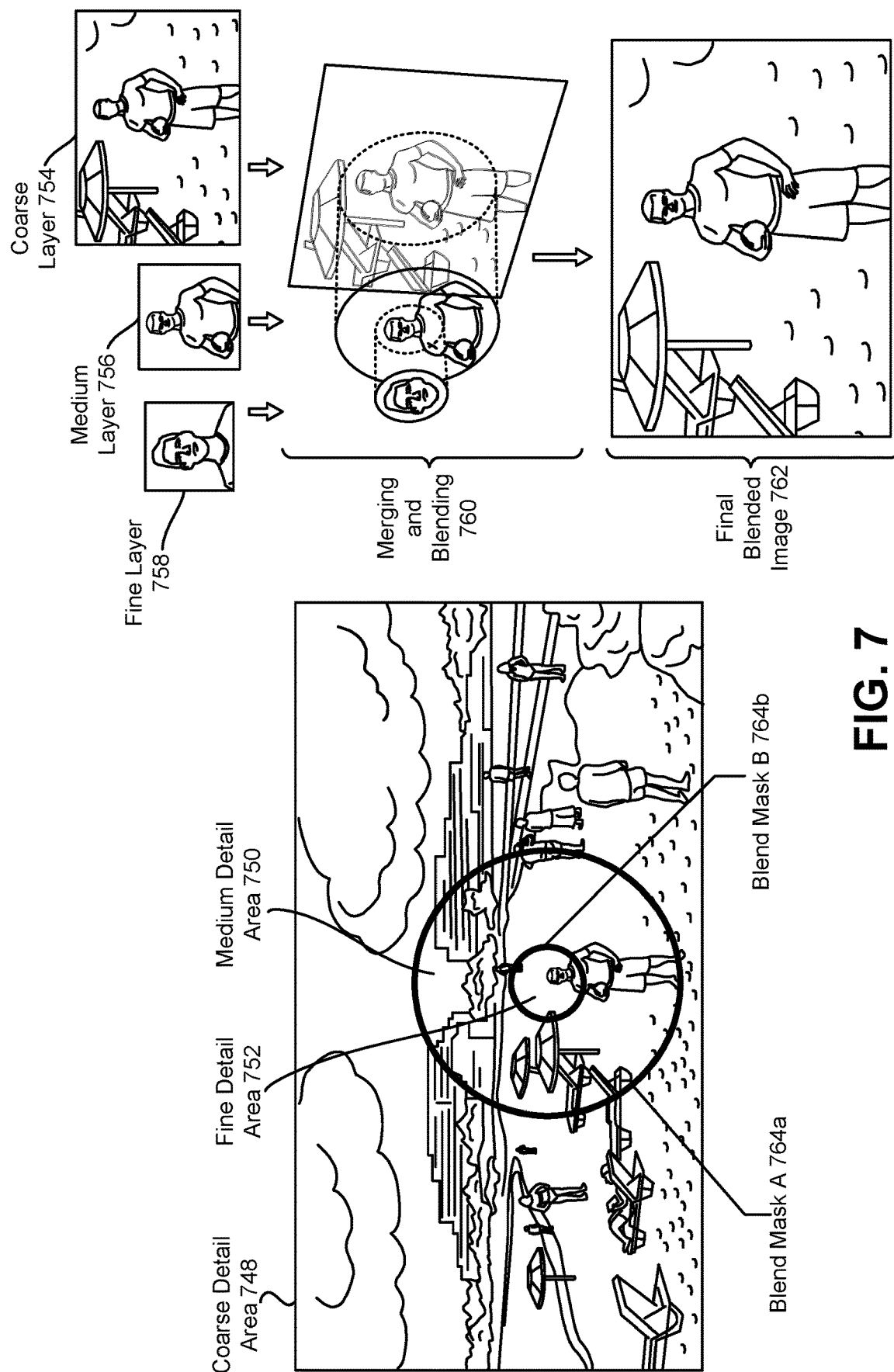
FIG. 7 illustrates one example of foveated rendering.

FIG. 7 illustrates one example of foveated rendering. In particular, FIG. 7 illustrates an example of a scene for foveated rendering. The scene for foveated rendering includes a coarse detail area 748, a medium detail area 750 and a fine detail area 752. As described in connection with FIG. 6, one approach to foveated rendering includes rendering the coarse layer 754, rendering the medium layer 756 and rendering the fine layer 758. Then, merging and blending 760 may be performed on the coarse layer 754, medium layer 756 and fine layer 758 to produce a final blended image 762. For example, blend mask A 764a between the medium layer 756 and coarse layer 754 may be used to blend the medium layer 756 and coarse layer 754. Additionally, blend mask B 764b between the medium layer 756 and fine layer 758 may be used to blend the medium layer 756 and fine layer 758. As can be observed, this approach renders the same pixels in multiple passes, leading to inefficiencies. It should be noted that one or more of the blend masks 764a-b may provide a weighted (e.g., gradual) blend in some configurations, where the blending weight increases from the outer edges of the blend masks to the inner area. It should also be noted that the coarse layer 754 and/or the final blended image 762 are illustrated in FIG. 7 as subsets of the entire scene for convenience. However, the coarse layer 754 and/or the final blended image 762 may cover the entire scene.

Figure 8:
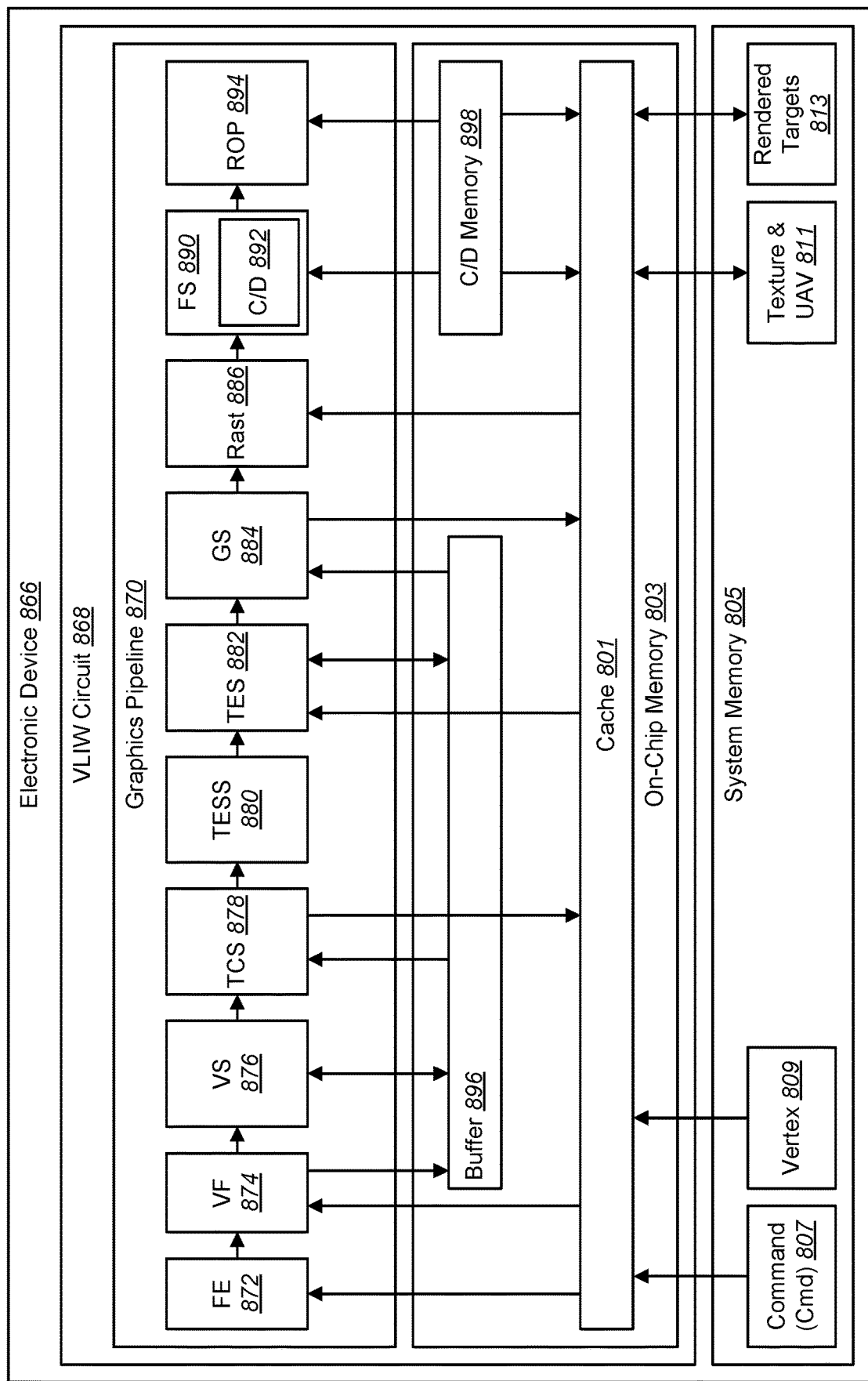
FIG. 8 is a block diagram illustrating an example of an electronic device including a very long instruction word (VLIW) circuit.

FIG. 8 is a block diagram illustrating an example of an electronic device 866 including a very long instruction word (VLIW) circuit 868. In particular, FIG. 8 illustrates one example of an architecture for graphics processing. One or more aspects of the architecture described in connection with FIG. 8 may function similar to aspects of Nvidia architecture. This architecture may provide immediate mode rendering (IMR) with a high-bandwidth design at the cost of power and die area. In this design, cache 801 may be utilized to reduce bandwidth (e.g., to avoid repeated sampling, reading from and/or writing to system memory 805). For example, the cache 801 may be large enough to accommodate data for an entire image frame. It should be noted that one or more of the graphics pipelines described herein may have one or more aspects similar to DirectX and/or OpenGL pipelines and/or application programming interfaces (APIs). U.S. Patent Application Publication Number 2014/0347363 describes some aspects of graphics processing that may have similarities with the DirectX pipeline.

The electronic device 866 may include a VLIW circuit 868 (e.g., GPU) and system memory 805 (e.g., DRAM). The VLIW circuit 868 may include a graphics pipeline 870 and on-chip memory 803. The graphics pipeline 870 may include one or more of a front-end (FE) 872, a vertex fetcher (VF) 874, vertex shader (VS) 876, tessellation control shader (TCS) 878, tessellator (TESS) 880 (e.g., tessellation engine), tessellation evaluation shader (TES) 882, geometry shader (GS) 884, rasterizer (Rast) 886, fragment shader (FS) 890 and render output unit (ROP) 894. Many of the element labels have been abbreviated for convenience. The on-chip memory 803 may include a buffer 896, composition/decomposition (C/D) memory 898 and cache 801. In some configurations, the buffer 896 may be and/or include a texture buffer, frame buffer and/or another block of on-chip memory 910. The system memory 805 may include command data (Cmd) 807, vertex data 809, texture data and unordered access view data 811 and rendered targets data 813.

In order to render a scene, the electronic device 866 may load command data 807 and vertex data 809 from the system memory 805 to the cache 801 in on-chip memory 803. The vertex data 809 may indicate one or more points (e.g., vertices), lines and/or polygons. The vertex data 809 may represent a scene and/or one or more objects in a scene.

The FE 872 may provide an interface between the cache 801 and the graphics pipeline 870 (e.g., VF 874). For example, the FE 872 may obtain data to be deformatted by the VF 874 and/or may control the VF 874 regarding the data (e.g., vertex data) that is retrieved from the cache 801.

The VF 874 may fetch vertex data from the cache 801 into the graphics pipeline 870. The VF 874 may access the buffer 896. For example, the VF may write data to the buffer 896. The VF 874 may provide the vertex data to the VS 876. Additionally or alternatively, the VS 876 may retrieve vertex data from the buffer 896.

The VS 876 may transform the vertex data into a different space. For example the VS 876 may transform the vertex data from three-dimensional (3D) space into a two-dimensional (2D) space. The VS 876 may provide the transformed vertex data to the TCS 878 and/or may store transformed vertex data in the buffer 896.

The TCS 878 may receive vertex data (e.g., transformed vertex data) from the VS 876 and/or from the buffer 896. The TCS 878 may transform the basis of the vertex data (e.g., the transformed vertex data). For example, the TCS 878 may transform the basis of the vertex data to a basis for tessellation (e.g., for efficiently subdividing polygons such as triangles). The TCS 878 may store information in the cache 801. For example, the TCS 878 may store a basis indicator that indicates the basis transformation performed by the TCS 878. The basis-transformed vertex data may be provided to the TESS 880.

The TESS 880 may tessellate the vertex data (e.g., basis-transformed vertex data). For example, the TESS 880 may generate more vertices based on the vertex data (e.g., may subdivide triangles into more triangles). The TESS 880 may operate based on a LOD parameter. The LOD parameter may specify the LOD and/or may indicate a degree of tessellation for the TESS 880 to perform. The tessellated vertex data may be provided to the TES 882.

The TES 882 may transform the basis of the vertex data (e.g., tessellated vertex data). For example, the TES 882 may transform the basis of the vertex data back to the basis before the basis transform applied by the TCS 878. In some configurations, the TES 882 may read the basis indicator from the cache 801 in order to transform (e.g., inverse transform) the basis of the vertex data. The TES 882 may provide vertex data (e.g., the inverse basis-transformed vertex data) to the GS 884 and/or store the vertex data in the buffer 896.

The GS 884 may perform one or more operations on the vertex data (e.g., the inverse basis-transformed vertex data). For example, the GS 884 may generate additional geometry based on the vertex data. The GS 884 may provide the vertex data (with additional geometry, for example) to the rasterizer 886 and/or the cache 801.

The rasterizer 886 may receive the vertex data from the GS 884 and/or the cache 801. The rasterizer 886 may rasterize the vertex data. For example, the rasterizer may convert the vertex data to pixel data. The pixel data may be provided to the FS 890.

The FS 890 may perform fragment shading or pixel shading on the pixel data. For example, the FS 890 may determine one or more attributes (e.g., color, brightness, transparency, etc.) of one or more pixels. In some configurations, the FS 890 may perform hidden surface removal (HSR). The FS 890 may include a composition/decomposition (C/D) block 892. Alternatively, the C/D 892 may be separate from the FS 890 and/or coupled to the FS 890.

In some configurations, the C/D 892 may perform operations such as texturing and/or blending. For example, the C/D 892 may blend multiple layers to determine a final pixel value. In some configurations, the C/D 892 may combine different frame buffers (e.g., may blend multiple images together per pixel). It should be noted the C/D 892 may be implemented on-chip (on the VLIW circuit 868), in the graphics pipeline 870, in the on-chip memory 803 and/or separate from the VLIW circuit 868. The C/D 892 may not be implemented in system memory 805 in some configurations. The C/D 892 may operate on image data before the image data is written out to system memory 805 and/or to another stream out (e.g., HDMI stream out). The FS 890 (and/or C/D 892) may access C/D memory 898. For example, the system memory 805 may provide texture data and/or unordered access view data 811 to the cache 801. The FS 890 may perform one or more operations by accessing the C/D memory and/or the cache 801. The FS 890 may provide the pixel data (e.g., processed pixel data) to the ROP 894.

The ROP 894 may output the pixel data (e.g., processed pixel data). For example, the ROP 894 may output the pixel data via the C/D memory 898 and/or cache 801 to system memory 805 as rendered targets data 813. The rendered targets data 813 may be provided (e.g., output) for presentation. For example, the rendered targets data 813 may be sent to a display for presentation.

It should be noted that without the systems and methods disclosed herein, the operations described in connection with FIG. 8 may be performed in terms of data sets (e.g., sets of vertex, pixel and/or image data), where each data set may have one or more established parameters for rendering (e.g., rendering parameter(s)). For example, each data set may have a fixed LOD assigned for tessellation operations. Accordingly, LOD may not be changed during rendering for a data set (e.g., during a draw call). This may result in multiple passes for rendering multiple LODs as described in connection with FIGS. 6-7, for example. Additionally or alternatively, a frame buffer (which may be implemented in the on-chip memory 803, buffer 896 and/or cache 801) may be uniform. For example, the frame buffer may include uniform data (e.g., data with the same LOD, data with the same number of pixel samples, data from the same shader sub-routine, etc.). For instance, subsets of the buffer may not be accessed independently (e.g., concurrently by different shader sub-routines). For example, the frame buffer may be uniform in a sense that only one data write to the frame buffer may occur at a time. Additionally or alternatively, the frame buffer may be uniform in the sense that each data write may only be from a single shader sub-routine at a time. Additionally or alternatively, the frame buffer may be uniform in the sense that each data write may only include data with the same LOD and/or with the same number of pixel samples.

Figure 9:
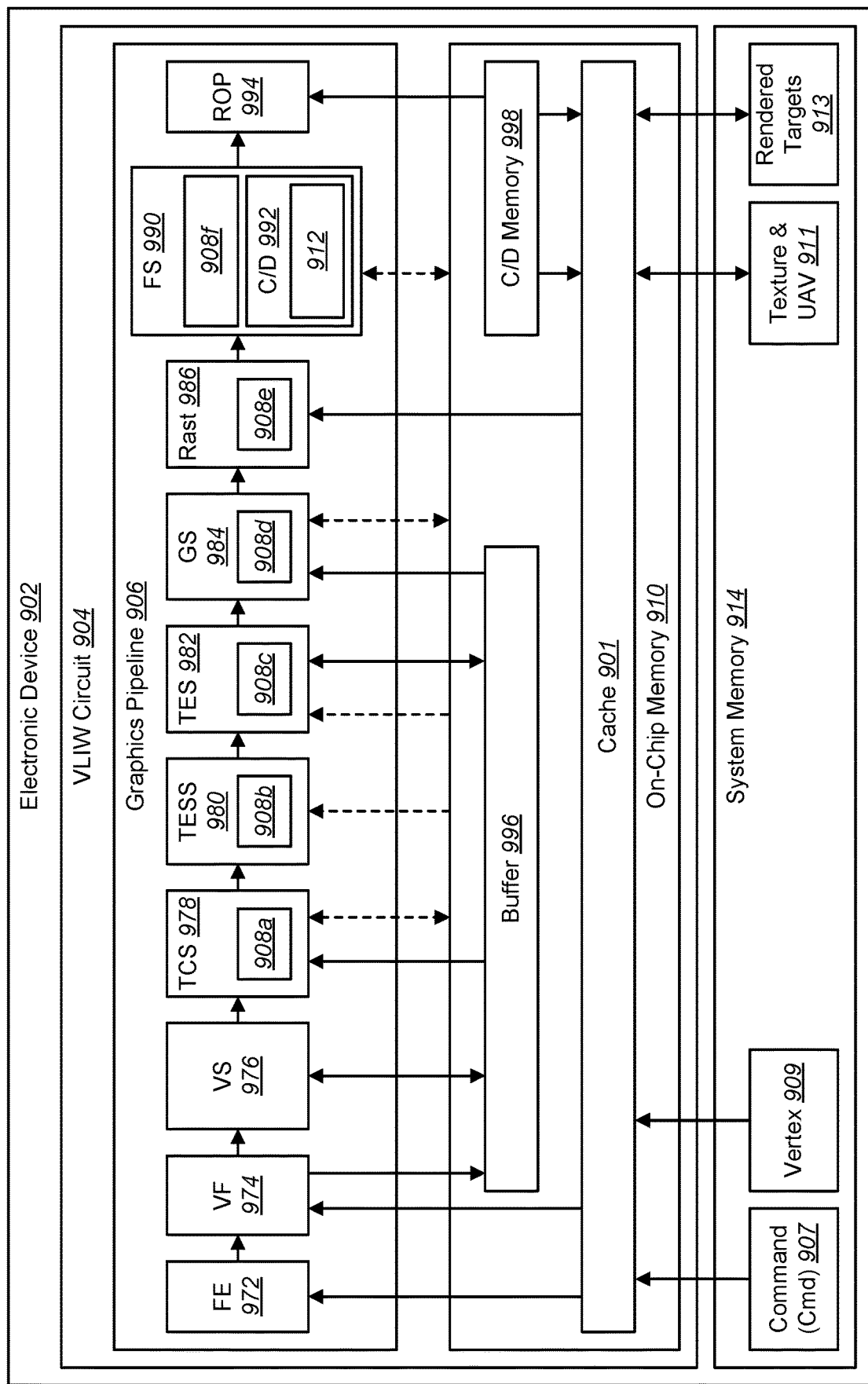
FIG. 9 is a block diagram illustrating an example of the systems and methods disclosed herein implemented in the architecture described in connection with FIG. 8.

FIG. 9 is a block diagram illustrating an example of the systems and methods disclosed herein implemented in the architecture described in connection with FIG. 8. Specifically, FIG. 9 illustrates an electronic device 902. The electronic device 902 described in connection with FIG. 9 may be an example of one or more of the electronic devices 102, 302 described above in connection with one or more of FIGS. 1-5. The electronic device 902 may be configured to perform one or more of the methods, functions, steps, operations, etc., described in connection with one or more of FIGS. 1-5.

The electronic device 902 may include a VLIW circuit 904 (e.g., a GPU) and system memory 914. The VLIW circuit 904 may be one example of one or more of the VLIW circuits 104, 304 described above in connection with one or more of FIGS. 1-5 Additionally or alternatively, the system memory 914 may be an example of one or more of the system memories 114, 314 described in connection with one or more of FIGS. 1-5. The system memory 914 may include command data (Cmd) 907, vertex data 909, texture & unordered access view data 911 and/or rendered target data 913. One or more of the command data (Cmd) 907, vertex data 909, texture & unordered access view data 911 and/or rendered target data 913 may be similar to corresponding data described in connection with FIG. 8.

The VLIW circuit 904 may include a graphics pipeline 906 and on-chip memory 910. The graphics pipeline 906 described in connection with FIG. 9 may be one example of one or more of the graphics pipelines 106, 306 described in connection with one or more of FIGS. 1-5. Additionally or alternatively, the on-chip memory 910 described in connection with FIG. 9 may be one example of one or more of the on-chip memories 110,310 described in connection with one or more of FIGS. 1-5.

The on-chip memory 910 may include a buffer 996, a cache 901 and/or a C/D memory 998. In some configurations, one or more of the on-chip memory 910, the buffer 996, the cache 901 and/or the C/D memory 998 may be similar to corresponding elements described in connection with FIG. 8. It should be noted that the on-chip memory 910 may include one or more frame buffers as described in connection with one or more of FIGS. 3-4. The frame buffer(s) may be included in one or more of the on-chip memory 910, the buffer 996, the cache 901 and/or the C/D memory 998. Additionally or alternatively, the frame buffer(s) may be included in the system memory 914. In some configurations, one or more frame buffers may be included in the on-chip memory 910, the system memory 914 or both.

The graphics pipeline 906 may include one or more of an FE 972, VF 974, VS 976, TCS 978, TESS 980, TES 982, GS 984, rasterizer 986, FS 990 and ROP 994. In some configurations, one or more of the FE 972, VF 974, VS 976, TCS 978, TESS 980, TES 982, GS 984, rasterizer 986, FS 990 and ROP 994 may perform one or more of the operations of one or more corresponding elements described in connection with FIG. 8.

In the configurations illustrated in FIG. 9, the VLIW circuit 904 (e.g., graphics pipeline 906) may include an asynchronous memory controller 908. The asynchronous memory controller 908 may be included and/or implemented in one or more of the TCS 978, the TESS 980, the TES 982, the GS 984, the rasterizer 986 and the FS 990. Completely or partially, for example, an asynchronous memory controller 908a may be implemented in the TCS 978, the TESS 980, the TES 982, the GS 984, the rasterizer 986 and/or the FS 990. The generic label "908" may denote that the asynchronous memory controller 908 may be implemented in any or all of the elements 908a-f illustrated in FIG. 9. In some configurations, the asynchronous memory controller 908 may be implemented only in one or more of the TCS 978, TESS 980, TES 982 and GS 984. For example, the asynchronous memory controller 908 may only asynchronously read one or more parameters in the TCS 978, TESS 980, TES 982 and/or GS 984, since data may be forwarded to later stages.

The asynchronous memory controller 908 described in connection with FIG. 9 may be an example of one or more of the asynchronous memory controllers 108, 308 described in connection with one or more of FIGS. 1-5. For example, the asynchronous memory controller 908 may asynchronously read one or more parameters (e.g., LOD parameters) from the on-chip memory 910 and/or the system memory 914 (during the processing of a data set, for instance). In some configurations, the updated parameter(s) may be provided to one or more of the TCS 978, the TESS 980, the TES 982, the GS 984, the rasterizer 986 and the FS 990. Accordingly, one or more of the TCS 978, the TESS 980, the TES 982, the GS 984, the rasterizer 986 and the FS 990 may change processing of the data set to be different from the processing initially established for a data set, while the data set is being processed.

In some configurations, this may enable the electronic device 902 to perform single-pass multiple-LOD rendering. For instance, the asynchronous memory controller 908 may read an LOD parameter that is different from another LOD parameter initially established for the set of data that is currently being processed and/or rendered (e.g., tessellated). The updated LOD parameter may be provided to one or more of the TCS 978, the TESS 980, the TES 982, the GS 984, the rasterizer 986 and the FS 990. Accordingly, one or more of the TCS 978, the TESS 980, the TES 982, the GS 984, the rasterizer 986 and the FS 990 may change processing (e.g., change tessellation level) of a data set according to the updated LOD parameter during processing of the data set that was initiated with one or more different parameters.

The VLIW circuit 904 (e.g., graphics pipeline 906) may include a non-uniform frame buffer controller 912. As illustrated in FIG. 9, the non-uniform frame buffer controller 912 may be included and/or implemented in the FS 990 (e.g., the C/D 992). It should be noted that the non-uniform frame buffer controller 912 may be additionally or alternatively included and/or implemented in one or more of the FS 990, C/D 992, graphics pipeline 906 and on-chip memory 910. Completely or partially, for example, a non-uniform frame buffer controller 912 may be implemented in one or more of the FS 990, C/D 992, graphics pipeline 906, on-chip memory 910 and the electronic device 902. The non-uniform frame buffer controller 912 may be implemented in the C/D 992. It should be noted that extra latency may be incurred otherwise.

The non-uniform frame buffer controller 912 described in connection with FIG. 9 may be an example of one or more of the non-uniform frame buffer controllers 112, 312 described in connection with one or more of FIGS. 1-5. For example, the non-uniform frame buffer controller 912 may dynamically access different subsets of one or more frame buffer(s). In some configurations, dynamically accessing different subsets of the frame buffer may include accessing at least one pixel of a first zone at a different rate from at least one pixel of a second zone. Additionally or alternatively, dynamically accessing different subsets of the frame buffer may include enabling dynamic shader sub-routine swapping (when processing of a first pixel is ongoing and process of a second pixel is completed, for example). Additionally or alternatively, the non-uniform frame buffer controller 912 may be configured to substitute a processed first sample of a first pixel for a second sample of a second pixel to avoid processing the second sample of the second pixel.

In some configurations, a dedicated cache may be implemented to handle specific textures and render targets. The cache may be as large as the set of textures themselves.

Figure 10:
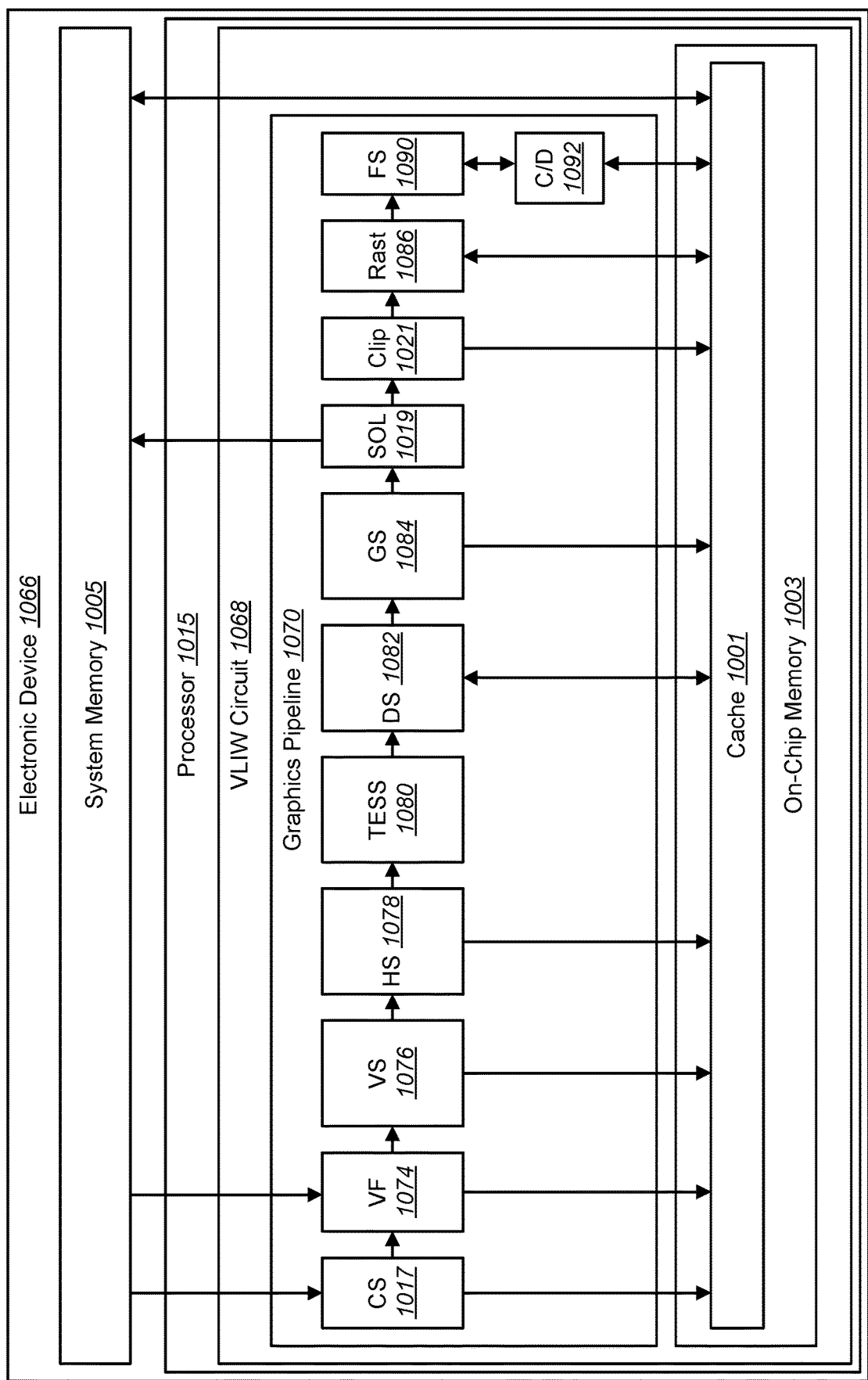
FIG. 10 is a block diagram illustrating another example of an electronic device including a very long instruction word (VLIW) circuit.

FIG. 10 is a block diagram illustrating another example of an electronic device 1066 including a very long instruction word (VLIW) circuit 1068. In particular, FIG. 10 illustrates another example of an architecture for graphics processing. One or more aspects of the architecture described in connection with FIG. 10 may function similar to aspects of Intel architecture. This architecture may provide immediate mode rendering (IMR) as well as a unified memory architecture (UMA) with shared physical and virtual memory. This architecture may enable zero-copy sharing as well as pointer-sharing.

The electronic device 1066 may include a processor 1015 (e.g., a CPU). In this example, the processor 1015 may include a VLIW circuit 1068. For example, the VLIW circuit 1068 may be integrated into the processor 1015.

The electronic device 1066 may include a VLIW circuit 1068 (e.g., GPU) and system memory 1005. The VLIW circuit 1068 may include a graphics pipeline 1070 and on-chip memory 1003. The graphics pipeline 1070 may include one or more of a command streamer (CS) 1017, a vertex fetcher (VF) 1074, vertex shader (VS) 1076, hull shader (HS) 1078, tessellator (TESS) 1080 (e.g., tessellation engine), domain shader (DS) 1082, geometry shader (GS) 1084, stream out (SOL) 1019, clipper (Clip) 1021, rasterizer (Rast) 1086 and fragment shader (FS) 1090. Many of the element labels have been abbreviated for convenience. The on-chip memory 1003 may include one or more buffers, one or more caches, etc. In some configurations, the on-chip memory 1003 may include a texture buffer, frame buffer and/or another block of on-chip memory 1110. The system memory 1005 may include command data, vertex data (e.g., geometry data) and/or texture data.

In order to render a scene, the electronic device 1066 may obtain command data and vertex data from the system memory. For example, the CS 1017 may receive and/or execute rendering command(s) from the system memory 1005. The vertex data may indicate one or more points (e.g., vertices), lines and/or polygons. The vertex data 1009 may represent a scene and/or one or more objects in a scene.

The VF 1074 may fetch vertex data from the system memory 1005 into the VLIW circuit 1068 (e.g., graphics pipeline 1070). The VF 1074 may provide the vertex data to the VS 1076 and/or may store the vertex data in the cache 1001.

The VS 1076 may transform the vertex data into a different space. For example the VS 1076 may transform the vertex data from three-dimensional (3D) space into a two-dimensional (2D) space. The VS 1076 may provide the transformed vertex data to the HS 1078 and/or may store transformed vertex data in the cache 1001.

The HS 1078 may receive vertex data (e.g., transformed vertex data) from the VS 1076 and/or from the cache 1001. The HS 1078 may transform the basis of the vertex data (e.g., the transformed vertex data). For example, the HS 1078 may transform the basis of the vertex data to a basis for tessellation (e.g., for efficiently subdividing polygons such as triangles). The HS 1078 may store information in the cache 1001. For example, the HS 1078 may store a basis indicator that indicates the basis transformation performed by the HS 1078. The basis-transformed vertex data may be provided to the TESS 1080.

The TESS 1080 may tessellate the vertex data (e.g., basis-transformed vertex data). For example, the TESS 1080 may generate more vertices based on the vertex data (e.g., may subdivide triangles into more triangles). The TESS 1080 may operate based on a LOD parameter. The LOD parameter may specify the LOD and/or may indicate a degree of tessellation for the TESS 1080 to perform. The tessellated vertex data may be provided to the DS 1082.

The DS 1082 may transform the basis of the vertex data (e.g., tessellated vertex data). For example, the DS 1082 may transform the basis of the vertex data back to the basis before the basis transform applied by the HS 1078. In some configurations, the DS 1082 may read the basis indicator from the cache 1001 in order to transform (e.g., inverse transform) the basis of the vertex data. In other configurations, the DS 1082 may be coupled directly to the HS 1078 and may receive the basis indicator from the HS 1078 in order to transform (e.g., inverse transform) the basis of the vertex data. The DS 1082 may provide vertex data (e.g., the inverse basis-transformed vertex data) to the GS 1084 and/or store the vertex data in the cache 1001.

The GS 1084 may perform one or more operations on the vertex data (e.g., the inverse basis-transformed vertex data). For example, the GS 1084 may generate additional geometry based on the vertex data. The GS 1084 may provide the vertex data (with additional geometry, for example) to the SOL 1019.

The SOL 1019 may stream the vertex data (with additional geometry, for example) to and/or store the vertex data in the system memory 1005. The SOL 1019 may provide the vertex data (with additional geometry, for example) to the clipper 1021.

The clipper 1021 may discard some of the vertex data (with additional geometry, for example). For example, the clipper 1021 may discard vertex data that lies outside of a view (e.g., viewing frustum). The clipper 1021 may provide the clipped vertex data to the rasterizer 1086 and/or the cache 1001.

The rasterizer 1086 may receive the clipped vertex data from the clipper 1021 and/or the cache 1001. The rasterizer 1086 may rasterize the vertex data. For example, the rasterizer may convert the vertex data to pixel data. The pixel data may be provided to the FS 1090 and/or to the cache 1001.

The FS 1090 may perform fragment shading or pixel shading on the pixel data. For example, the FS 1090 may determine one or more attributes (e.g., color, brightness, transparency, etc.) of one or more pixels. In some configurations, the FS 1090 may perform hidden surface removal (HSR). In some configurations, the FS 1090 may include a composition/decomposition (C/D) block 1092. Alternatively, the C/D 1092 may be separate from the FS 1090 and/or coupled to the FS 1090 as illustrated in FIG. 10.

In some configurations, the C/D 1092 may perform operations such as texturing and/or blending. For example, the C/D 1092 may blend multiple layers to determine a final pixel value. In some configurations, the C/D 1092 may combine different frame buffers (e.g., may blend multiple images together per pixel). It should be noted the C/D 1092 may be implemented on-chip (on the VLIW circuit 1068), in the graphics pipeline 1070, in the on-chip memory 1003 and/or separate from the VLIW circuit 1068. The C/D 1092 may operate on image data before the image data is written out to system memory 1005 and/or to another stream out (e.g., HDMI stream out). In some configurations, the system memory 1005 may provide texture data to the cache 1001, which may be accessed by the FS 1090 and/or the C/D 1092. The FS 1090 may perform one or more operations by accessing the cache 1001. The FS 1090 may provide the pixel data (e.g., processed pixel data) to the C/D 1092, which may perform composition/decomposition and provide the pixel data to the cache 1001.

The pixel data may be output via the cache 1001 to system memory 1005. The pixel data may be provided (e.g., output) for presentation. For example, the pixel data may be sent to a display for presentation.

It should be noted that without the systems and methods disclosed herein, the operations described in connection with FIG. 10 may be performed in terms of data sets (e.g., sets of vertex, pixel and/or image data) as described in connection with FIG. 8.

Figure 11:
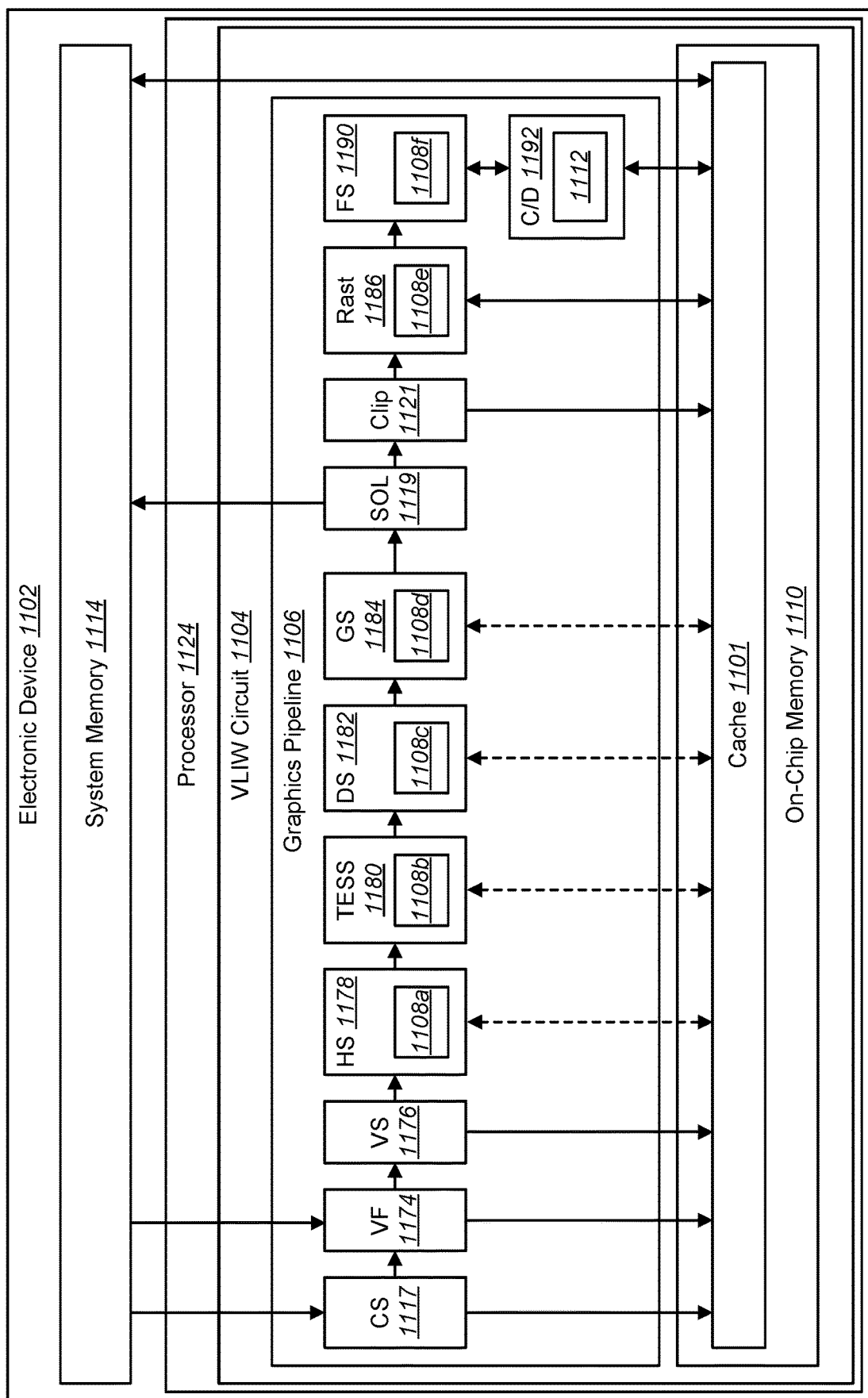
FIG. 11 is a block diagram illustrating another example of the systems and methods disclosed herein implemented in the architecture described in connection with FIG. 10.

FIG. 11 is a block diagram illustrating another example of the systems and methods disclosed herein implemented in the architecture described in connection with FIG. 10. Specifically, FIG. 11 illustrates an electronic device 1102. The electronic device 1102 described in connection with FIG. 11 may be an example of one or more of the electronic devices 102, 302 described above in connection with one or more of FIGS. 1-5. The electronic device 1102 may be configured to perform one or more of the methods, functions, steps, operations, etc., described in connection with one or more of FIGS. 1-5.

The electronic device 1102 may include a processor 1124 (e.g., a CPU). The processor 1124 may be one example of the processor 324 described in connection with FIG. 3. In this example, the processor 1015 may include a VLIW circuit 1104. For example, the VLIW circuit 1104 may be integrated into the processor 1124.

The electronic device 1102 may include a VLIW circuit 1104 (e.g., a GPU) and system memory 1114. The VLIW circuit 1104 may be one example of one or more of the VLIW circuits 104, 304 described above in connection with one or more of FIGS. 1-5 Additionally or alternatively, the system memory 1114 may be an example of one or more of the system memories 114, 314 described in connection with one or more of FIGS. 1-5. The system memory 1114 may include command data, vertex data (e.g., geometry data), texture data and/or rendered target data (e.g., pixel data).

The VLIW circuit 1104 may include a graphics pipeline 1106 and on-chip memory 1110. The graphics pipeline 1106 described in connection with FIG. 11 may be one example of one or more of the graphics pipelines 106, 306 described in connection with one or more of FIGS. 1-5. Additionally or alternatively, the on-chip memory 1110 described in connection with FIG. 11 may be one example of one or more of the on-chip memories 110, 310 described in connection with one or more of FIGS. 1-5.

The on-chip memory 1110 may include one or more frame buffers, one or more caches 1101, etc. For example, level 1 (L1) and/or level 2 (L2) caches may be utilized as on-chip storage. In some configurations, pipeline prediction hardware may be disabled. It should be noted that the on-chip memory 1110 may include one or more frame buffers as described in connection with one or more of FIGS. 3-4. The frame buffer(s) may be included in one or more of the on-chip memory 1110, the cache 1101, etc. Additionally or alternatively, the frame buffer(s) may be included in the system memory 1114. In some configurations, one or more frame buffers may be included in the on-chip memory 1110, the system memory 1114 or both.

The graphics pipeline 1106 may include one or more of a CS 1117, VF 1174, VS 1176, HS 1178, TESS 1180, DS 1182, GS 1184, SOL 1119, clipper 1121, rasterizer 1186, FS 1190 and C/D 1192. In some configurations, one or more of the CS 1117, VF 1174, VS 1176, HS 1178, TESS 1180, DS 1182, GS 1184, SOL 1119, clipper 1121, rasterizer 1186, FS 1190 and C/D 1192 may perform one or more of the operations of one or more corresponding elements described in connection with FIG. 10.

In the configurations illustrated in FIG. 11, the VLIW circuit 1104 (e.g., graphics pipeline 1106) may include an asynchronous memory controller 1108. The asynchronous memory controller 1108 may be included and/or implemented in one or more of the HS 1178, the TESS 1180, the DS 1182, the GS 1184, the rasterizer 1186 and the FS 1190. Completely or partially, for example, an asynchronous memory controller 1108*a* may be implemented in the HS 1178, the TESS 1180, the DS 1182, the GS 1184, the rasterizer 1186 and/or the FS 1190. The generic label "1108" may denote that the asynchronous memory controller 1108 may be implemented in any or all of the elements 1108*a-f* illustrated in FIG. 11. In some configurations, the asynchronous memory controller 1108 may be implemented only in one or more of the HS 1178, TESS 1180, DS 1182 and GS 1184. For example, the asynchronous memory controller 1108 may only asynchronously read one or more parameters in the HS 1178, TESS 1180, DS 1182 and/or GS 1184, since data may be forwarded to later stages.

The asynchronous memory controller 1108 described in connection with FIG. 11 may be an example of one or more of the asynchronous memory controllers 108, 308 described in connection with one or more of FIGS. 1-5. For example, the asynchronous memory controller 1108 may asynchronously read one or more parameters (e.g., LOD parameters) from the on-chip memory 1110 and/or the system memory 1114 (during the processing of a data set, for instance). In some configurations, the updated parameter(s) may be provided to one or more of the HS 1178, the TESS 1180, the DS 1182, the GS 1184, the rasterizer 1186 and the FS 1190. Accordingly, one or more of the HS 1178, the TESS 1180, the DS 1182, the GS 1184, the rasterizer 1186 and the FS 1190 may change processing of the data set to be different from the processing initially established for a data set, while the data set is being processed.

In some configurations, this may enable the electronic device 1102 to perform single-pass multiple-LOD rendering. For instance, the asynchronous memory controller 1108 may read an LOD parameter that is different from another LOD parameter initially established for the set of data that is currently being processed and/or rendered (e.g., tessellated). The updated LOD parameter may be provided to one or more of the HS 1178, the TESS 1180, the DS 1182, the GS 1184, the rasterizer 1186 and the FS 1190. Accordingly, one or more of the HS 1178, the TESS 1180, the DS 1182, the GS 1184, the rasterizer 1186 and the FS 1190 may change processing (e.g., change tessellation level) of a data set according to the updated LOD parameter during processing of the data set that was initiated with one or more different parameters.

The VLIW circuit 1104 (e.g., graphics pipeline 1106) may include a non-uniform frame buffer controller 1112. As illustrated in FIG. 11, the non-uniform frame buffer controller 1112 may be included and/or implemented in the C/D 1192. It should be noted that the non-uniform frame buffer controller 1112 may be additionally or alternatively included and/or implemented in one or more of the FS 1190, C/D 1192, graphics pipeline 1106 and on-chip memory 1110. Completely or partially, for example, a non-uniform frame buffer controller 1112 may be implemented in one or more of the FS 1190, C/D 1192, graphics pipeline 1106, on-chip memory 1110 and the electronic device 1102.

The non-uniform frame buffer controller 1112 described in connection with FIG. 11 may be an example of one or more of the non-uniform frame buffer controllers 112, 312 described in connection with one or more of FIGS. 1-5. For example, the non-uniform frame buffer controller 1112 may dynamically access different subsets of one or more frame buffer(s). In some configurations, dynamically accessing different subsets of the frame buffer may include accessing at least one pixel of a first zone at a different rate from at least one pixel of a second zone. Additionally or alternatively, dynamically accessing different subsets of the frame buffer may include enabling dynamic shader sub-routine swapping (when processing of a first pixel is ongoing and process of a second pixel is completed, for example). Additionally or alternatively, the non-uniform frame buffer controller 1112 may be configured to substitute a processed first sample of a first pixel for a second sample of a second pixel to avoid processing the second sample of the second pixel. It should be noted that in some configurations, the electronic device 1102 described in connection with FIG. 11 may be implemented to perform asynchronous adaptive anti-aliasing using shared memory and/or adaptive multi-frequency shading.

Figure 12:
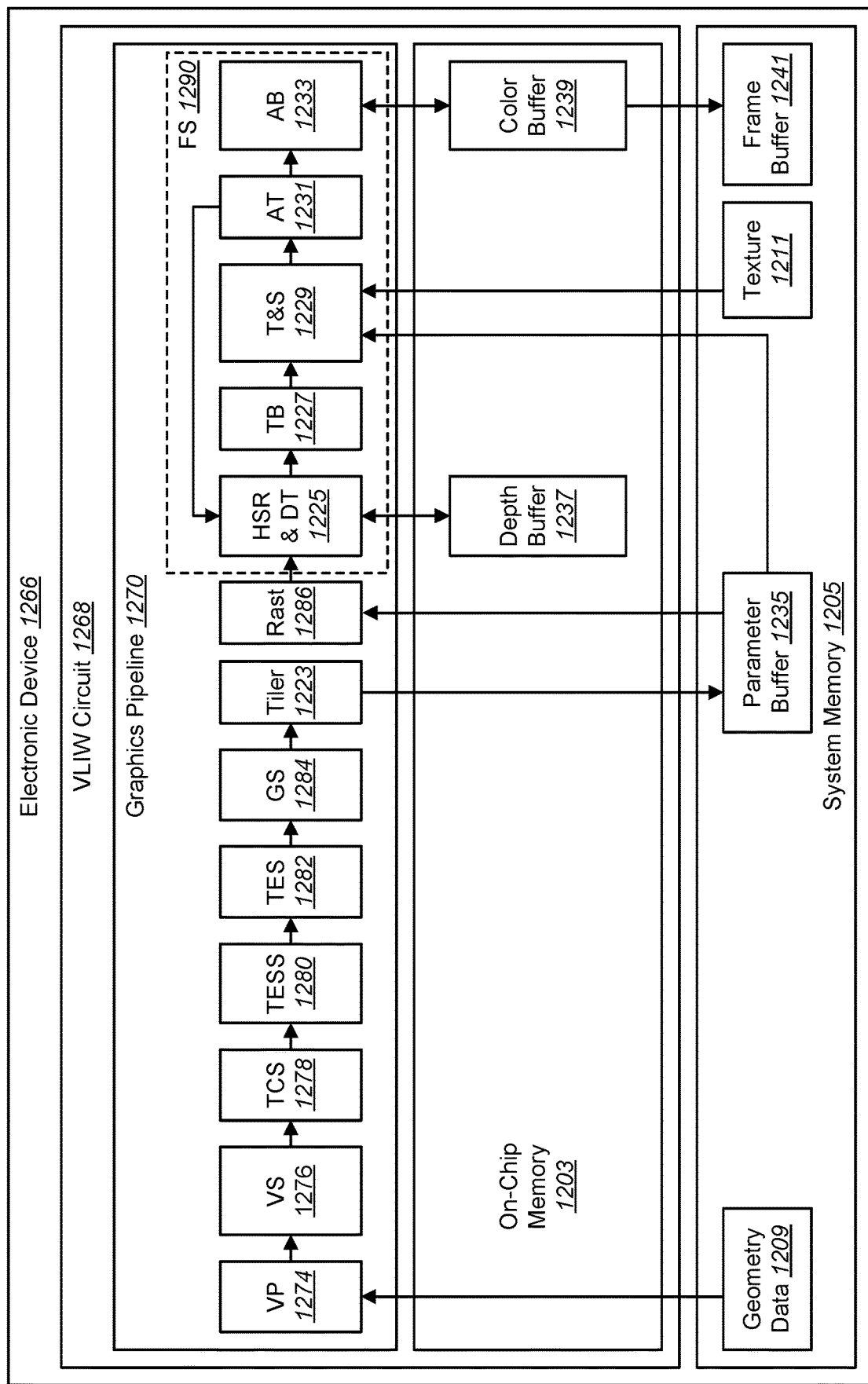
FIG. 12 is a block diagram illustrating another example of an electronic device including a very long instruction word (VLIW) circuit.

FIG. 12 is a block diagram illustrating another example of an electronic device 1266 including a very long instruction word (VLIW) circuit 1268. In particular, FIG. 12 illustrates one example of an architecture for graphics processing. One or more aspects of the architecture described in connection with FIG. 12 may function similar to aspects of Imagine Technologies (e.g., PowerVR graphics) architecture. This architecture is a tiled architecture that may provide Tile-Based Deferred Rendering (TBDR). Opaque geometry may be sorted into tiles (instead of caching, for example).

The electronic device 1266 may include a VLIW circuit 1268 (e.g., GPU) and system memory 1205 (e.g., DRAM). The VLIW circuit 1268 may include a graphics pipeline 1270 and on-chip memory 1203. The graphics pipeline 1270 may include one or more of a vertex processor (VP) 1274, vertex shader (VS) 1276, tessellation control shader (TCS) 1278, tessellator (TESS) 1280 (e.g., tessellation engine), tessellation evaluation shader (TES) 1282, geometry shader (GS) 1284, tiler 1223, rasterizer (Rast) 1286 and fragment shader (FS) 1290. Many of the element labels have been abbreviated for convenience. The on-chip memory 1203 may include a depth buffer 1237 and a color buffer 1239. The system memory 1205 may include geometry data 1209, a parameter buffer 1235, texture data 1211 and a frame buffer 1241. The geometry data 1209 may indicate one or more points (e.g., vertices), lines and/or polygons. The geometry data 1209 may represent a scene and/or one or more objects in a scene.

The VP 1274 may fetch geometry data from the system memory 1205 into the VLIW circuit 1268 (e.g., graphic pipeline 1270). The VP 1274 may provide the geometry data to the VS 1276.

The VS 1276 may transform (e.g., project) the geometry data into a different space. For example the VS 1276 may transform the geometry data from three-dimensional (3D) space into a two-dimensional (2D) space. In some configurations, the VS 1276 may perform clipping, projection and/or culling. For example, the VS 1276 may clip out geometry data that is outside of the viewing frustum. The VS 1276 may project the geometry data from 3D space into 2D space. The VS 1276 may also cull some of the geometry data. For example, geometry data corresponding to occluded geometry (e.g., geometry that is not viewable because it is blocked by other geometry) may be removed. The VS 1276 may provide the transformed geometry data to the TCS 1278.

The TCS 1278 may receive geometry data (e.g., transformed geometry data) from the VS 1276 and/or from the buffer 1296. The TCS 1278 may transform the basis of the geometry data (e.g., the transformed geometry data). For example, the TCS 1278 may transform the basis of the geometry data to a basis for tessellation (e.g., for efficiently subdividing polygons such as triangles). For example, the TCS 1278 may produce a basis indicator that indicates the basis transformation performed by the TCS 1278. The basis-transformed geometry data may be provided to the TESS 1280.

The TESS 1280 may tessellate the geometry data (e.g., basis-transformed geometry data). For example, the TESS 1280 may generate more geometry data (e.g., vertices) based on the geometry data (e.g., may subdivide triangles into more triangles). The TESS 1280 may operate based on a LOD parameter. The LOD parameter may specify the LOD and/or may indicate a degree of tessellation for the TESS 1280 to perform. The tessellated geometry data may be provided to the TES 1282.

The TES 1282 may transform the basis of the geometry data (e.g., tessellated geometry data). For example, the TES 1282 may transform the basis of the geometry data back to the basis before the basis transform applied by the TCS 1278. In some configurations, the TES 1282 may obtain the basis indicator from the TCS 1278 and/or memory (e.g., on-chip memory 1203 and/or system memory 1205) in order to transform (e.g., inverse transform) the basis of the geometry data. The TES 1282 may provide geometry data (e.g., the inverse basis-transformed geometry data) to the GS 1284.

The GS 1284 may perform one or more operations on the geometry data (e.g., the inverse basis-transformed geometry data). For example, the GS 1284 may generate additional geometry based on the geometry data. The GS 1284 may provide the geometry data (with additional geometry, for example) to the tiler 1223.

The tiler 1223 may split the geometry data (with additional geometry, for example) into tiles. For example, the tiler 1223 may divide the geometry data into smaller groups of geometry data. The tiles may include contiguous geometry data. The tiler 1223 may provide the tiles to the parameter buffer 1235.

The parameter buffer 1235 may store the tiles. For example, the parameter buffer 1235 may store a list of primitives (e.g., geometry data, vertices, lines, polygons, etc.). In the tiled architecture described in FIG. 12, tile processing may leverage spatial locality of system memory accesses. For example, operations that are local to a tile may be relatively "cheap" (e.g., may utilize very little processing, power, memory and/or time resources). In some configurations, the VLIW circuit 1268 may tessellate the geometry data and send those geometry data out for tiling to the parameter buffer 1235. The geometry data (e.g., tiled geometry data, primitives, etc.) may be provided to the rasterizer 1286. It should be noted that the parameters stored in the parameter buffer 1235 may not include rendering parameter(s) (e.g., LOD parameter(s)).

The rasterizer 1286 may receive the geometry data (e.g., tiled geometry data, primitives, etc.) from the parameter buffer 1235. The rasterizer 1286 may rasterize the geometry data. For example, the rasterizer may convert the geometry data to pixel data. The pixel data may be provided to the FS 1290.

The FS 1290 may perform fragment shading or pixel shading on the pixel data. For example, the FS 1290 may determine one or more attributes (e.g., color, brightness, transparency, etc.) of one or more pixels. In some configurations, the FS 1290 may include one or more of a hidden surface removal (HSR) and depth test (DT) block 1225, a tag buffer (TB) 1227, a texture and shade (T&S) block 1229, an alpha test (AT) block 1231 and an alpha blend (AB) block 1233. The HSR & DT 1225 may perform depth testing and hidden surface removal. For example, depth testing may include determining a depth corresponding to pixels. The HSR & DT may determine the depth for each pixel and store depth indicators in the depth buffer 1237. Performing hidden surface removal may include discarding pixels that at a greater depth than other pixels (e.g., that are occluded by other pixels). In some approaches, the tag buffer (TB) 1227 may optionally regroup pixels for faster execution. The T&S 1229 may obtain texture data 1211 from the system memory. The AT 1231 may perform a custom "stencil" test (e.g., another depth test). In some configurations, the AT 1231 may update the HSR & DT 1225. The AB 1233 may blend pixels (e.g., pixels from one or more layers and/or frame buffers). For example, the AB 1233 may perform a compose and/or decompose operation, where two images may be blended using an alpha value.

The AB 1233 may provide pixel data to the color buffer 1239. As illustrated in FIG. 12, the color and depth buffer data may be stored on-chip. The color buffer 1239 may provide the pixel data to the frame buffer 1241. The frame buffer 1241 may output the pixel data. The pixel data may be provided (e.g., output) for presentation. For example, the pixel data may be sent to a display for presentation.

It should be noted that without the systems and methods disclosed herein, the operations described in connection with FIG. 12 may be performed in terms of data sets (e.g., sets of vertex, pixel and/or image data) as described in connection with FIG. 8.

Figure 13:
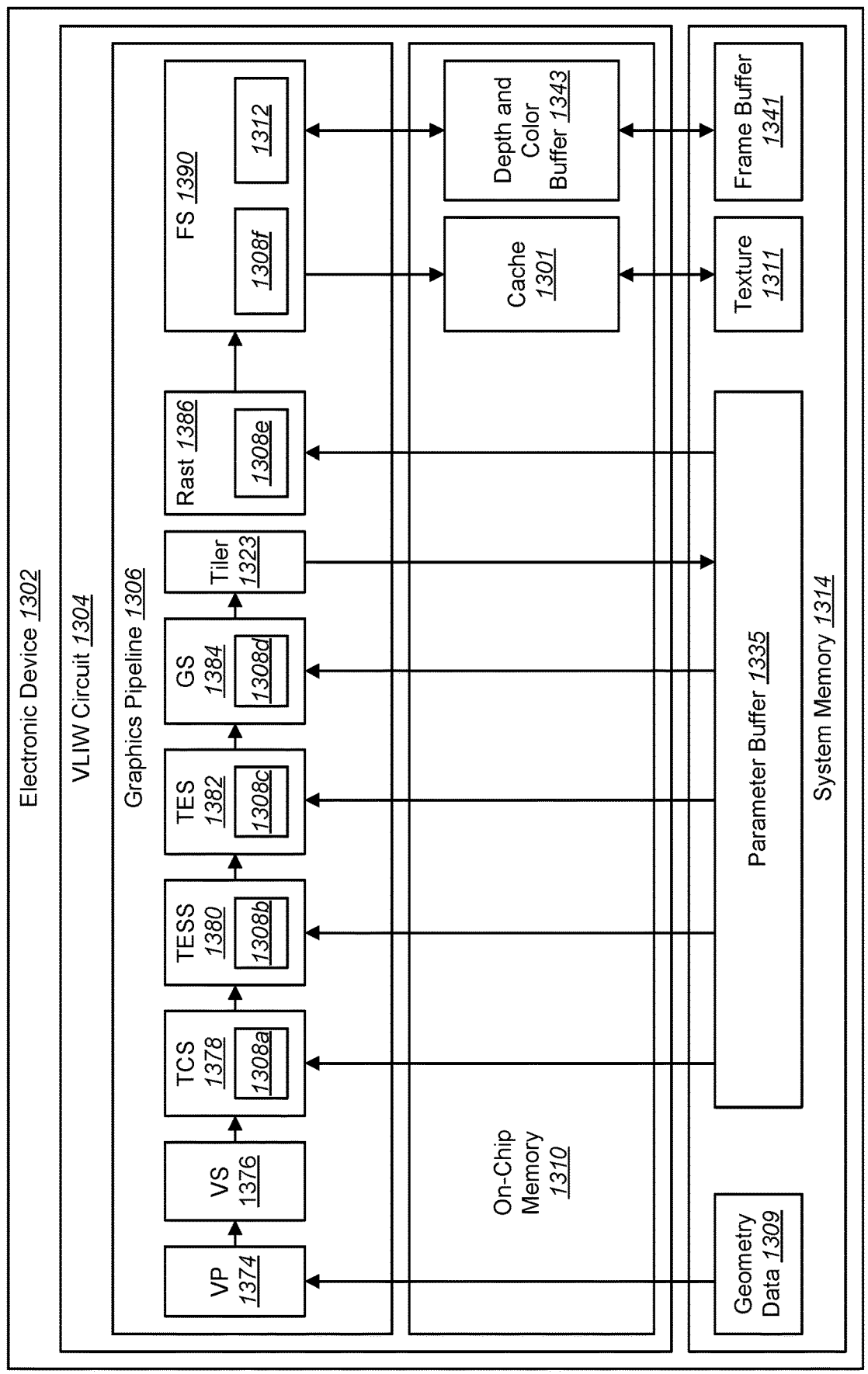
FIG. 13 is a block diagram illustrating an example of the systems and methods disclosed herein implemented in the architecture described in connection with FIG. 12.

FIG. 13 is a block diagram illustrating an example of the systems and methods disclosed herein implemented in the architecture described in connection with FIG. 12. This architecture may provide TBDR. Specifically, FIG. 13 illustrates an electronic device 1302. The electronic device 1302 described in connection with FIG. 13 may be an example of one or more of the electronic devices 102, 302 described above in connection with one or more of FIGS. 1-5. The electronic device 1302 may be configured to perform one or more of the methods, functions, steps, operations, etc., described in connection with one or more of FIGS. 1-5.

The electronic device 1302 may include a VLIW circuit 1304 (e.g., a GPU) and system memory 1314. The VLIW circuit 1304 may be one example of one or more of the VLIW circuits 104, 304 described above in connection with one or more of FIGS. 1-5 Additionally or alternatively, the system memory 1314 may be an example of one or more of the system memories 114, 314 described in connection with one or more of FIGS. 1-5. The system memory 1314 may include geometry data 1309, a parameter buffer 1335, texture data 1311 and/or a frame buffer 1341. One or more of the geometry data 1309, a parameter buffer 1335, texture data 1311 and/or a frame buffer 1341 may be similar to corresponding elements described in connection with FIG. 12. It should be noted that the system memory 1314 may include one or more frame buffers as described in connection with one or more of FIGS. 3-4. For instance, the frame buffer 1341 may be an example of one or more of the frame buffers described in connection with one or more of FIGS. 3-4. In some configurations, one or more frame buffers may be included in the on-chip memory 1310, the system memory 1314 or both.

The VLIW circuit 1304 may include a graphics pipeline 1306 and on-chip memory 1310. The graphics pipeline 1306 described in connection with FIG. 13 may be one example of one or more of the graphics pipelines 106, 306 described in connection with one or more of FIGS. 1-5. Additionally or alternatively, the on-chip memory 1310 described in connection with FIG. 13 may be one example of one or more of the on-chip memories 110, 310 described in connection with one or more of FIGS. 1-5.

The on-chip memory 1310 may include a cache 1301 and/or a depth and color buffer 1343. In some configurations, one or more of the on-chip memory 1310, the cache 1301 and/or the depth a color buffer 1343 may be similar to corresponding elements described in connection with FIG. 12.

The graphics pipeline 1306 may include one or more of a VP 1374, VS 1376, TCS 1378, TESS 1380, TES 1382, GS 1384, tiler 1323, rasterizer 1386 and FS 1390. In some configurations, one or more of the VP 1374, VS 1376, TCS 1378, TESS 1380, TES 1382, GS 1384, tiler 1323, rasterizer 1386 and FS 1390 may perform one or more of the operations of one or more corresponding elements described in connection with FIG. 12. It should be noted that the FS 1390 may include one or more of an HSR & DT, TB, T&S, AT and AB as described in connection with FIG. 12 in some configurations.

In the configurations illustrated in FIG. 13, the VLIW circuit 1304 (e.g., graphics pipeline 1306) may include an asynchronous memory controller 1308. The asynchronous memory controller 1308 may be included and/or implemented in one or more of the TCS 1378, the TESS 1380, the TES 1382, the GS 1384, the rasterizer 1386 and the FS 1390. Completely or partially, for example, an asynchronous memory controller 1308 may be implemented in the TCS 1378, the TESS 1380, the TES 1382, the GS 1384, the rasterizer 1386 and/or the FS 1390. The generic label "1308" may denote that the asynchronous memory controller 1308 may be implemented in any or all of the elements 1308a-f illustrated in FIG. 13. In some configurations, the asynchronous memory controller 1308 may be implemented only in one or more of the TCS 1378, TESS 1380, TES 1382 and GS 1384. For example, the asynchronous memory controller 1308 may only asynchronously read one or more parameters in the TCS 1378, TESS 1380, TES 1382 and/or GS 1384, since data may be forwarded to later stages.

The asynchronous memory controller 1308 described in connection with FIG. 13 may be an example of one or more of the asynchronous memory controllers 108, 308 described in connection with one or more of FIGS. 1-5. For example, the asynchronous memory controller 1308 may asynchronously read one or more parameters (e.g., LOD parameters) from the system memory 1314 (during the processing of a data set, for instance). In some configurations, the updated parameter(s) may be provided to one or more of the TCS 1378, the TESS 1380, the TES 1382, the GS 1384, the rasterizer 1386 and the FS 1390. Accordingly, one or more of the TCS 1378, the TESS 1380, the TES 1382, the GS 1384, the rasterizer 1386 and the FS 1390 may change processing of the data set to be different from the processing initially established for a data set, while the data set is being processed.

In some configurations, this may enable the electronic device 1302 to perform single-pass multiple-LOD rendering. For instance, the asynchronous memory controller 1308 may read an LOD parameter that is different from another LOD parameter initially established for the set of data that is currently being processed and/or rendered (e.g., tessellated). The updated LOD parameter may be provided to one or more of the TCS 1378, the TESS 1380, the TES 1382, the GS 1384, the rasterizer 1386 and the FS 1390. Accordingly, one or more of the TCS 1378, the TESS 1380, the TES 1382, the GS 1384, the rasterizer 1386 and the FS 1390 may change processing (e.g., change tessellation level) of a data set according to the updated LOD parameter during processing of the data set that was initiated with one or more different parameters.

The VLIW circuit 1304 (e.g., graphics pipeline 1306) may include a non-uniform frame buffer controller 1312. As illustrated in FIG. 13, the non-uniform frame buffer controller 1312 may be included and/or implemented in the FS 1390. It should be noted that the non-uniform frame buffer controller 1312 may be additionally or alternatively included and/or implemented in one or more of the FS 1390, graphics pipeline 1306 and on-chip memory 1310. Completely or partially, for example, a non-uniform frame buffer controller 1312 may be implemented in one or more of the FS 1390, graphics pipeline 1306, on-chip memory 1310 and the electronic device 1302.

The non-uniform frame buffer controller 1312 described in connection with FIG. 13 may be an example of one or more of the non-uniform frame buffer controllers 112, 312 described in connection with one or more of FIGS. 1-5. For example, the non-uniform frame buffer controller 1312 may dynamically access different subsets of one or more frame buffer(s) (e.g., frame buffer 1341). In some configurations, dynamically accessing different subsets of the frame buffer may include accessing at least one pixel of a first zone at a different rate from at least one pixel of a second zone. Additionally or alternatively, dynamically accessing different subsets of the frame buffer may include enabling dynamic shader sub-routine swapping (when processing of a first pixel is ongoing and process of a second pixel is completed, for example). Additionally or alternatively, the non-uniform frame buffer controller 1312 may be configured to substitute a processed first sample of a first pixel for a second sample of a second pixel to avoid processing the second sample of the second pixel. The architecture illustrated in FIG. 13 may allow custom configuration of the on-chip buffers (e.g., depth and color buffers). This may allow side-by-side rendering for VR, mipmap generation, etc.

Figure 14:
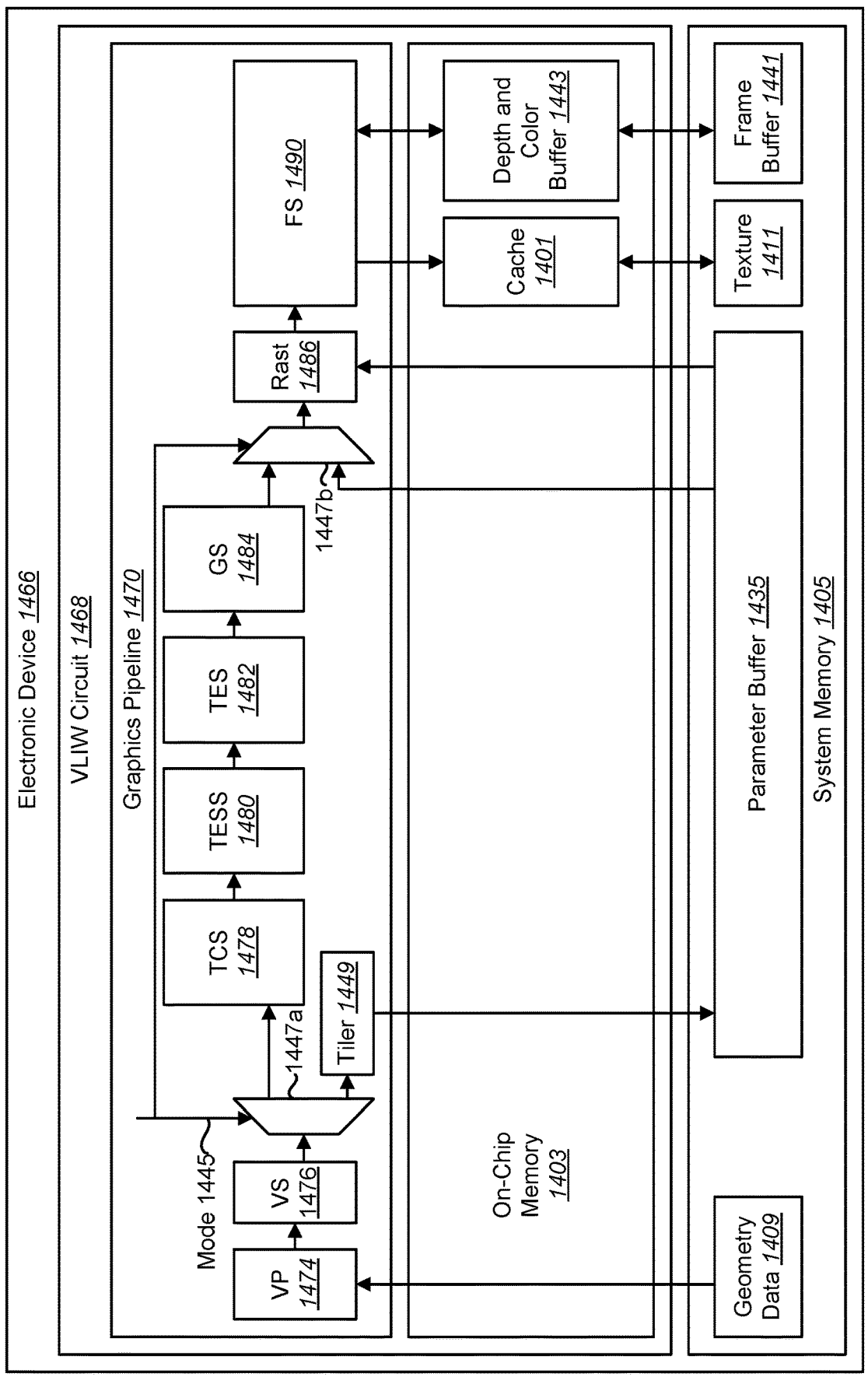
FIG. 14 is a block diagram illustrating another example of an electronic device including a very long instruction word (VLIW) circuit.

FIG. 14 is a block diagram illustrating another example of an electronic device 1466 including a very long instruction word (VLIW) circuit 1468. In particular, FIG. 14 illustrates one example of an architecture for graphics processing. This architecture may provide (e.g., support) both immediate mode (e.g. IMR) and tiled mode (e.g., TBDR). For example, the architecture may provide a selection of immediate mode or tiled mode. The example illustrated in FIG. 14 may avoid large on-chip cache/buffers (needed for intermediate geometry, for instance).

The electronic device 1466 may include a VLIW circuit 1468 (e.g., GPU) and system memory 1405 (e.g., DRAM). The VLIW circuit 1468 may include a graphics pipeline 1470 and on-chip memory 1403. The graphics pipeline 1470 may include one or more of a vertex processor (VP) 1474, vertex shader (VS) 1476, switches A-B 1447a-b (e.g., multiplexers), tessellation control shader (TCS) 1478, tessellator (TESS) 1480 (e.g., tessellation engine), tessellation evaluation shader (TES) 1482, geometry shader (GS) 1484, tiler 1449, rasterizer (Rast) 1486 and fragment shader (FS) 1490. Many of the element labels have been abbreviated for convenience. The on-chip memory 1403 may include a cache 1401 and a depth and color buffer 1443. The system memory 1405 may include geometry data 1409, a parameter buffer 1435, texture data 1411 and a frame buffer 1441. The geometry data 1409 may indicate one or more points (e.g., vertices), lines and/or polygons. The geometry data 1409 may represent a scene and/or one or more objects in a scene.

The VP 1474 may fetch geometry data from the system memory 1405 into the VLIW circuit 1468 (e.g., graphics pipeline 1470). The VP 1474 may provide the geometry data to the VS 1476.

The VS 1476 may transform (e.g., project) the geometry data into a different space. For example the VS 1476 may transform the geometry data from three-dimensional (3D) space into a two-dimensional (2D) space. In some configurations, the VS 1476 may perform clipping, projection and/or culling. For example, the VS 1476 may clip out geometry data that is outside of the viewing frustum. The VS 1476 may project the geometry data from 3D space into 2D space. The VS 1476 may also cull some of the geometry data. For example, geometry data corresponding to occluded geometry (e.g., geometry that is not viewable because it is blocked by other geometry) may be removed. The VS 1476 may provide the transformed geometry data to switch A 1447a (e.g., a multiplexer).

Switch A 1447a may route the transformed geometry data to the TCS 1478 or to the tiler 1449 based on a mode 1445. For example, the mode 1445 may indicate a rendering mode. In some configurations, the rendering modes may include tiled mode (e.g., tile-based deferred rendering (TBDR)

mode) and immediate mode (e.g., immediate mode rendering (IMR)). If tessellation is enabled, switch A 1447a may route the transformed geometry data to be tessellated. Otherwise, switch A 1447a may route the transformed geometry data to be tiled. For example, in a case that the mode 1445 indicates tiled mode, switch A 1447a may direct the transformed geometry to the tiler 1449. In a case that the mode 1445 indicates immediate mode, switch A 1447a may direct the transformed geometry to the TCS 1478. Immediate mode may include one or more of the operations described in connection with one or more of FIGS. 8 and 10. Tiled mode may include one or more of the operations described in connection with FIG. 12.

The TCS 1478 may receive geometry data (e.g., transformed geometry data) from switch A 1447a (e.g., the VS 1476). The TCS 1478 may transform the basis of the geometry data (e.g., the transformed geometry data). For example, the TCS 1478 may transform the basis of the geometry data to a basis for tessellation (e.g., for efficiently subdividing polygons such as triangles). For example, the TCS 1478 may produce a basis indicator that indicates the basis transformation performed by the TCS 1478. The basis-transformed geometry data may be provided to the TESS 1480.

The TESS 1480 may tessellate the geometry data (e.g., basis-transformed geometry data). For example, the TESS 1480 may generate more geometry data (e.g., vertices) based on the geometry data (e.g., may subdivide triangles into more triangles). The TESS 1480 may operate based on a LOD parameter. The LOD parameter may specify the LOD and/or may indicate a degree of tessellation for the TESS 1480 to perform. The tessellated geometry data may be provided to the TES 1482.

The TES 1482 may transform the basis of the geometry data (e.g., tessellated geometry data). For example, the TES 1482 may transform the basis of the geometry data back to the basis before the basis transform applied by the TCS 1478. In some configurations, the TES 1482 may obtain the basis indicator from the TCS 1478 and/or memory (e.g., on-chip memory 1403 and/or system memory 1405) in order to transform (e.g., inverse transform) the basis of the geometry data. The TES 1482 may provide geometry data (e.g., the inverse basis-transformed geometry data) to the GS 1484.

The GS 1484 may perform one or more operations on the geometry data (e.g., the inverse basis-transformed geometry data). For example, the GS 1484 may generate additional geometry based on the geometry data. The GS 1484 may provide the geometry data (with additional geometry, for example) to switch B 1447b. Switch B 1447b (e.g., a multiplexer) may route the geometry data (with additional geometry, for example) to the rasterizer 1486 (in the case of immediate mode, for example).

In a case that the mode 1445 indicates TBDR mode, switch A 1447a may provide the transformed geometry data to the tiler 1449 (from the VS 1476, for example). The tiler 1449 may split the transformed geometry data into tiles. For example, the tiler 1449 may divide the geometry data into smaller groups of geometry data. The tiles may include contiguous geometry data. The tiler 1449 may provide the tiles to the parameter buffer 1435.

The parameter buffer 1435 may store the tiles. For example, the parameter buffer 1435 may store a list of primitives (e.g., geometry data, vertices, lines, polygons, etc.). In the tiled mode described in FIG. 14, tile processing may leverage spatial locality of system memory accesses. For example, operations that are local to a tile may be relatively "cheap" (e.g., may utilize very little processing, power, memory and/or time resources). The geometry data (e.g., tiled geometry data, primitives, etc.) may be provided to switch B 1447b. Switch B 1447b may route the geometry data to the rasterizer 1486 from the parameter buffer 1435 (in the case of tiled mode, for example).

The rasterizer 1486 may receive the geometry data (e.g., tiled geometry data from the parameter buffer 1435 or geometry data (with additional geometry, for example) from the GS 1484). The rasterizer 1486 may rasterize the geometry data. For example, the rasterizer may convert the geometry data to pixel data. The pixel data may be provided to the FS 1490.

The FS 1490 may perform fragment shading or pixel shading on the pixel data. For example, the FS 1490 may determine one or more attributes (e.g., color, brightness, transparency, etc.) of one or more pixels. For example, the FS 1490 may perform one or more of the operations and/or may include one or more of the structures described above in connection with one or more of the FSs 890, 990, 1090, 1190, 1290, 1390 described in connection with one or more of FIGS. 8-12.

The FS 1490 may provide pixel data to one or more of the cache 1401 and depth and color buffer 1443. In some configurations, the FS 1490 and/or depth and color buffer 1443 may provide similar functionality to the composition/decomposition blocks described herein. In some configurations, the architecture described in connection with FIG. 14 may not mix immediate mode and tiled mode. For example, the mode (e.g., mode 1445) may indicate tessellation immediate mode or no tessellation tiled mode.

The cache 1401 may receive texture data 1411 from the system memory. In some configurations, only texture accesses and frame buffer tiles may be cached. In the case of immediate mode, a tile may be allocated that is the size of the entire frame buffer 1441.

As illustrated in FIG. 14, the color and depth buffer data may be stored on-chip. The depth and color buffer 1443 may provide the pixel data to the frame buffer 1441. The frame buffer 1441 may output the pixel data. The pixel data may be provided (e.g., output) for presentation. For example, the pixel data may be sent to a display for presentation.

It should be noted that without the systems and methods disclosed herein, the operations described in connection with FIG. 14 may be performed in terms of data sets (e.g., sets of vertex, pixel and/or image data) as described in connection with FIG. 8.

Figure 15:
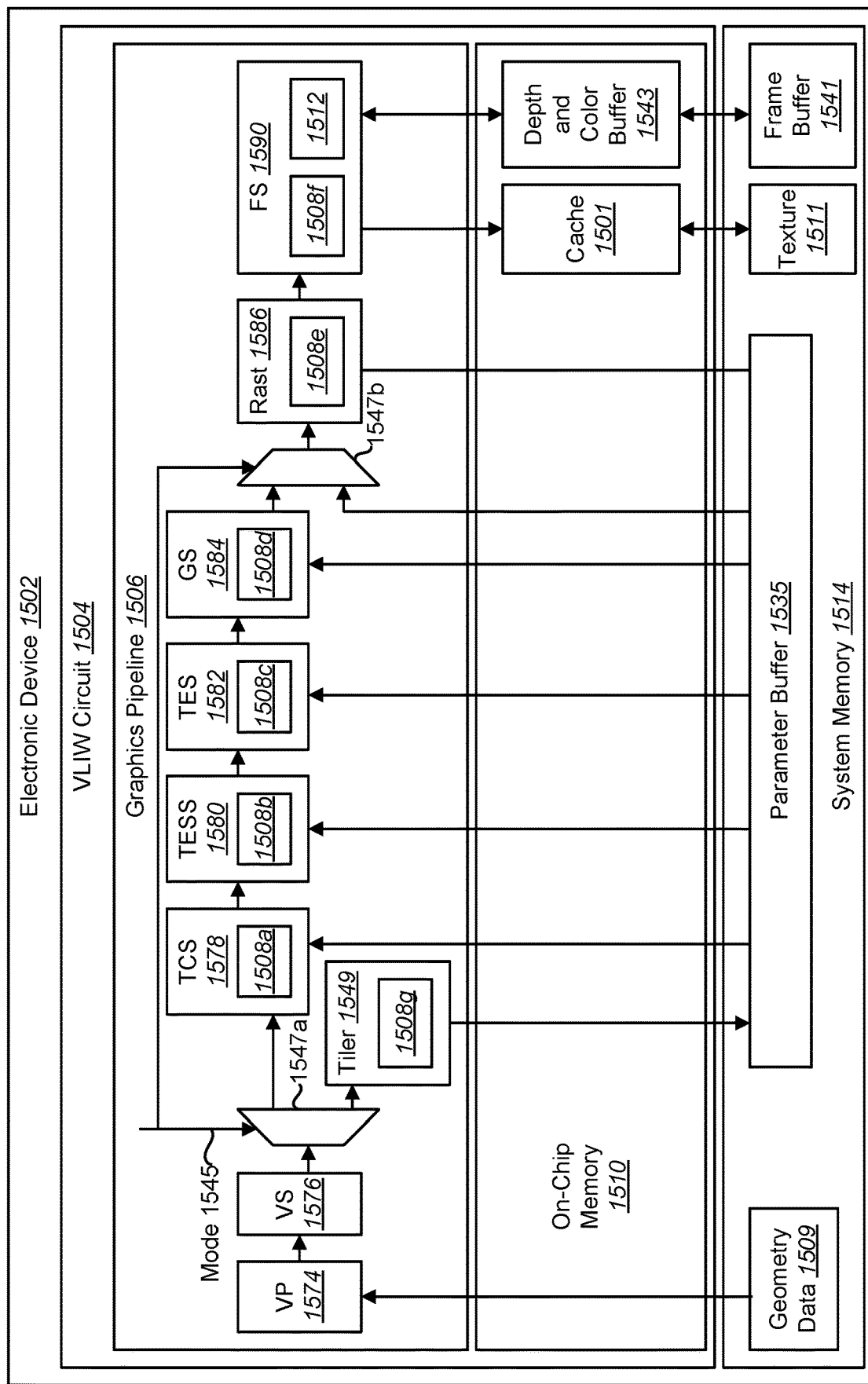
FIG. 15 is a block diagram illustrating an example of the systems and methods disclosed herein implemented in the architecture described in connection with FIG. 14.

FIG. 15 is a block diagram illustrating an example of the systems and methods disclosed herein implemented in the architecture described in connection with FIG. 14. This architecture may provide immediate mode (e.g., IMR) and tiled mode (e.g., TBDR). Specifically, FIG. 15 illustrates an electronic device 1502. The electronic device 1502 described in connection with FIG. 15 may be an example of one or more of the electronic devices 102, 302 described above in connection with one or more of FIGS. 1-5. The electronic device 1502 may be configured to perform one or more of the methods, functions, steps, operations, etc., described in connection with one or more of FIGS. 1-5.

The electronic device 1502 may include a VLIW circuit 1504 (e.g., a GPU) and system memory 1514. The VLIW circuit 1504 may be one example of one or more of the VLIW circuits 104, 304 described above in connection with one or more of FIGS. 1-5 Additionally or alternatively, the system memory 1514 may be an example of one or more of the system memories 114, 314 described in connection with one or more of FIGS. 1-5. The system memory 1514 may include geometry data 1509, a parameter buffer 1535, texture data 1511 and/or a frame buffer 1541. One or more of the geometry data 1509, a parameter buffer 1535, texture data 1511 and/or a frame buffer 1541 may be similar to corresponding elements described in connection with FIG. 14. It should be noted that the system memory 1514 may include one or more frame buffers as described in connection with one or more of FIGS. 3-4. For instance, the frame buffer 1541 may be an example of one or more of the frame buffers described in connection with one or more of FIGS. 3-4. In some configurations, one or more frame buffers may be included in the on-chip memory 1510, the system memory 1514 or both.

The VLIW circuit 1504 may include a graphics pipeline 1506 and on-chip memory 1510. The graphics pipeline 1506 described in connection with FIG. 15 may be one example of one or more of the graphics pipelines 106, 306 described in connection with one or more of FIGS. 1-5. Additionally or alternatively, the on-chip memory 1510 described in connection with FIG. 15 may be one example of one or more of the on-chip memories 110, 310 described in connection with one or more of FIGS. 1-5.

The on-chip memory 1510 may include a cache 1501 and/or a depth and color buffer 1543. In some configurations, one or more of the on-chip memory 1510, the cache 1501 and/or the depth a color buffer 1543 may be similar to corresponding elements described in connection with FIG. 14.

The graphics pipeline 1506 may include one or more of a VP 1574, VS 1576, switches A-B 1547*a-b*, TCS 1578, TESS 1580, TES 1582, GS 1584, tiler 1549, rasterizer 1586 and FS 1590. In some configurations, one or more of the VP 1574, VS 1576, switches 1547*a-b*, TCS 1578, TESS 1580, TES 1582, GS 1584, tiler 1549, rasterizer 1586 and FS 1590 may perform one or more of the operations of one or more corresponding elements described in connection with FIG. 14. It should be noted that the FS 1590 may include one or more of an HSR & DT, TB, T&S, AT and AB as described in connection with FIG. 14 in some configurations.

In the configurations illustrated in FIG. 15, the VLIW circuit 1504 (e.g., graphics pipeline 1506) may include an asynchronous memory controller 1508. The asynchronous memory controller 1508 may be included and/or implemented in one or more of the TCS 1578, the TESS 1580, the TES 1582, the GS 1584, the rasterizer 1586, the FS 1590 and the tiler 1549. Completely or partially, for example, an asynchronous memory controller 1508 may be implemented in the TCS 1578, the TESS 1580, the TES 1582, the GS 1584, the rasterizer 1586, the FS 1590 and/or the tiler 1549. The generic label "1508" may denote that the asynchronous memory controller 1508 may be implemented in any or all of the elements 1508*a-g* illustrated in FIG. 15. In some configurations, the asynchronous memory controller 1508 may be implemented only in one or more of the TCS 1578, TESS 1580, TES 1582 and GS 1584. For example, the asynchronous memory controller 1508 may only asynchronously read one or more parameters in the TCS 1578, TESS 1580, TES 1582 and/or GS 1584, since data may be forwarded to later stages.

Switch A 1547*a* may route data to the TCS 1578 or to the tiler 1549 based on a mode 1545. For example, the mode 1545 may indicate a rendering mode. In some configurations, the rendering modes may include tiled mode (e.g., tile-based deferred rendering (TBDR) mode) and immediate mode (e.g., immediate mode rendering (IMR)). If tessellation is enabled, switch A 1547*a* may route data to be tessellated. Otherwise, switch A 1547*a* may route the data to be tiled. Immediate mode may include one or more of the operations described in connection with one or more of FIGS. 8 and 10. Tiled mode may include one or more of the operations described in connection with FIG. 12.

In tiled mode, the asynchronous memory controller 1508*e-g* included in one or more of the tiler 1549, rasterizer 1586 and FS 1590 may perform zoning and/or reducing the computation of the FS 1590 in some configurations. For example, the asynchronous memory controller 1508*e-g* may employ a more expensive shader for a high-LOD zone, a moderately expensive shader for a middle-LOD zone and a cheaper shader for a low-LOD zone. For instance, foveated rendering may include the LOD of geometry and/or shader computation. In some configurations (in tiled mode, for example), the geometry may not be modified, but one or more shaders that are run per pixel may have varying computation expenses.

The asynchronous memory controller 1508 described in connection with FIG. 15 may be an example of one or more of the asynchronous memory controllers 108, 308 described in connection with one or more of FIGS. 1-5. For example, the asynchronous memory controller 1508 may asynchronously read one or more parameters (e.g., LOD parameters) from the system memory 1514 (during the processing of a data set, for instance). In some configurations, the updated parameter(s) may be provided to one or more of the TCS 1578, the TESS 1580, the TES 1582, the GS 1584, the rasterizer 1586, the FS 1590 and the tiler 1549. Accordingly, one or more of the TCS 1578, the TESS 1580, the TES 1582, the GS 1584, the rasterizer 1586, the FS 1590 and the tiler 1549 may change processing of the data set to be different from the processing initially established for a data set, while the data set is being processed.

In some configurations, this may enable the electronic device 1502 to perform single-pass multiple-LOD rendering. For instance, the asynchronous memory controller 1508 may read an LOD parameter that is different from another LOD parameter initially established for the set of data that is currently being processed and/or rendered (e.g., tessellated). The updated LOD parameter may be provided to one or more of the TCS 1578, the TESS 1580, the TES 1582, the GS 1584, the rasterizer 1586, the FS 1590 and the tiler 1549. Accordingly, one or more of the TCS 1578, the TESS 1580, the TES 1582, the GS 1584, the rasterizer 1586, the FS 1590 and the tiler 1549 may change processing (e.g., change tessellation level and/or change one or more shaders) of a data set according to the updated LOD parameter during processing of the data set that was initiated with one or more different parameters.

The VLIW circuit 1504 (e.g., graphics pipeline 1506) may include a non-uniform frame buffer controller 1512. As illustrated in FIG. 15, the non-uniform frame buffer controller 1512 may be included and/or implemented in the FS 1590. It should be noted that the non-uniform frame buffer controller 1512 may be additionally or alternatively included and/or implemented in one or more of the FS 1590, graphics pipeline 1506 and on-chip memory 1510. Completely or partially, for example, a non-uniform frame buffer controller 1512 may be implemented in one or more of the FS 1590, graphics pipeline 1506, on-chip memory 1510 and the electronic device 1502.

The non-uniform frame buffer controller 1512 described in connection with FIG. 15 may be an example of one or more of the non-uniform frame buffer controllers 112, 312 described in connection with one or more of FIGS. 1-5. For example, the non-uniform frame buffer controller 1512 may dynamically access different subsets of one or more frame buffer(s) (e.g., frame buffer 1541). In some configurations, dynamically accessing different subsets of the frame buffer may include accessing at least one pixel of a first zone at a different rate from at least one pixel of a second zone. Additionally or alternatively, dynamically accessing different subsets of the frame buffer may include enabling dynamic shader sub-routine swapping (when processing of a first pixel is ongoing and process of a second pixel is completed, for example). Additionally or alternatively, the non-uniform frame buffer controller 1512 may be configured to substitute a processed first sample of a first pixel for a second sample of a second pixel to avoid processing the second sample of the second pixel. The architecture illustrated in FIG. 15 may allow custom configuration of the on-chip buffers (e.g., depth and color buffers). This may allow side-by-side rendering for VR, mipmap generation, etc.

Additionally or alternatively, the non-uniform frame buffer controller 312 may provide efficient frame buffer partitioning, reading and/or writing. For example, the non-uniform frame buffer controller 312 may enable a fragment shader (FS) and/or composition/decomposition block to access the frame buffer in a non-uniform manner (e.g., to write to different subsets of the frame buffer with different levels of detail concurrently, write to different subsets with different numbers of samples, etc.).

Figure 16:
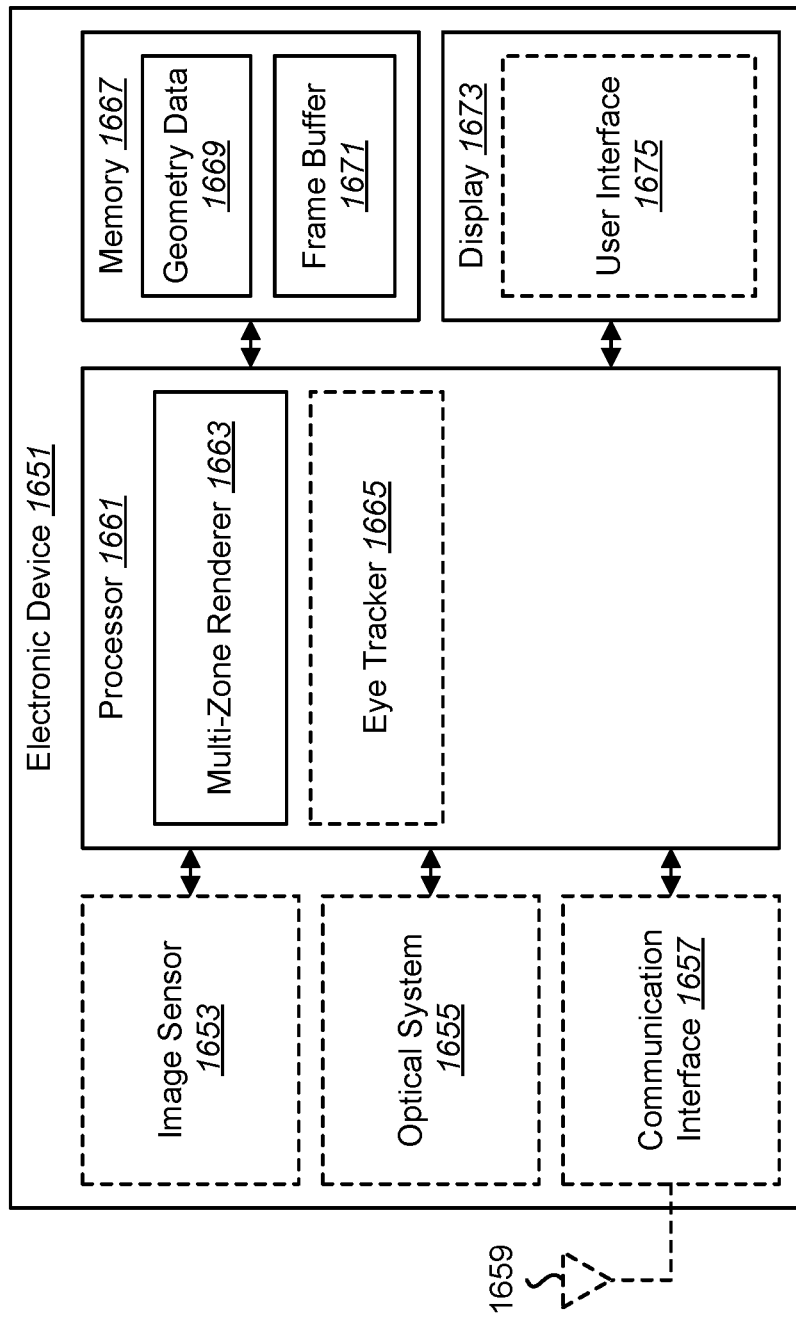
FIG. 16 is a block diagram illustrating one configuration of an electronic device in which systems and methods for rendering multiple zones may be implemented.

FIG. 16 is a block diagram illustrating one configuration of an electronic device 1651 in which systems and methods for rendering multiple zones may be implemented. Examples of the electronic device 1651 include smart phones, computers (e.g., desktop computers, laptop computers, etc.), head-mounted displays (e.g., virtual reality (VR) headsets, augmented reality (AR) headsets, etc.), VR devices, AR devices, tablet devices, media players, televisions, automobiles, vehicles, cameras, video camcorders, digital cameras, cellular phones, personal cameras, action cameras, aircraft, drones, unmanned aerial vehicles (UAVs), healthcare equipment, gaming consoles, personal digital assistants (PDAs), set-top boxes, media players, etc. In some configurations, the electronic device 1651 may be at least part of a removable module in a vehicle. For example, the electronic device 1651 may be included in and/or coupled to a vehicle and may be removable from the vehicle. The electronic device 1651 described in connection with FIG. 16 may or may not be an example of one or more of the electronic devices 102, 302, 866, 902, 1066, 1102, 1266, 1302, 1466, 1502 described in connection with one or more of FIGS. 1-5 and 8-15. In some configurations, one or more of the components or elements of the electronic device 1651 may or may not be similar to corresponding components or elements described in connection with one or more of FIGS. 1-5 and 8-15. One or more of the components or elements may be implemented in hardware (e.g., circuitry) or a combination of hardware and software (e.g., a processor with instructions).

In some configurations, the electronic device 1651 may include a memory 1667, one or more displays 1673, one or more image sensors 1653, one or more optical systems 1655, one or more communication interfaces 1657, one or more antennas 1659 and/or one or more processors 1661. Two or more of the elements or components described in connection with FIG. 16 may be in electronic communication with each other. For example, the processor 1661 may be coupled to (e.g., in electronic communication with) the memory 1667. The processor(s) 1661 may include one or more central processing units (CPUs), very long instruction word (VLIW) circuits, graphics processing units, application-specific integrated circuits (ASICs), etc., or any combination thereof. For example, the processor 1661 may be a VLIW circuit 104, 304, 868, 904, 1068, 1104, 1268, 1304, 1468, 1504 described in connection with one or more of FIGS. 1-5 and 8-15. In some configurations, the processor 1661 may be a CPU with an integrated VLIW circuit (e.g., GPU) or may be a CPU and a separate VLIW circuit (e.g., GPU). For instance, the processor 1661 may be a device for rendering images. In some configurations, the resulting image(s) may be presented on the one or more displays 1673.

The communication interface 1657 may enable the electronic device 1651 to communicate with one or more other electronic devices. For example, the communication interface 1657 may provide an interface for wired and/or wireless communications. In some configurations, the communication interface 1657 may be coupled to one or more antennas 1659 for transmitting and/or receiving radio frequency (RF) signals. Additionally or alternatively, the communication interface 1657 may enable one or more kinds of wireline (e.g., Universal Serial Bus (USB), Ethernet, Video Graphics Array (VGA), Digital Visual Interface (DVI), High Definition Multimedia Interface (HDMI), DisplayPort, Mobile High-Definition Link (MHL), etc.) communication.

In some configurations, multiple communication interfaces 1657 may be implemented and/or utilized. For example, one communication interface 1657 may be a cellular (e.g., 3G, Long Term Evolution (LTE), CDMA, etc.) communication interface 1657, another communication interface 1657 may be an Ethernet interface, another communication interface 1657 may be a universal serial bus (USB) interface, yet another communication interface 1657 may be a wireless local area network (WLAN) interface (e.g., Institute of Electrical and Electronics Engineers (IEEE) 802.11 interface), and yet another communication interface 1657 may be a Bluetooth interface.

In some configurations, the electronic device 1651 may perform one or more of the functions, procedures, methods, steps, etc., described in connection with one or more of FIGS. 1-15 and 17-24. Additionally or alternatively, the electronic device 1651 may include one or more of the structures described in connection with one or more of FIGS. 1-15 and 17-24.

The memory 1667 may store instructions and/or data. The memory 1667 may include system memory and/or on-chip memory. The memory 1667 described in connection with FIG. 16 may or may not be an example of one or more of the memories 110, 114, 310, 314, 803, 805, 910, 914, 1003, 1005, 1110, 1114, 1203, 1205, 1310, 1314, 1403, 1405, 1510, 1514 described in connection with one or more of FIGS. 1-5 and 8-15. The processor 1661 may access (e.g., read from and/or write to) the memory 1667. The memory 1667 may store geometry data 1669. In some configurations, the memory 1667 may include a frame buffer 1671. The frame buffer 1671 may be a portion of the memory 1667 for storing image data. The buffered image data may be presented on the one or more displays 1673 in some configurations.

In some configurations, processor 1661 may include one or more elements for rendering images. Some examples of the elements may include a front end (FE), vertex processor (VPs, vertex fetcher (VF), vertex shader (VS), tessellation control shader (TCS), hull shader (HS), tessellator (e.g., tessellation engine) (TESS), tessellation evaluation shader (TES), domain shader (DS), geometry shader (GS), rasterizer (Rast), fragment shader (FS), pixel shader (PS), tiler, render output unit (ROP), clipper (Clip) and/or stream out (SOL), etc. In some configurations, one or more of these elements may be referred to as a graphics pipeline.

The processor 1661 may include and/or implement a multi-zone renderer 1663. For example, the multi-zone renderer may be implemented in hardware or a combination of hardware and software. The multi-zone renderer 1663 may render multiple zones of an image. For example, the multi-zone renderer 1663 may render multiple zones of an image based on the geometry data 1669. The multiple zones may be rendered with different tessellated levels of detail. For example, the multi-zone renderer 1663 may render N zones, where at least two of the zones have different tessellated levels of detail. For instance, the multi-zone renderer may render a first zone of an image at a first tessellated level of detail and may render a second zone of the image with a second higher tessellated level of detail. The zones may be static or dynamic. For example, the zones may be at predetermined locations on a display 1673. Accordingly, the multi-zone renderer 1663 may render the geometry at the level of detail corresponding to the static zones. In other configurations, the zones may be dynamic. For example, the zones may move based on eye tracking and/or other factors (e.g., object type, priority, received settings, etc.). In some configurations, a zone may be a circular area (or an area of another shape) approximately centered on the point of a display (e.g., image) where the user is looking. In other configurations, a zone may be the entire area of an image corresponding to a window that the user is viewing.

The electronic device 1651 may be coupled to one or more displays 1673. For example, the electronic device 1651 may include one or more displays 1673 and/or may be coupled to one or more external (e.g., remote) displays 1673. Examples of the display 1673 include liquid crystal display (LCD) panels, light emitting diode (LED) panels (e.g., organic light emitting diode (OLED)) panels, cathode ray tube (CRT) displays, monitors, televisions, projectors, plasma display, head-mounted display(s), electronic ink displays, etc.

In some configurations, the display(s) 1673 may be capable of presenting images on one or more windows (e.g., vehicle windows, building windows, etc.). For example, the display(s) 1673 may include one or more window projectors and/or one or more integrated window display panels. The multi-zone renderer 1663 may render the multiple zones (where two or more zones may have different levels of detail, for example). In some configurations, the electronic device 1651 (e.g., processor 1661) may present different zones on different windows. For example, a first zone may be presented on a first window (e.g., windshield), a second zone may be presented on a second window (e.g., vehicle door window(s)) and/or a third zone may be presented on a third window (e.g., vehicle back window). In some configurations, different zones may be presented on different sections of the same window. For example, a first zone may be presented on a first section of a window (e.g., a driver's side section of a windshield) and a second zone may be presented on a second section of the window (e.g., a passenger side section of the windshield). In another example, the zones may be presented as bars (e.g., horizontal or vertical bars) on a window. For instance, a first zone may be presented on a middle horizontal bar on a window (e.g., windshield) while a second zone may be presented on lower and upper horizontal bars on the window (e.g., windshield). In some configurations, a combination of the foregoing approaches may be utilized. For example, a first zone may be presented on a driver side of a windshield, a second zone may be provided on a passenger side of the windshield and a third zone may be presented on vehicle door windows. Other variations may be implemented.

In some configurations, the electronic device 1651 may include an asynchronous memory controller and/or a non-uniform frame buffer controller. For example, the multi-zone renderer 1663 may include and/or be coupled to an asynchronous memory controller and/or a non-uniform frame buffer controller. The multi-zone renderer 1663 may or may not render the multiple zones in accordance with the operations, functions and/or approaches described in connection with the asynchronous memory controller and/or the non-uniform frame buffer controller as described herein. For example, the electronic device 1651 may or may not perform single-pass multi-LOD rendering as described herein.

The electronic device 1651 may obtain one or more images (e.g., digital images, image frames, video, etc.). The one or more images may be images of one or more users and/or a scene (e.g., one or more objects and/or background). For example, the electronic device 1651 may include one or more image sensors 1653 and/or one or more optical systems 1655 (e.g., lenses) that focus images of objects that are located within the field of view of the optical system(s) 1655 onto the image sensor(s) 1653. In some configurations, the image sensor(s) 1653 may capture the one or more images. The image sensor(s) 1653 and/or optical system(s) 1655 may be coupled to and/or controlled by the processor 1661.

Additionally or alternatively, the electronic device 1651 may request and/or receive the one or more images from another device (e.g., an external image sensor coupled to the electronic device 1651, a network server, traffic camera, drop camera, automobile camera, web camera, etc.). In some configurations, the electronic device 1651 may request and/or receive the one or more images via the communication interface 1657. For example, the electronic device 1651 may or may not include a camera (e.g., an image sensor 1653 and/or optical system 1655) and may receive images from a remote device.

In some configurations, the one or more image sensors 1653 included in the electronic device 1651 and/or one or more other image sensors coupled to the electronic device 1651 may be oriented to capture one or more images of a user. For example, a smartphone may include a camera mounted on the same face as a display (e.g., display 1673). In this way, the camera may capture images of a user while the user is looking at the display. In another example, a camera may be mounted in a console and/or steering wheel of a vehicle to capture images of a user (e.g., driver).

Additionally or alternatively, the one or more image sensors 1653 included in the electronic device 1651 and/or one or more other image sensors coupled to the electronic device 1651 may be oriented to capture scenery. For example, one or more cameras may be mounted on the back side of a smart phone. In another example, one or more cameras may be mounted on the exterior of a vehicle. In some configurations, the electronic device 1651 may utilize the images of scenery in augmented reality (AR) applications, virtual reality (VR) applications and/or other applications (e.g., surround view visualization, driver assistance, advanced driver assistance systems (ADAS), etc.).

In some configurations, the image(s) captured by the image sensor(s) 1653 and/or received via the communication interface(s) 1657 may be utilized by the electronic device 1651 for eye tracking. For example, the processor 1661 may include and/or implement an eye tracker 1665. The eye tracker 1665 may track the gaze (e.g., look direction) of one or more users' eye(s). For example, the eye tracker 1665 may locate the eye(s) of one or more users in the image(s) and may estimate the gaze (e.g., look direction) of the user(s). For instance, the eye tracker 1665 may determine (e.g., estimate) where a user is looking on a display (e.g., display 1673 or an external display) and/or where a user is looking on an image presented by a display. In other words, the eye tracker 1665 may determine (e.g., estimate) where a user's gaze is directed relative to an image and/or a display. In some configurations, the eye tracker 1665 may perform eye tracking similarly to the eye tracker 326 described above in connection with FIG. 3.

In some configurations, the multi-zone renderer 1663 may render one or more zones of an image based on eye tracking. The zones of the image may have different levels of detail. For instance, the multi-zone renderer 1663 may render multiple zones with different levels of detail, where a zone with a highest level of detail is rendered in an area where a user is currently looking. In some configurations, this may be referred to as foveated rendering. The eye tracker 1665 may produce eye tracking information. The eye tracking information may indicate where a user's gaze is directed (e.g., users' gazes are directed) relative to a display and/or image. In some configurations, the processor 1661 and/or the processor 1661 may determine one or more LOD parameters based on the eye tracking information. The LOD parameter(s) may indicate a LOD to be rendered for one or more zones of an image. The LOD parameter(s) may be stored in memory 1667. The LOD parameter(s) may or may not be updated asynchronously in relation to a set of data (e.g., draw call) that is being processed by the processor 1661.

The eye tracker 1665 may detect when a user changes gaze to look at a different part of the image. The systems and methods disclosed herein may change the LOD rendering based on the eye tracking (e.g., the eye tracking information and/or LOD parameter(s)). For example, the multi-zone renderer 1663 may increase the LOD in an area of the image that the user has changed gaze to view. Additionally or alternatively, the systems and methods disclosed herein may reduce the LOD in an area of the image that the user's gaze is no longer directed to. As described above, different zones may correspond to different windows in some configurations. The multi-zone renderer 1663 may change the zone that corresponds to a window (and/or a window section) based on which window the user is looking at. For example, the multi-zone renderer 1663 may render a high-LOD zone on the windshield of a vehicle while the user (e.g., driver) is looking at (e.g., through) the windshield. When a user (e.g., driver) looks at another window (e.g., turns to check a blind spot and/or to drive in reverse, etc.), the multi-zone renderer 1663 may change the high-LOD zone to the window (e.g., side window and/or back window) that the user is looking at (e.g., through).

In some configurations, the eye tracker 1665 may track one or more eyes of each of multiple users (e.g., a driver's eyes and one or more passengers' eyes). The systems and methods disclosed herein may prioritize the zone rendering (e.g., LOD rendering) based on the eye tracking (e.g., the eye tracking information and/or LOD parameter(s)). In some approaches, the multi-zone renderer 1663 may provide a higher LOD for a zone corresponding to one user (or for zones corresponding to a set of priority users, for example) and one or more lower LODs for one or more zones corresponding to one or more other users. Additionally or alternatively, the multi-zone renderer 1663 may render a zone first corresponding to one user first and may render one or more other zones afterwards (in a sequence, for example) corresponding to one or more other users. For example, the multi-zone renderer 1663 may provide increased LOD in an area of the image being viewed by a driver and/or may render the image first in an area of the image being viewed by the driver. The multi-zone renderer 1663 may provide lower LOD in an area of the image being viewed by a passenger and/or may render the image in an area of the image being viewed by the passenger after that of the driver. In some configurations, the priority may be predetermined (e.g., a manufacturer and/or a user may set a priority), may be based on user location (e.g., vehicle driver gets highest priority and passenger(s) get lower priority) and/or may be based on user recognition (e.g., a recognized user gets higher priority, other recognized and/or non-recognized users get lower priority or priorities).

The systems and methods disclosed herein may provide improvements in window display technology. For example, a vehicle may be equipped with one or more window displays (e.g., window projector(s) and/or window display panel(s)). The window display(s) may be configured to operate in one or more applications. For example, a vehicle window display may present driving directions to a driver. For example, the electronic device 1651 may render an image with an arrow that shows an upcoming turn at a side street. Other images may be rendered and/or presented. For example, the electronic device 1651 may render indicator(s) and/or highlight(s) that show and/or emphasize street signs, stop signs, traffic lights, pedestrians, navigation information (e.g., driving directions, maps, vehicle location, destination, etc.), obstructions, warnings, other safety information (e.g., distance to another vehicle in front, whether there is enough stopping distance at the current speed, etc.), vehicle information (e.g., current speed, low fuel indicator, revolutions per minute (RPMs), distance traveled, temperature, time, oil change indicator, check engine indicator, engine temperature, temperature warning), entertainment information (e.g., radio station, music track name, song duration, song time played, movie name, movie duration, movie time played, movie content, photo content, etc.), communication information (e.g., phone call information, local area network (LAN) status, Bluetooth connectivity, etc.), etc.

As image content continues to increase in quality (e.g., more detailed geometry, higher resolution textures, larger display areas, etc.), displaying highly detailed content may be difficult. This may be particularly true for platforms in which processing bandwidth and/or power efficiency limitations are concerns. Rendering different zones with different levels of detail (e.g., tessellated levels of detail) may help to prioritize rendering resources. Accordingly, more detail may be provided to information that is more important and/or that is of interest to a user. For example, a zone with a higher LOD may be rendered where a user is looking and/or is likely to look (e.g., in a middle portion of a windshield, where the user's eyes are gazing, where a warning is being displayed, etc.). This may provide an improved experience, as interesting and/or important information is presented with higher detail. Additionally or alternatively, areas where a user may not notice lesser detail (e.g., in peripheral vision) and/or areas that typically contain less important information (e.g., a side window) may be rendered with less detail to save processing and/or energy resources.

It should be noted that tessellated level of detail is different from pixel resolution. For example, pixel resolution may refer to pixel density and/or how many pixels are dedicated to a certain image (or area of an image). Tessellated level of detail may refer to how finely rendered geometry is tessellated (e.g., subdivided). For example, the greater number of points, polygons and/or lines dedicated to render geometry and/or area of an image may reflect the tessellated level of detail (LOD). Additionally or alternatively, different levels of detail may correspond to different quality shaders (e.g., a higher LOD may correspond to a higher quality shader, where more detailed and/or expensive processing is performed). It should be noted that in some configurations, the pixel resolution may constrain the tessellation level. For example, 1 pixel may not need 100 triangles; a 10×10 tile may not need 1,000 triangles, etc.

In some configurations, the electronic device 1651 may include a camera application and/or a display 1673. When the camera application is running, images of objects that are located within the field of view of the optical system 1655 may be captured by the image sensor 1653. The images that are being captured by the image sensor 1653 may be presented on the display 1673. In some configurations, these images may be displayed in rapid succession at a relatively high frame rate so that, at any given moment in time, the objects that are located within the field of view of the optical system 1655 are presented on the display 1673.

It should be noted that one or more of the elements illustrated in the electronic device 1651 may be optional. For example, one or more of the elements illustrated in the electronic device 1651 may or may not be included and/or implemented. Additionally or alternatively, one or more of the elements illustrated in the processor 1661 may be implemented separately from the processor 1661 (e.g., in other circuitry, on another processor, on a separate electronic device, etc.). For example, the image sensor 1653, the optical system 1655, the communication interface 1657, the eye tracker 1665 and/or the display 1673 may not be implemented on the electronic device 1651. In some configurations, the electronic device 1651 may receive images and/or eye tracking information from another device. Additionally or alternatively, one or more displays may be implemented on separate device.

In some configurations, the electronic device 1651 may present a user interface 1675 on the display 1673. For example, the user interface 1675 may enable a user to interact with the electronic device 1651. In some configurations, the display 1673 may be a touchscreen that receives input from physical touch (by a finger, stylus or other tool, for example). Additionally or alternatively, the electronic device 1651 may include or be coupled to another input interface. For example, the electronic device 1651 may include a camera facing a user and may detect user gestures (e.g., hand gestures, arm gestures, eye tracking, eyelid blink, etc.). In another example, the electronic device 1651 may be coupled to a mouse and may detect a mouse click. It should be noted that no user input may be necessary in some configurations.

In some configurations, the electronic device 1651 may optionally include a motion sensor (e.g., gyroscope(s), accelerometer(s), etc.). For example, the motion sensor may detect motion and/or an orientation (of the electronic device 1651, for instance). In some configurations, the image being rendered may be based on motion and/or orientation information. For example, the electronic device 1651 may be a head-mounted display (e.g., a virtual reality (VR) headset, augmented reality (AR) headset, etc.), a vehicle (e.g., automobile, drone, airplane, etc.), a mobile device (e.g., smartphone) or other device that may utilize motion and/or orientation information to render an image. For instance, the motion and/or orientation information may indicate a general viewing direction in a rendered scene. The electronic device 1651 may render the image based on this viewing direction in addition to or alternatively from the eye tracking information in some configurations.

Figure 17:
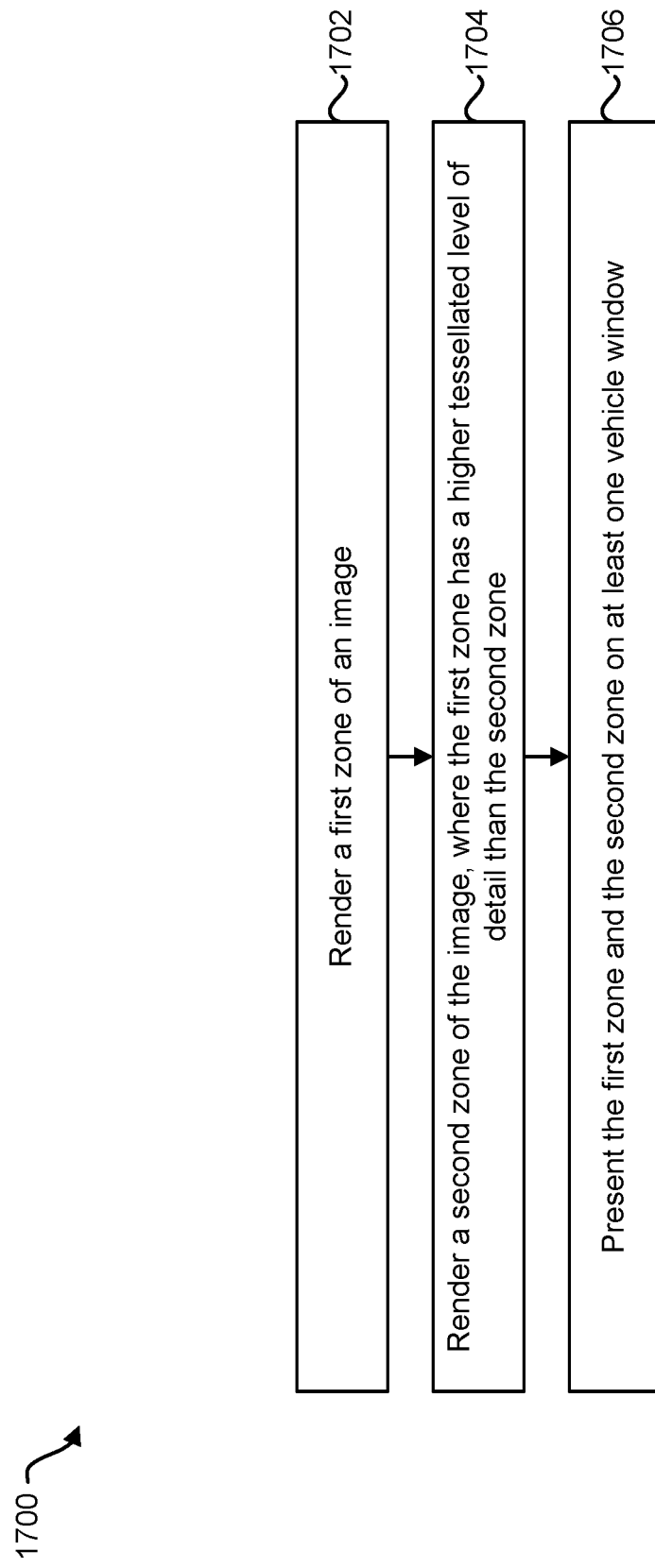
FIG. 17 is a flow diagram illustrating a method for rendering multiple zones.

FIG. 17 is a flow diagram illustrating a method 1700 for rendering multiple zones. The method 1700 may be performed by the electronic device 1651 described in connection with FIG. 16.

The electronic device 1651 may render 1702 a first zone of an image. This may be accomplished as described above in connection with FIG. 16. For example, the electronic device 1651 may perform one or more of geometry fetching (e.g., vertex fetching), vertex shading, tessellation control shading, tessellation, tessellation evaluation shading, geometry shading, tiling, rasterizing and/or fragment shading corresponding to a first zone of an image.

The electronic device 1651 may render 1704 a second zone of the image. This may be accomplished as described above in connection with FIG. 16. For example, the electronic device 1651 may perform one or more of geometry fetching (e.g., vertex fetching), vertex shading, tessellation control shading, tessellation, tessellation evaluation shading, geometry shading, tiling, rasterizing and/or fragment shading corresponding to a second zone of the image. The first zone may have a higher tessellated level of detail than the second zone. For example, the first zone may have a higher tessellation setting (e.g., higher geometry density) than a tessellation setting for the second zone.

The electronic device 1651 may present 1706 the first zone and the second zone on at least one vehicle window. This may be accomplished as described above in connection with FIG. 16. For example, the first zone and the second zone may be presented on separate sections of a window (e.g., windshield) and/or on different windows.

Figure 18:
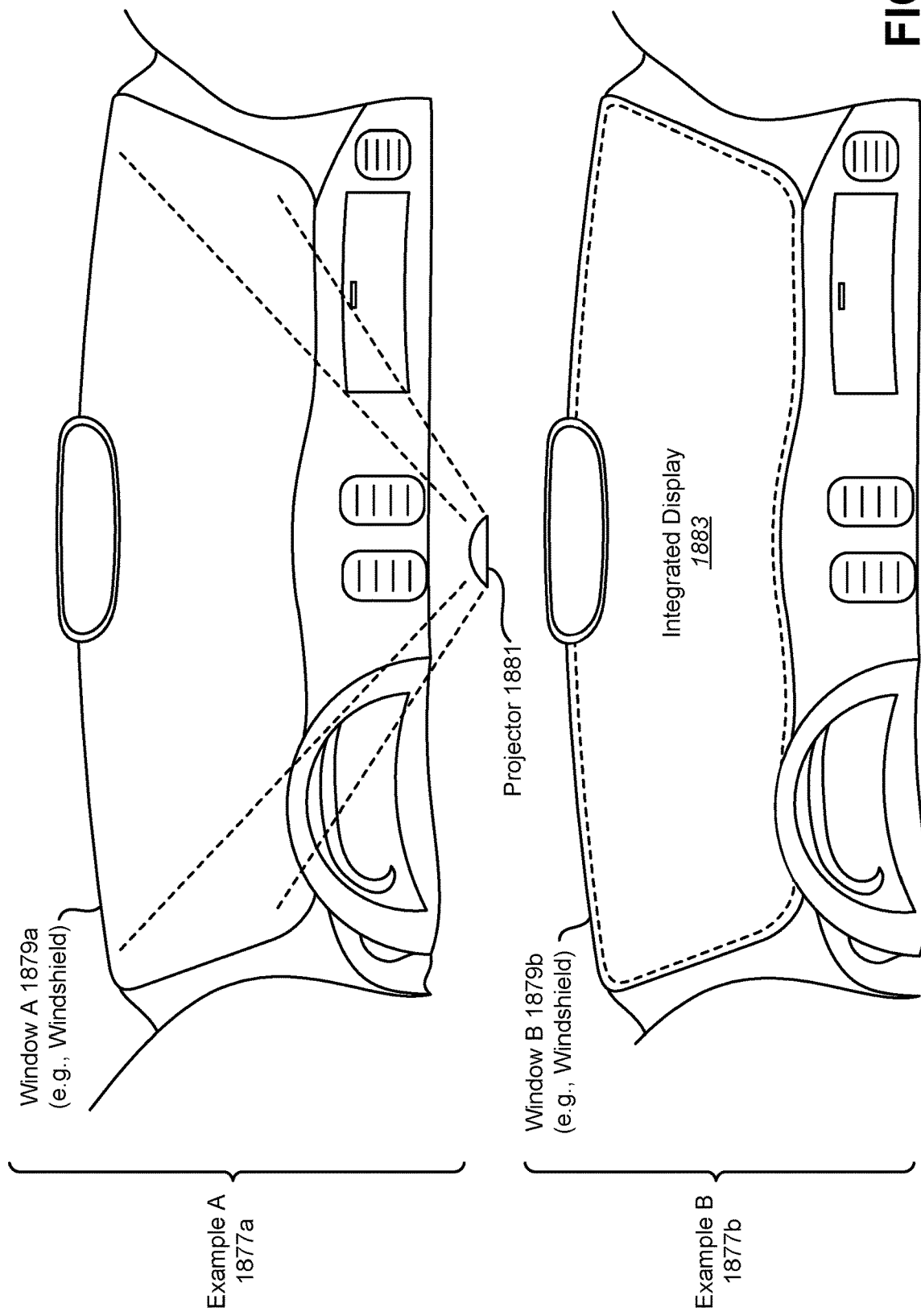
FIG. 18 is a diagram illustrating some examples of window displays.

FIG. 18 is a diagram illustrating some examples 1877*a-b* of window displays. Specifically, example A 1877*a* illustrates window A 1879*a* (e.g., a windshield). In example A 1877*a*, a projector 1881 is mounted in order to project an image onto window A 1879*a*. For example, one or more projectors 1881 may be mounted in a dashboard, door, on the ceiling and/or on walls (e.g., framing) of a vehicle. In some configurations, a single projector 1881 may be configured to project images to one or more windows. In other configurations, multiple projectors 1881 may be configured to project images to one or more windows. In some configurations, the projector 1881 may be mounted in a removable device and/or a mobile device.

Example B 1877*b* illustrates window B 1879*b* (e.g., a windshield). In example B 1877*b*, an integrated display 1883 may be attached to window B 1879. For example, the integrated display 1883 may be transparent or semitransparent. The integrated display 1883 may present images on window B 1879*b*. For example, the integrated display 1883 may be an LCD panel, an OLED panel, etc. In some configurations, a single projector integrated display 1883 may be configured to present images on one or more windows. In other configurations, multiple integrated displays 1883 may be configured to present images on one or more windows. It should be noted that window projectors and/or integrated displays may be implemented in many kinds of windows (e.g., window(s) in a vehicle, building, airplane, boat, tram, train, etc.).

Figure 19:
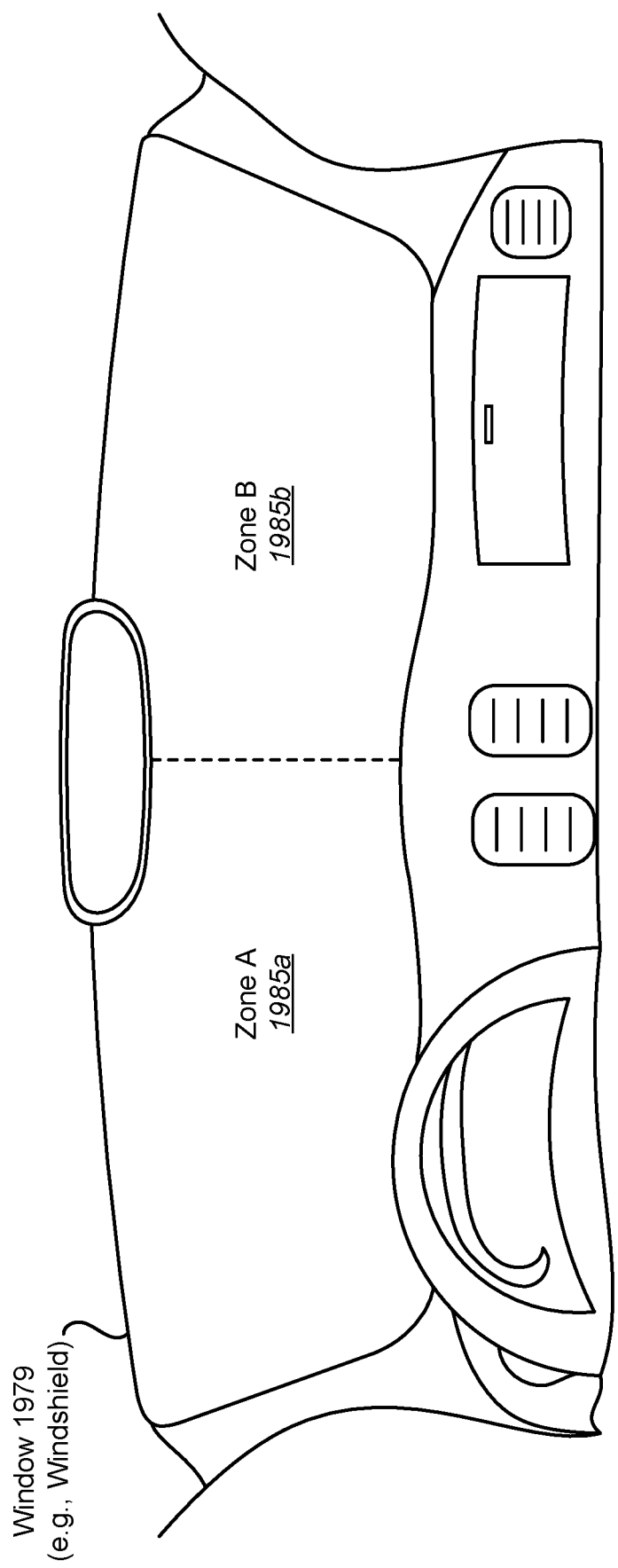
FIG. 19 is a diagram illustrating one example of zones on a window.

FIG. 19 is a diagram illustrating one example of zones 1985*a-b* on a window 1979. In this example, zone A 1985*a* is a side section (e.g., left side section) of the window 1979 (e.g., windshield) and zone B 1985*b* is another side section (e.g., right side section) of the window. Assuming the window 1979 is a windshield in a vehicle, for instance, the electronic device 1651 (e.g., multi-zone renderer 1663) may render a higher level of detail in the zone corresponding to the driver's side (e.g., zone A 1985a). A lower level of detail may be rendered in the zone corresponding to the passenger side (e.g., zone B 1985b). In this way, the driver may view of higher level of detail of an image in an area that the driver typically sees. It should be noted that a different number of zones may be rendered. Additionally or alternatively, the zones 1985a-b may each occupy half or different proportions of the window 1979 (e.g., 70% versus 30%).

Figure 20:
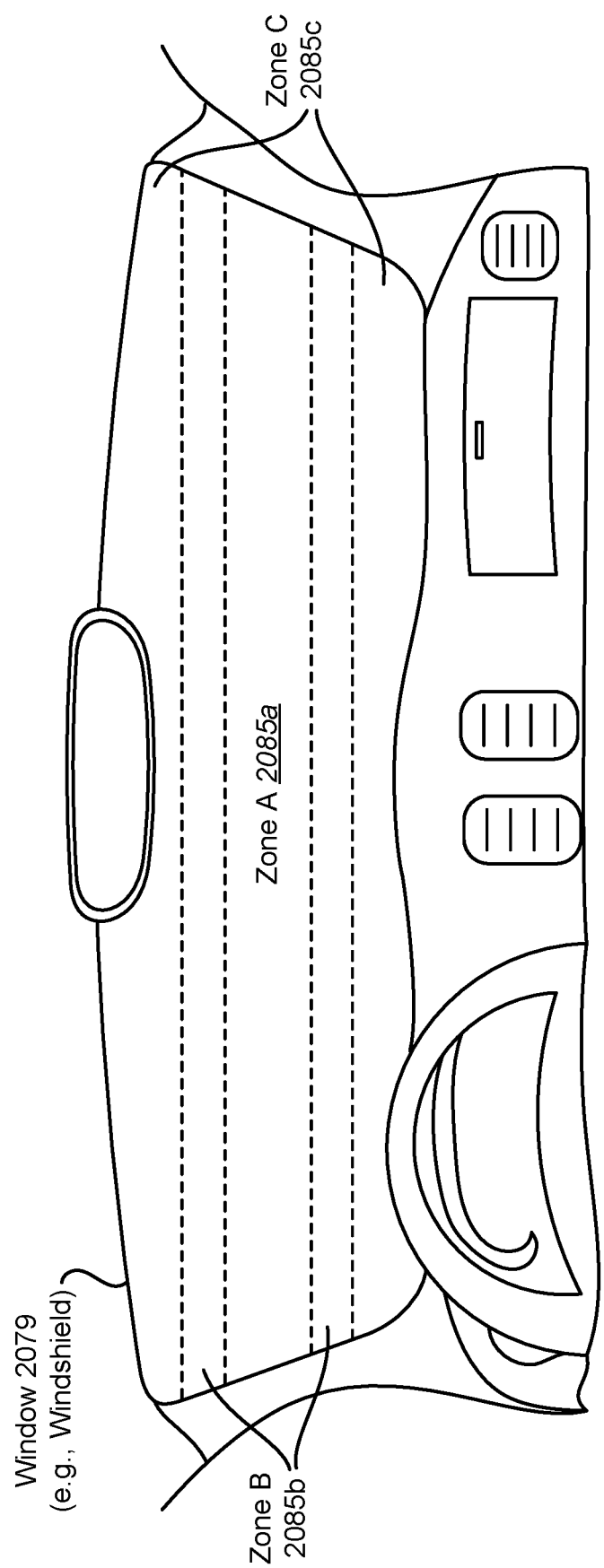
FIG. 20 is a diagram illustrating another example of zones on a window.

FIG. 20 is a diagram illustrating another example of zones 2085a-c on a window 2079. In this example, zone A 2085a is a horizontal bar across a middle portion of the window 2079 (e.g., windshield). Zone B 2085b includes two horizontal bars that border zone A 2085a and zone C 2085c includes two horizontal bars that border zone B 2085b. Assuming the window 2079 is a windshield in a vehicle, for instance, the electronic device 1651 (e.g., multi-zone renderer 1663) may render a higher level of detail in zone A 2085a. A lower level of detail may be rendered in zone B 2085b. An even lower level of detail may be rendered in zone C 2085c. In this way, the driver may view of higher level of detail of an image in an area that the driver sees when looking over the span of the windshield. It should be noted that a different number of zones may be rendered. Additionally or alternatively, the zones 2085a-c may each occupy equal or different proportions of the window 2079 (e.g., 50%/30%/20%).

Figure 21:
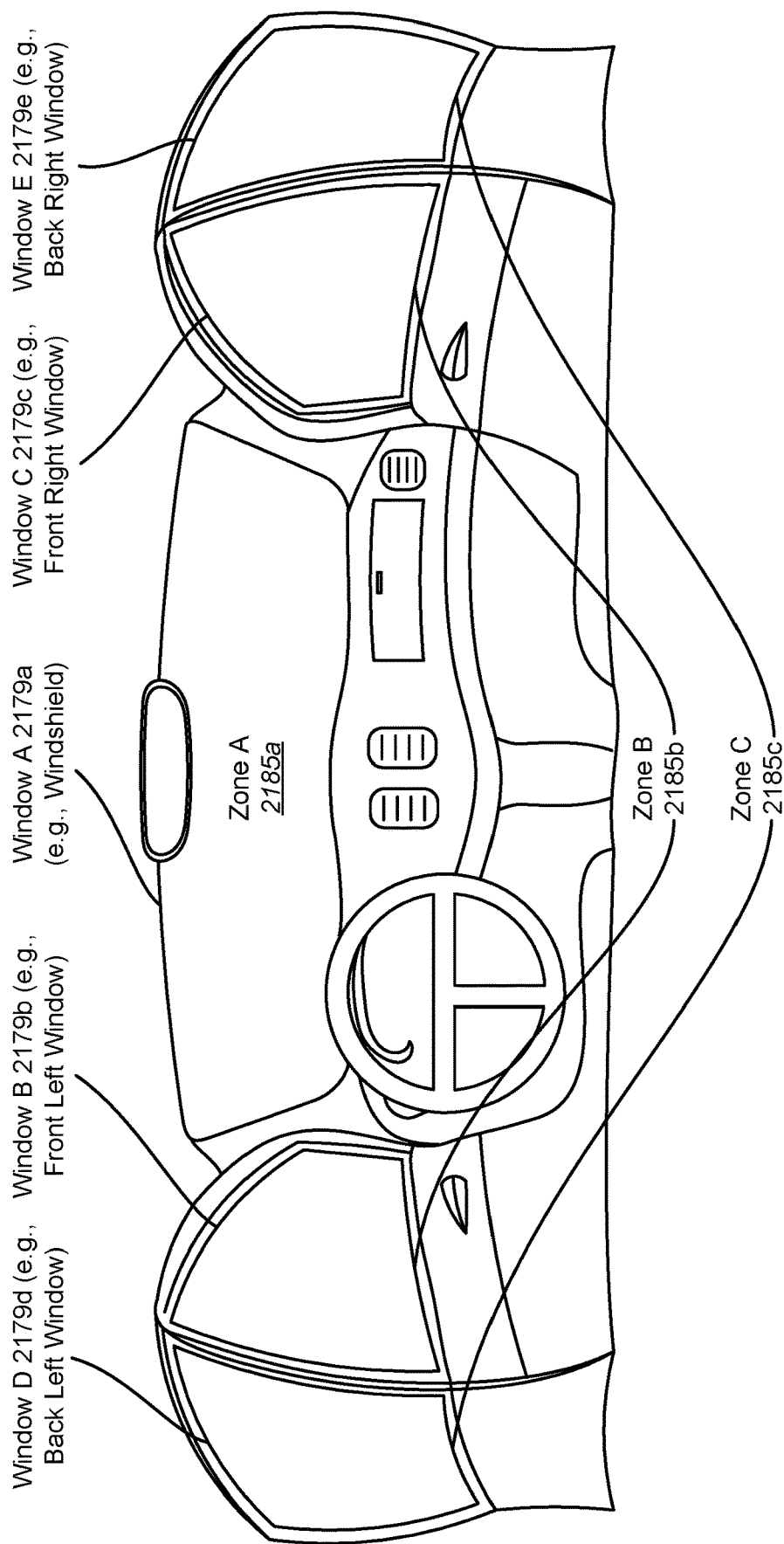
FIG. 21 is a diagram illustrating another example of zones on multiple windows.

FIG. 21 is a diagram illustrating another example of zones 2185a-c on multiple windows 2179a-e. In this example, zone A 2185a is rendered on window A 2179a (e.g., a windshield). Zone B 2185b is rendered on window B 2179b and window C 2179c (e.g., front left and right windows). Zone C 2185c is rendered on window D 2179d and window E 2179e (e.g., back left and right windows). Assuming window A 2179a is a windshield in a vehicle, for instance, the electronic device 1651 (e.g., multi-zone renderer 1663) may render a higher level of detail in zone A 2185a. A lower level of detail may be rendered in zone B 2185b. An even lower level of detail may be rendered in zone C 2185c. In this way, the driver may view of higher level of detail of an image in an area that the driver sees when looking out of the windshield. It should be noted that a different configuration of zones and/or a different number of zones may be rendered. For example, zone C 2185c (or another zone) may be rendered on a rear window.

Figure 22:
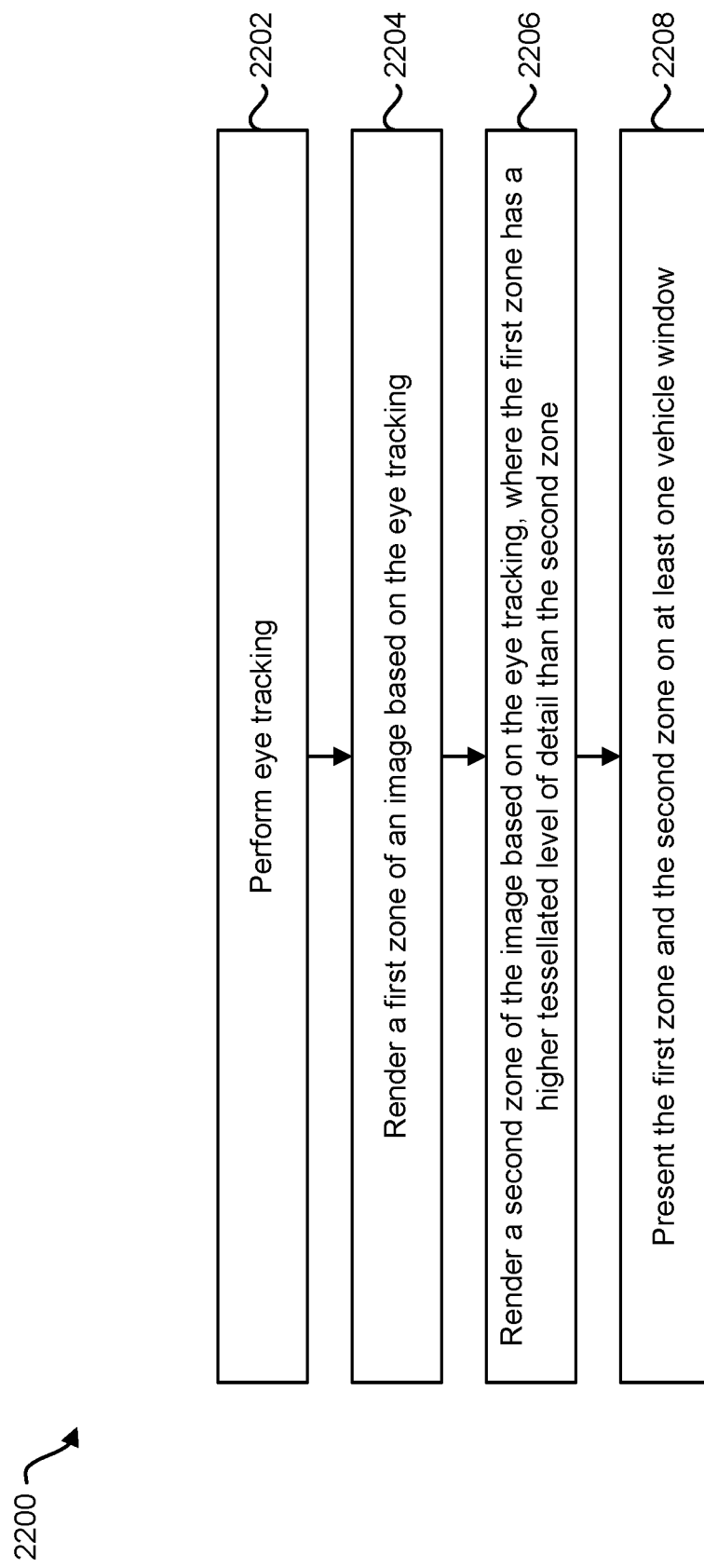
FIG. 22 is a flow diagram illustrating a more specific configuration of a method for rendering multiple zones.

FIG. 22 is a flow diagram illustrating a more specific configuration of a method 2200 for rendering multiple zones. The method 2200 may be performed by the electronic device 1651 described in connection with FIG. 16.

The electronic device 1651 may perform 2202 eye tracking. This may be accomplished as described in connection with one or more of FIGS. 3, 5 and 16. For example, the electronic device 1651 may capture one or more images of a user (e.g., one or more users). The electronic device 1651 may identify one or more eyes of one or more users in the image(s). The electronic device 1651 may then determine where the one or more users' eye(s) are directed relative to one or more displays (e.g., display 1673) and/or image(s) on the display(s).

The electronic device 1651 may render 2204 a first zone of an image based on the eye tracking. This may be accomplished as described in connection with one or more of FIGS. 1-5 and 8-17. For example, the electronic device 1651 may perform one or more of geometry fetching (e.g., vertex fetching), vertex shading, tessellation control shading, tessellation, tessellation evaluation shading, geometry shading, tiling, rasterizing and/or fragment shading corresponding to a first zone of an image. The location of the first zone may be based on the eye tracking. For example, the electronic device 1651 may establish the first zone as a section of an image around the location where the user's eye(s) are directed. In some configurations, the first zone may be a circular area (or an area of another shape) approximately centered on the point of a display (e.g., image) where the user is looking. In other configurations, the first zone may be the entire area of an image corresponding to a window that the user is viewing.

The electronic device 1651 may render 2206 a second zone of the image based on the eye tracking. This may be accomplished as described in connection with one or more of FIGS. 1-5 and 8-17. For example, the electronic device 1651 may perform one or more of geometry fetching (e.g., vertex fetching), vertex shading, tessellation control shading, tessellation, tessellation evaluation shading, geometry shading, tiling, rasterizing and/or fragment shading corresponding to a second zone of the image. The first zone may have a higher tessellated level of detail than the second zone. For example, the first zone may have a higher tessellation setting (e.g., higher geometry density) than a tessellation setting for the second zone. The location of the second zone may be based on the eye tracking. In some configurations, the electronic device 1651 may establish the second zone as a section of an image around the first zone. For instance, the second zone may be a circular area (or an area of another shape) surrounding the first zone. In other configurations, the second zone may be an area of an image corresponding to a window that the user is not viewing. In yet other configurations, the second zone may be the whole image except for the first zone. It should be noted that more zones may be rendered. The zones may or may not overlap. In some configurations, zone rendering may be prioritized as described in connection with FIG. 16.

The electronic device 1651 may present 2208 the first zone and the second zone on at least one vehicle window. This may be accomplished as described above in connection with one or more of FIGS. 16-21. For example, the first zone and the second zone may be presented on separate sections of a window (e.g., windshield) and/or on different windows.

Figure 23:
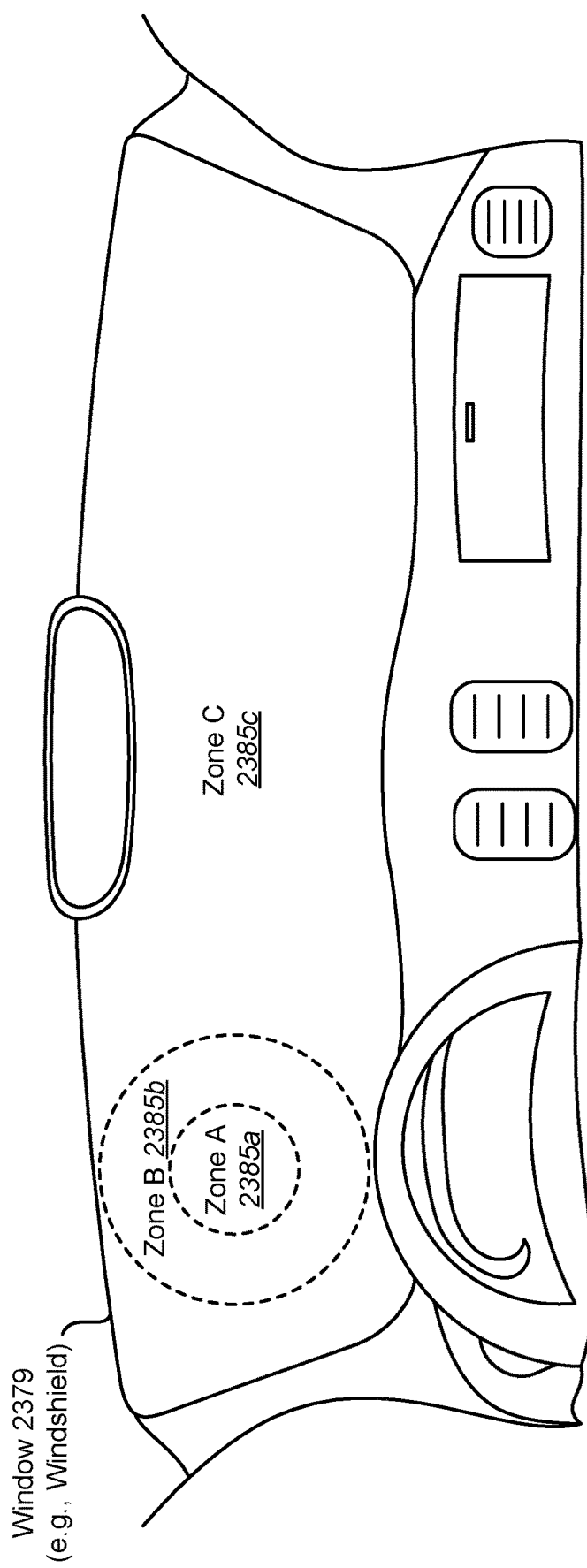
FIG. 23 is a diagram illustrating another example of zones on a window.

FIG. 23 is a diagram illustrating another example of zones 2385a-c on a window 2379. In this example, zone A 2385a is a circular area of the window 2379 (e.g., windshield) where a user is looking based on eye tracking. Zone B 2385b is a circular area surrounding zone A 2385a. Zone C 2385c is an area of the window 2379 that does not include zone A 2385a and zone B 2385b. Assuming the window 2379 is a windshield in a vehicle, for instance, the electronic device 1651 (e.g., multi-zone renderer 1663) may render a higher level of detail in zone A 2385a. A lower level of detail may be rendered in zone B 2385b. An even lower level of detail may be rendered in zone C 2385c. In this way, the driver may view of higher level of detail of an image in an area where the driver is currently looking (anywhere on the windshield). It should be noted that a different number of zones may be rendered.

Figure 24:
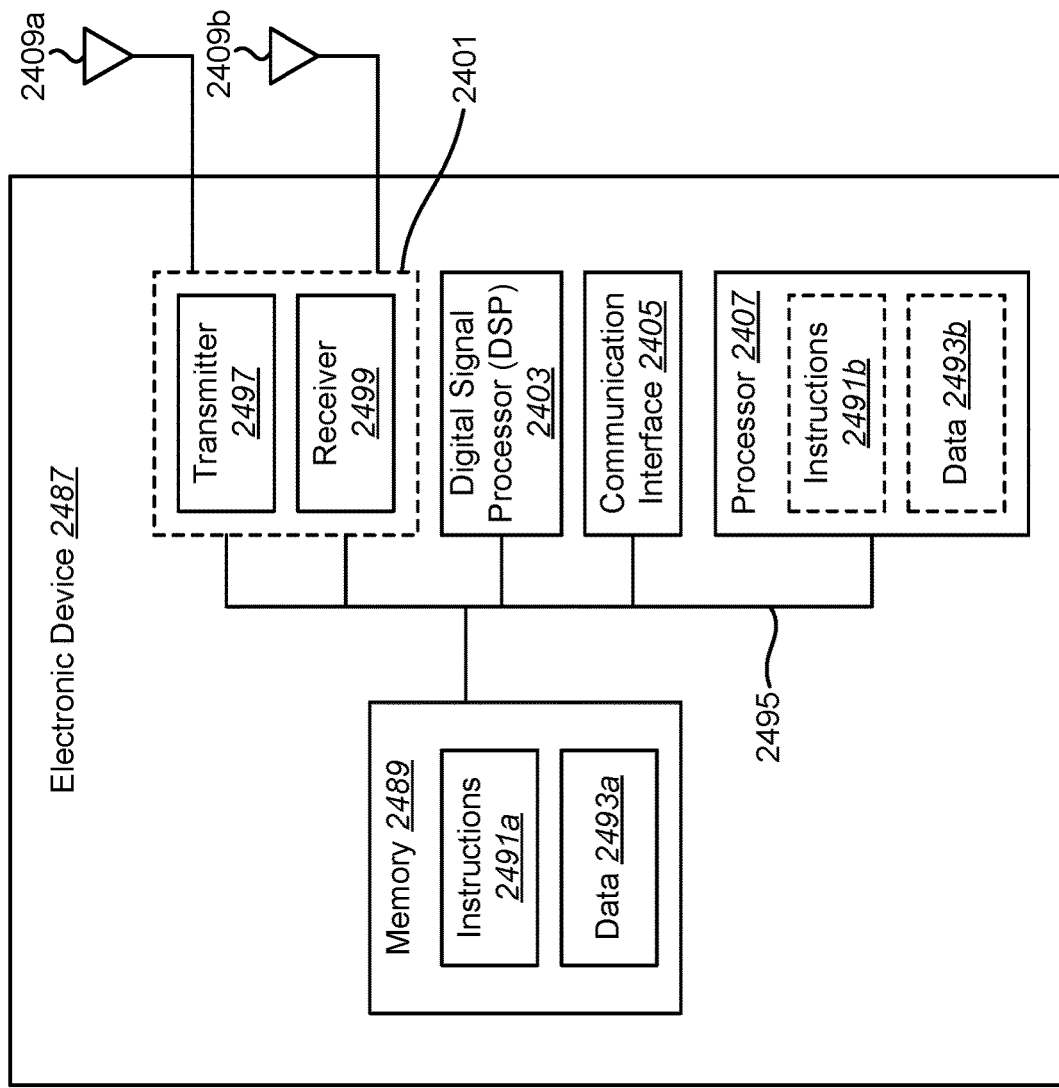
FIG. 24 illustrates certain components that may be included within an electronic device.

FIG. 24 illustrates certain components that may be included within an electronic device 2487. The electronic device 2487 may be (or may be included within) a camera, video camcorder, digital camera, cellular phone, smart phone, computer (e.g., desktop computer, laptop computer, etc.), tablet device, media player, television, vehicle, headset (e.g., virtual reality headset, augmented reality headset), head-mounted display, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 2487 may be implemented in accordance with one or more of the electronic devices 102, 302, 866, 902, 1066, 1102, 1266, 1302, 1466, 1502, 1651 described herein.

The electronic device 2487 includes a processor 2407. The processor 2407 may be a general purpose single- or multi-chip microprocessor (e.g., an ARM), a special purpose microprocessor (e.g., a digital signal processor (DSP)), a microcontroller, a programmable gate array, etc. The processor 2407 may be referred to as a central processing unit (CPU) and/or VLIW circuit (e.g., GPU). The processor 2407 may be implemented in accordance with one or more of the VLIW circuits 104, 304, 868, 904, 1068, 1104, 1268, 1304, 1468, 1504 and/or processors 324, 1015, 1124, 1661 described herein. Although just a single processor 2407 is shown in the electronic device 2487, in an alternative configuration, a combination of processors (e.g., an ARM and DSP, a CPU and GPU, etc.) could be used.

The electronic device 2487 also includes memory 2489. The memory 2489 may be any electronic component capable of storing electronic information. The memory 2489 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof. The memory 2489 may be implemented in accordance with one or more of the memories 110, 114, 310, 314, 803, 805, 910, 914, 1003, 1005, 1110, 1114, 1203, 1205, 1310, 1314, 1403, 1405, 1510, 1514, 1667 described herein.

Data 2493*a* and instructions 2491*a* may be stored in the memory 2489. The instructions 2491*a* may be executable by the processor 2407 to implement one or more of the methods 200, 500, 600, 1700, 2200 described herein. Executing the instructions 2491*a* may involve the use of the data 2493*a* that is stored in the memory 2489. When the processor 2407 executes the instructions 2491, various portions of the instructions 2491*b* may be loaded onto the processor 2407, and various pieces of data 2493*b* may be loaded onto the processor 2407.

The electronic device 2487 may also include a transmitter 2497 and a receiver 2499 to allow transmission and reception of signals to and from the electronic device 2487. The transmitter 2497 and receiver 2499 may be collectively referred to as a transceiver 2401. One or multiple antennas 2409*a-b* may be electrically coupled to the transceiver 2401. The electronic device 2487 may also include (not shown) multiple transmitters, multiple receivers, multiple transceivers and/or additional antennas.

The electronic device 2487 may include a digital signal processor (DSP) 2403. The electronic device 2487 may also include a communication interface 2405. The communication interface 2405 may enable one or more kinds of input and/or output. For example, the communication interface 2405 may include one or more ports and/or communication devices for linking other devices to the electronic device 2487. Additionally or alternatively, the communication interface 2405 may include one or more other interfaces (e.g., touchscreen, keypad, keyboard, microphone, camera, etc.). For example, the communication interface 2405 may enable a user to interact with the electronic device 2487.

The various components of the electronic device 2487 may be coupled together by one or more buses, which may include a power bus, a control signal bus, a status signal bus, a data bus, etc. For the sake of clarity, the various buses are illustrated in FIG. 24 as a bus system 2495.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a graphics processing unit (GPU), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, a combination of a CPU and GPU, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:
a memory configured to store geometry data; and
a very long instruction word (VLIW) circuit comprising an asynchronous memory controller, wherein the asynchronous memory controller is configured to asynchronously access the memory to render different first and second geometric tessellated levels of detail for the geometry data in a single draw call, and wherein the electronic device comprises a non-uniform frame buffer including different subsets respectively corresponding to the different first and second geometric tessellated levels of detail, and wherein the VLIW circuit is configured to execute a first shader sub-routine that accesses a first frame buffer subset concurrently with a second shader sub-routine that accesses a second frame buffer subset and to swap the second shader sub-routine with a third shader sub-routine that accesses the second frame buffer subset while the first shader sub-routine is ongoing.

2. The electronic device of claim 1, wherein the electronic device further comprises a non-uniform frame buffer controller configured to dynamically access the different subsets of the non-uniform frame buffer.

3. The electronic device of claim 2, wherein the non-uniform frame buffer controller is configured to access at least one pixel of a first zone at a different rate from at least one pixel of a second zone, wherein the first zone and the second zone correspond to the different first and second geometric tessellated levels of detail.

4. The electronic device of claim 2, wherein the non-uniform frame buffer controller is configured to enable shader sub-routine swapping when processing of a first pixel is ongoing and processing of a second pixel is completed.

5. The electronic device of claim 2, where the non-uniform frame buffer controller is configured to substitute a processed first sample of a first pixel for a second sample of a second pixel to avoid processing the second sample of the second pixel, wherein the first pixel has a different number of samples than the second pixel.

6. The electronic device of claim 2, wherein the non-uniform frame buffer controller is included in a composition/decomposition (C/D) block, included in the memory, or is separate from the C/D block and the memory.

7. The electronic device of claim 1, wherein the VLIW circuit comprises a tessellation control shader (TCS), a tessellator (TESS), a tessellation evaluation shader (TES), a geometry shader (GS), a rasterizer, and a fragment shader (FS), and wherein one or more of the TCS, the TESS, the TES, the GS, the rasterizer, and the FS comprise the asynchronous memory controller.

8. The electronic device of claim 1, wherein the memory is included in the VLIW circuit, and wherein the asynchronous memory controller is configured to access a level of detail (LOD) parameter in the memory asynchronously.

9. The electronic device of claim 1, wherein the VLIW circuit comprises a tessellation control shader (TCS), a tessellator (TESS), a tessellation evaluation shader (TES), a geometry shader (GS), a rasterizer, a fragment shader (FS), and a tiler, and wherein one or more of the TCS, the TESS, the TES, the GS, the rasterizer, the FS, and the tiler comprise the asynchronous memory controller.

10. The electronic device of claim 1, wherein the memory is system memory, and wherein the asynchronous memory controller is configured to access a level of detail (LOD) parameter in the memory asynchronously.

11. The electronic device of claim 1, wherein the asynchronous memory controller is configured to asynchronously access parameter data during processing of a set of data.

12. The electronic device of claim 1, wherein the VLIW circuit is configured to perform non-uniform level of detail tessellation across a zone boundary between a first zone and a second zone in a single data set, wherein the first zone and the second zone correspond to the different first and second geometric tessellated levels of detail.

13. The electronic device of claim 1, wherein the VLIW circuit is configured to perform non-uniform level of detail tessellation in a single data set when a level of detail of the single draw call changes during processing the single data set based on eye tracking.

14. The electronic device of claim 1, further comprising a display configured to present the different first and second geometric tessellated levels of detail.

15. The electronic device of claim 1, wherein the non-uniform frame buffer is configured to store pixels with the different first and second geometric tessellated levels of detail in the different subsets of the non-uniform frame buffer.

16. The electronic device of claim 1, further comprising a graphics pipeline comprising the VLIW circuit and a rasterizer, wherein the rasterizer is configured to generate pixel data based on the different tessellated levels of detail.

17. A method performed by an electronic device, the method comprising:
obtaining geometry data;
asynchronously accessing memory to render different first and second geometric tessellated levels of detail for the geometry data in a single draw call, wherein different subsets of a non-uniform frame buffer respectively correspond to the different first and second geometric tessellated levels of detail;
executing a first shader sub-routine that accesses a first frame buffer subset concurrently with a second shader sub-routine that accesses a second frame buffer subset; and
swapping the second shader sub-routine with a third shader sub-routine that accesses the second frame buffer subset while the first shader sub-routine is ongoing.

18. The method of claim 17, further comprising dynamically accessing different subsets of the non-uniform frame buffer.

19. The method of claim 18, further comprising accessing at least one pixel of a first zone at a different rate from at least one pixel of a second zone, wherein the first zone and the second zone correspond to the different first and second geometric tessellated levels of detail.

20. The method of claim 18, further comprising swapping shader sub-routines when processing of a first pixel is ongoing and processing of a second pixel is completed.

21. The method of claim 17, further comprising accessing a level of detail (LOD) parameter in the memory asynchronously.

22. The method of claim 17, further comprising asynchronously accessing parameter data during processing of a set of data.

23. The method of claim 17, further comprising performing non-uniform level of detail tessellation across a zone boundary between a first zone and a second zone in a single data set, wherein the first zone and the second zone correspond to the different first and second geometric tessellated levels of detail.

24. The method of claim 17, further comprising performing non-uniform level of detail tessellation in a single data set when a level of detail of the single draw call changes during processing the single data set based on eye tracking.

25. The method of claim 17, further comprising storing pixels with the different first and second geometric tessellated levels of detail in the different subsets of the non-uniform frame buffer.

26. A computer-program product, comprising a non-transitory tangible computer-readable medium having instructions thereon, the instructions comprising:
code for causing an electronic device to obtain geometry data;
code for causing the electronic device to asynchronously access memory to render different first and second geometric tessellated levels of detail for the geometry data in a single draw call, wherein different subsets of a non-uniform frame buffer respectively correspond to the different tessellated levels of detail;
code for causing the electronic device to execute a first shader sub-routine that accesses a first frame buffer subset concurrently with a second shader sub-routine that accesses a second frame buffer subset; and
code for causing the electronic device to swap the second shader sub-routine with a third shader sub-routine that accesses the second frame buffer subset while the first shader sub-routine is ongoing.

27. The computer-program product of claim 26, further comprising code for causing the electronic device to dynamically access different subsets of the non-uniform frame buffer.

28. An apparatus, comprising:
means for obtaining geometry data;
means for asynchronously accessing memory to render different first and second geometric tessellated levels of detail for the geometry data in a single draw call, wherein different subsets of a non-uniform frame buffer respectively correspond to the different first and second geometric tessellated levels of detail;
means for executing a first shader sub-routine that accesses a first frame buffer subset concurrently with a second shader sub-routine that accesses a second frame buffer subset; and
means for swapping the second shader sub-routine with a third shader sub-routine that accesses the second frame buffer subset while the first shader sub-routine is ongoing.

29. The apparatus of claim 28, further comprising means for dynamically accessing different subsets of the non-uniform frame buffer.

* * * * *